United States Patent [19]
Furuya et al.

[11] Patent Number: 6,128,096
[45] Date of Patent: Oct. 3, 2000

[54] PRINTING SYSTEM

[75] Inventors: Yoji Furuya, Inagi; Masayoshi Suzuki, Kawasaki; Yoshifumi Okamoto, Yokohama; Makoto Dohi, Chigasaki; Toshihiko Ikeno, Yokohama, all of Japan

[73] Assignee: Canon Kabushiki Kaisha, Tokyo, Japan

[21] Appl. No.: 08/996,052

[22] Filed: Dec. 22, 1997

[30] Foreign Application Priority Data

Dec. 27, 1996 [JP] Japan ................................. 8-350381

[51] Int. Cl.⁷ .................................................. G06H 15/00
[52] U.S. Cl. .......................................... 358/1.17; 358/1.13
[58] Field of Search .................................... 395/101, 106, 395/110, 112, 114–116, 821; 345/192, 194, 195, 467; 358/404, 443, 444, 470, 1.1, 1.6, 1.11, 1.13, 1.15–1.17; 382/180, 232; 707/542; 710/1

[56] References Cited

U.S. PATENT DOCUMENTS

| | | | |
|---|---|---|---|
| 4,985,850 | 1/1991 | Okamoto | 395/109 |
| 5,592,593 | 1/1997 | Speed | 395/110 |
| 5,604,846 | 2/1997 | Kadota | 395/115 |
| 5,768,486 | 6/1998 | Sugaya | 395/101 |
| 5,889,931 | 3/1999 | Noda | 395/116 |

FOREIGN PATENT DOCUMENTS 727733 8/1996 European Pat. Off. .

*Primary Examiner*—Arthur G. Evans
*Attorney, Agent, or Firm*—Fitzpatrick, Cella, Harper & Scinto

[57] ABSTRACT

When a host computer makes a printer print a document, the driver on the host computer sends character codes of characters that appear for the first time in that document and corresponding character images to the printer in advance, and registers them. After this process, the driver transmits, to the printer, characters in the document to be printed as character codes, and data other than characters as mapped image. The printer maps an image on a page memory, maps characters as images with reference to the registered character codes and character image, and superposes the mapped character images on the image mapped on the page buffer. The printer prints the image on paper. The printer can divide an image into bands, and can map the image in units of bands, in place of pages. With this arrangement, the memory capacity can be reduced, and bands having identical contents or blank bands can be processed as codes.

30 Claims, 64 Drawing Sheets

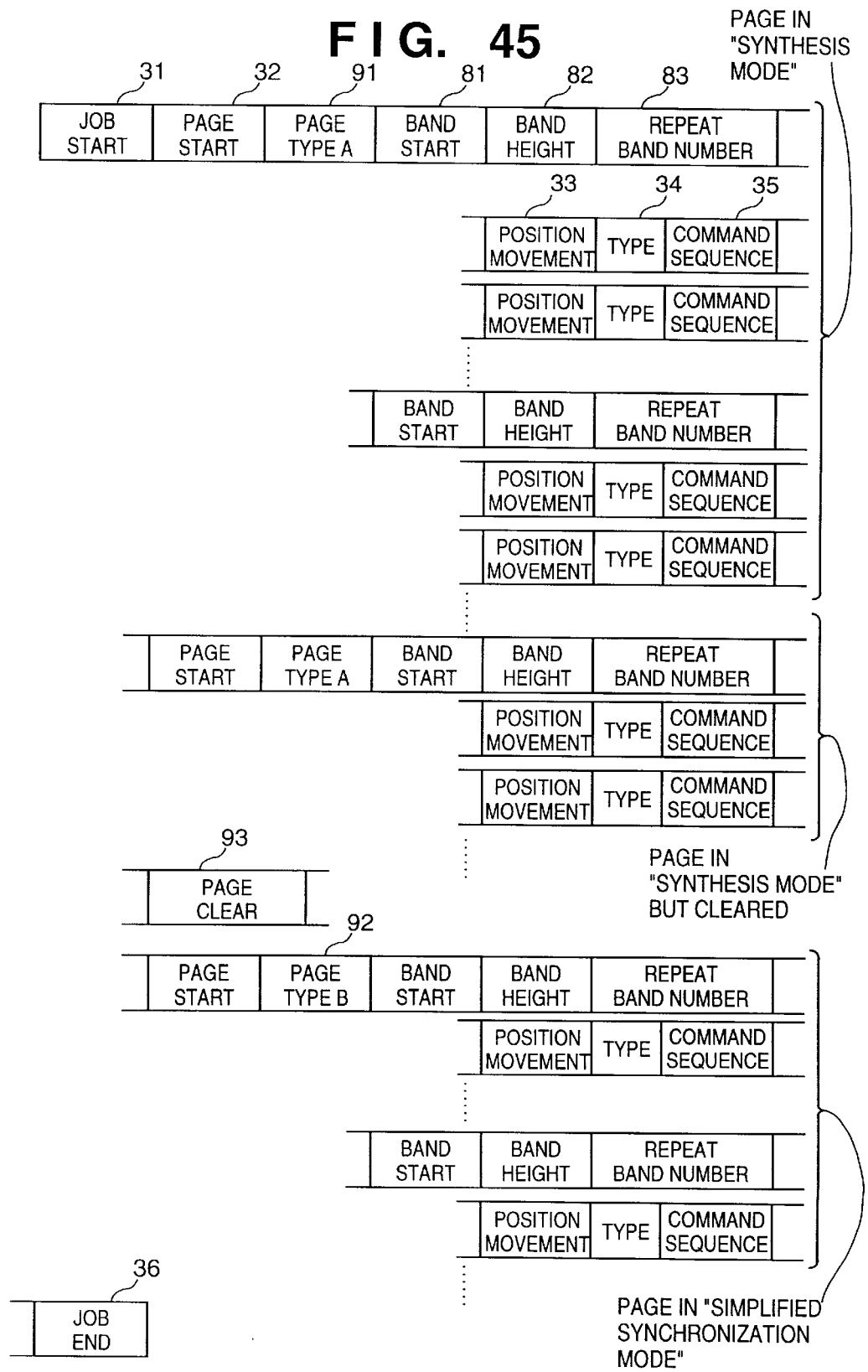

FIG. 46A

| NUMBER | START ADDRESS | END ADDRESS | TOO LARGE PAGE? |
|---|---|---|---|
| 1 | 0 | 10239 | N |
| 2 | 10240 | -1 | N |
| 3 | -1 | -1 | -1 |
| ⋮ | ⋮ | ⋮ | ⋮ |

WHEN "SYNTHESIS MODE" IS SET, OR WHEN "SIMPLIFIED SYNCHRONIZATION MODE" IS SET AND PAGE DATA IS SMALL

FIG. 46B

| NUMBER | START ADDRESS | END ADDRESS | |
|---|---|---|---|
| 1 | 0 | -1 | Y |
| 2 | -1 | -1 | -1 |
| 3 | -1 | -1 | -1 |
| ⋮ | ⋮ | ⋮ | ⋮ |

WHEN "SIMPLIFIED SYSNCHRONIZATION MODE" IS SET AND PAGE DATA IS LARGE

ABOUT 1MB
ABOUT 100KB
ABOUT 100KB
ABOUT 100KB
ABOUT 100KB
ABOUT 100KB
ABOUT 100KB
ABOUT 100KB

STANDARD 2MB RAM

GIANT IMAGE DATA WHICH CANNOT BE STORED IN 2MB EVEN AFTER COMPRESSION

PRINTING SYSTEM

BACKGROUND OF THE INVENTION

1. Field of the Invention

The present invention relates to a printing system, printing apparatus, and printing control method for printing out print data sent from, e.g., a host computer.

2. Description of the Related Art

Conventionally, a page printer dedicated to image output is known, and is called a host-based printer.

In this printer, a host computer compresses mapped image data for one page in turn from the head of a page, and sends the compressed data to a controller unit of the printer. The controller unit expands the received compressed data in turn, converts the expanded data into a video signal, and outputs the video signal to an engine unit in synchronism with the paper discharge timing of the engine unit. In this way, printing on a paper sheet for one page is done.

In such printer, conversion of the compression image data into a video signal and video signal output to the engine unit are done by a hardware circuit. Ultimately, the controller unit does not require any CPU, and a very low-cost page printer can be provided.

However, the host computer that uses the conventional host-based printer temporarily maps all print data such as character print data, figure draw data, image paste data, and the like as images, then compresses the mapped images, and transfers the compressed data to the printer. For this reason, the volume of data to be transferred from the host computer to the printer becomes large. Also, since the host computer must temporarily map all data as images, especially, a plurality of pages of documents take a long processing time on the host computer, resulting in long print processing time.

SUMMARY OF THE INVENTION

It is an object of the present invention to provide a printing apparatus, which is an image-dedicated printer with a simple mechanism similar to that of a host-based printer, but can minimize the character mapping processing time in a host computer and the transfer data volume from the host computer by receiving a character portion as a character code and mapping it to a character image, and a printing system and printing control method.

It is another object of the present invention to provide a printing apparatus which can output a document including image data having a large data size, and a printing system and printing control method.

In order to achieve the above objects, the present invention comprises the following arrangement.

That is, there is provided a printing system for printing out document data created by a host apparatus using a printing apparatus, the host apparatus comprising:

first transmission means for transmitting codes and character images in units of character types that appear in the document data to the printing apparatus; and second transmission means for transmitting characters that appear in the document data as character codes, and a portion other than the characters as image data to the printing apparatus, and the printing apparatus comprising:

registration means for registering the character codes and character images transmitted from the first transmission means;

image reconstruction means for mapping, as image data, the character codes transmitted from the second transmission means on the basis of the codes and character images registered by the registration means, and synthesizing the mapped image data with an image transmitted from the second transmission means; and means for printing out the image data obtained by the image reconstruction means.

There is also provided a printing control apparatus for printing out print data received from a host apparatus which transmits codes and character images in units of character types that appear in document data, and which subsequently transmits characters that appear in the document data as character codes and a portion other than characters as image data, comprising:

registration means for registering the character codes and character images transmitted from the host apparatus;

image reconstruction means for mapping, as image data, the character codes transmitted from the host apparatus on the basis of the codes and character images registered by the registration means, and synthesizing the mapped image data with an image transmitted from the second transmission means; and means for printing out the image data obtained by the image reconstruction means.

There is also provided a printing control apparatus for making a printing apparatus print out created document data, comprising:

first transmission means for transmitting codes and character images in units of character types that appear in the document data to the printing apparatus; and second transmission means for transmitting characters that appear in the document data as character codes, and a portion other than the characters as image data to the printing apparatus.

There is also provided a printing control method for printing out print data received from a host apparatus which transmits codes and character images in units of character types that appear in document data, and which subsequently transmits characters that appear in the document data as character codes and a portion other than characters as image data, comprising:

the registration step of registering the character codes and character images transmitted from the host apparatus;

the image reconstruction step of mapping, as image data, the character codes transmitted from the host apparatus on the basis of the codes and character images registered in the registration step, and synthesizing the mapped image data with an image transmitted in the second transmission step; and the step of printing out the image data obtained in the image reconstruction step.

There is also provided a control method of a printing apparatus for printing out created document data, comprising:

the first transmission step of transmitting codes and character images in units of character types that appear in the document data to the printing apparatus; and the second transmission step of transmitting characters that appear in the document data as character codes, and a portion other than the characters as image data to the printing apparatus.

There is also provided a computer readable storage medium which stores a program for making a computer execute, based on print data received from a host apparatus which transmits codes and character images in units of character types that appear in document data, and which subsequently transmits characters that appear in the document data as character codes and a portion other than characters as image data:

the registration process of registering the character codes and character images transmitted from the host apparatus;

the image reconstruction process of mapping, as image data, the character codes transmitted from the host apparatus on the basis of the codes and character images registered in the registration process, and synthesizing the mapped image data with an image transmitted in the second transmission process; and the process of printing out the image data obtained in the image reconstruction process.

There is also provided a computer readable storage medium which stores a program for making a computer execute:

the first transmission process of transmitting codes and character images in units of character types that appear in the document data to a printing apparatus; and the second transmission process of transmitting characters that appear in the document data as character codes, and a portion other than the characters as image data to the printing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 45 is an explanatory view of the command structure;

FIGS. 46A and 46B are explanatory views of the structure of a page management table;

DETAILED DESCRIPTION OF THE PREFERRED EMBODIMENTS

[First Embodiment]

The first embodiment will be described hereinafter with the aid of the accompanying drawings.

<Arrangement of Printing System>

Figure 1:
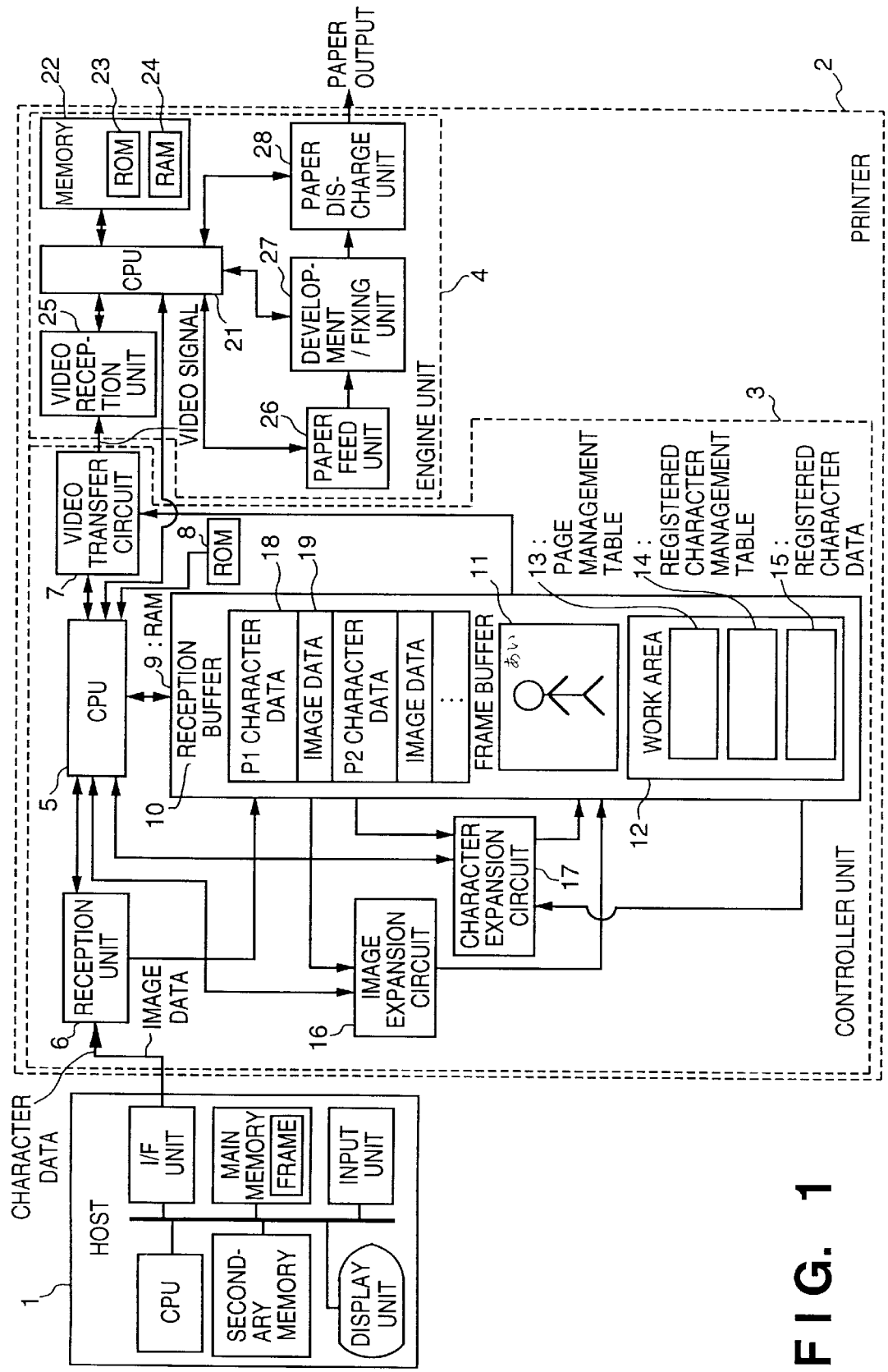
FIG. 1 is a block diagram showing the arrangement of the overall system according to the first embodiment.

FIG. 1 is a block diagram for explaining the arrangement of the overall system. A host 1 comprises a personal computer which generates character image data to be registered, a character code for instructing printing, and compressed image data, and sends them to a printer. The host 1 implements such processing by executing programs loaded from a secondary memory to a main memory by a CPU. At the host 1, the user can execute his or her desired application program. The user controls such program in accordance with input from an input unit and display on a display unit. The host 1 is connected to a printer 2 via an interface unit.

The printer 2 includes a controller unit 3 and an engine unit 4. The controller unit 3 receives character data and image data from the host computers, generates a video signal and transmits the video signal to the engine unit 4. The engine unit 4 prints images on a print paper by using the received video signal from the controller 3 and discharges the print paper.

The controller unit 3 is constituted by a central processing unit (to be referred to as a CPU hereinafter) 5 for controlling the entire controller unit 3, a read-only memory (to be referred to as a ROM hereinafter) 8 which stores programs that describe the processing operations of the CPU 5, a random-access memory (to be referred to as a RAM hereinafter) 9, a reception unit 6 for receiving character and image data from the host 1, and setting the received data in a reception buffer 10 allocated in the RAM 9, a character expansion circuit 17 for expanding the received compressed character data and mapping the expanded data onto a frame buffer 11, an image expansion circuit 16 for expanding the received compressed image data and mapping the expanded data onto the frame buffer 11, a video transfer circuit 7 for converting the images mapped on the frame buffer 11 into a video signal, and outputting the video signal to the engine unit 4, and the like. Data 18 indicates character data, which has already been received, and is set in the reception buffer 10 in units of pages, and data 19 indicates image data, which has already been received, and is set in the reception buffer 10 in units of pages.

In addition, the RAM 9 includes a work area 12 for programs, which includes a page management table 13 for managing the character and image data 18 and 19 in units of pages received in the reception buffer 10, a registered character data area 15 for storing compressed dot images in units of characters, a registered character management table 14 for managing registered character data, and the like.

Note that the contents of the received character data 18 include registered characters and character codes. A character which appears first in the document to be printed on the host 1 is compressed, and is sent as a dot image for one character, i.e., as a registered character, to the printer 2. Printing of subsequent identical characters as well as the first character position is instructed by character codes.

The registered character temporarily received in the reception buffer 10 is transferred to and saved in the registered character data area 15. When printing is instructed by a character code, the registered character data corresponding to that character code is read out from the registered character data area 15, is expanded by the character expansion circuit 17, and is mapped on the frame buffer 11. On the other hand, the compressed image data 19 is expanded by the image expansion circuit 16, and is mapped on the frame buffer 11.

Note that the CPU 5 of the controller unit 3 can use an inexpensive product with not so high processing performance, since it need only perform memory management using the reception buffer 10, page management table 13, registered character management table 14, and the like in the RAM 9.

On the other hand, the engine unit 4 comprises a CPU 21 and memory 22. The memory 22 includes a ROM 23 which stores control programs, and a RAM 24 used as a work area for the programs. A video reception unit 25 receives a video signal from the controller unit 3, and transfers an image onto a paper sheet using a development/fixing unit 27. A paper feed unit 26 feeds a blank paper sheet from a paper cassette or the like, the development/fixing unit 27 transfers and fixes an image onto a paper sheet, and a paper discharge unit 28 discharges the printed paper sheet.

Note that the bold arrows in FIG. 1 indicate the flows of the character data, image data, and video signal, or the flow of a paper sheet in the engine unit. The thin arrows indicate control exchange processes among the individual units. The CPU 5 of the controller unit 3 and the CPU 21 of the engine unit 4 exchange information with each other. The information to be exchanged is associated with control of print processing such as video transfer, paper feed, and the like.

Figure 2:
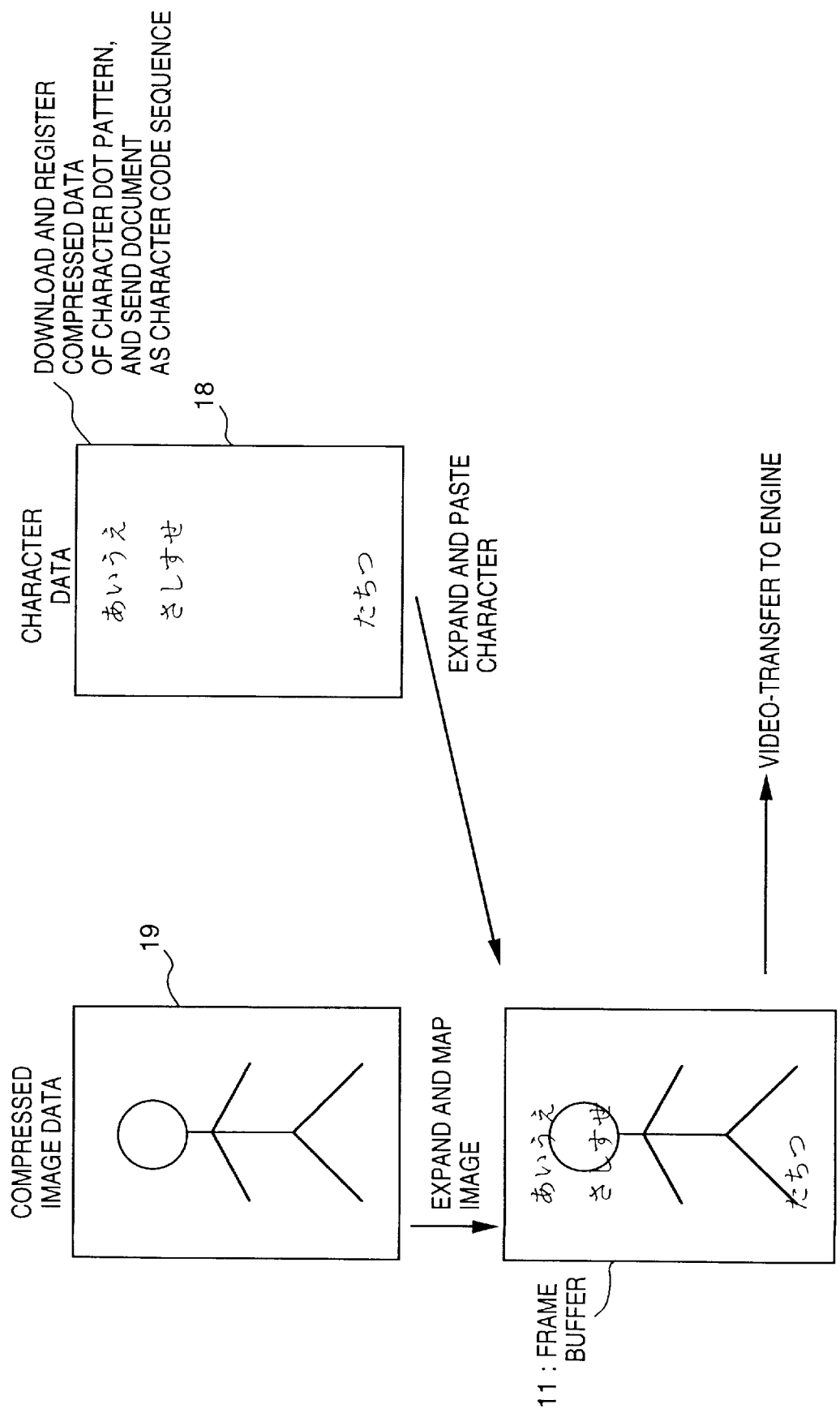
FIG. 2 is an explanatory view of the principle of synthesis of image data and character data.

FIG. 2 is an explanatory view of the principle of synthesis of an image and characters in the controller unit 3. As has been partially described above with the aid of FIG. 1, the driver on the host 1 separates the document to be printed into a character portion and a portion other than characters. The portion other than characters is mapped as an image on the host 1. Then, the driver separately transfers the character data portion and image data portion to the printer 2 in units of pages. In this case, the character data portion is transferred in such a manner that a character code and compressed dot pattern data of the corresponding character are sent to and registered in the printer, and a registered character code sequence is then sent as print data.

The controller unit 3 expands the received compressed image data 19 using the image expansion circuit 16, and maps it onto the frame buffer 11. Upon receiving the character data 18 (i.e., a character code sequence), the controller unit 3 expands compressed dot pattern data registered in correspondence with each received character code using the character expansion circuit 17, and maps it onto the frame buffer 11. Upon completion of mapping image and character data for one page onto the frame buffer 11, the video transfer circuit 7 transfers a video signal to be printed to the engine unit 4.

Note that the OR of the image and character portions is written on the frame buffer 11. For documents, the OR normally suffices.

Character dot data of a certain character is registered once per printing of one document. Even when an identical character repetitively appears across pages, that character need only be registered once, and its printing is repetitively instructed by a character code. However, upon completion of printing of the document, the registered character is cleared from the RAM 9. That is, the registered character is not effective across a plurality of documents. Character registration is repeated in units of documents to be printed.

Figure 3:
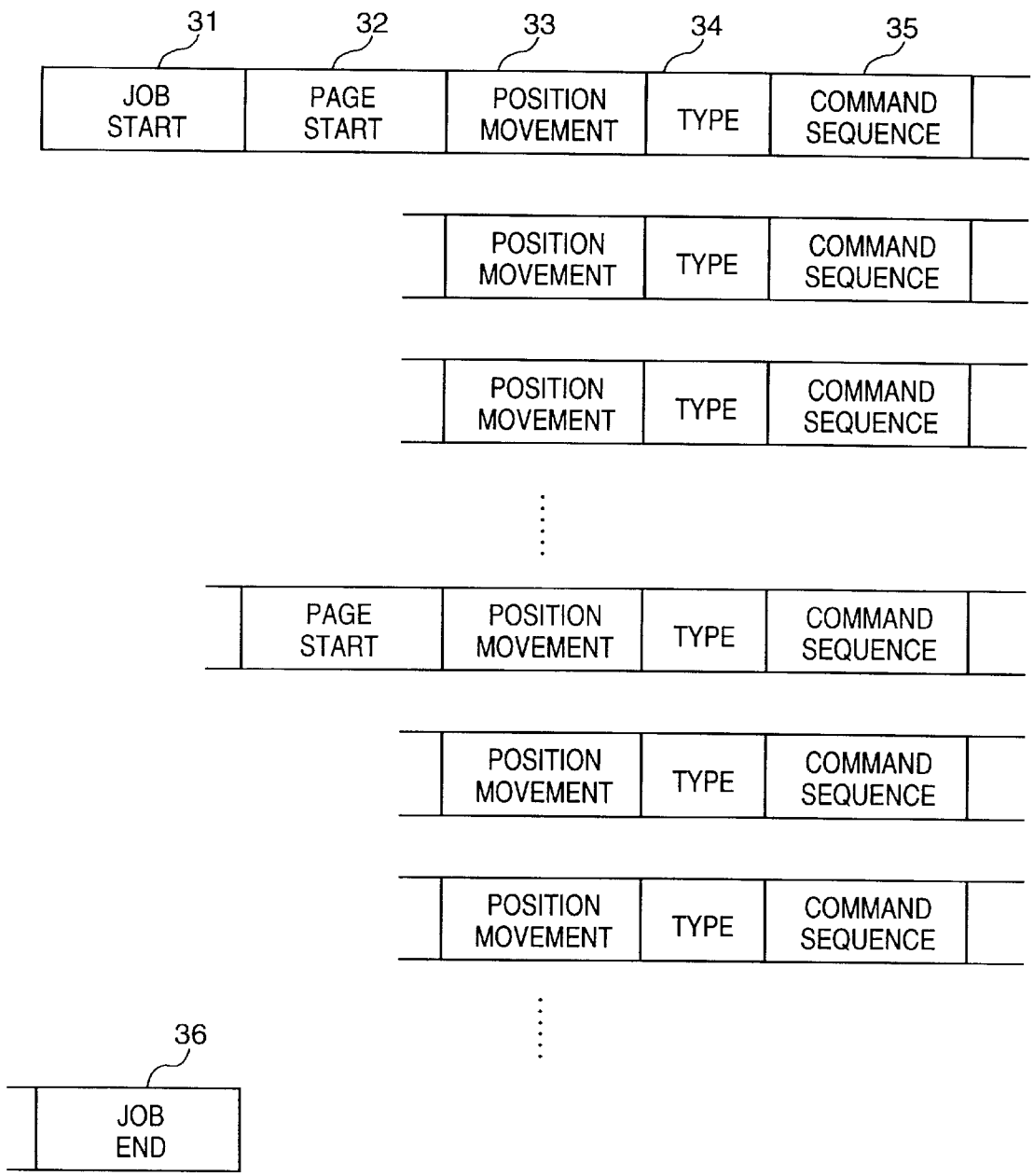
FIG. 3 is an explanatory view of the command structure.

FIG. 3 shows the command structure of print data such as character data, image data, and the like sent from the host 1 to the printer 2. Print data includes, in turn, a job start command 31, a page start command 32 for each page, a position movement command 33 of a pointer indicating the print position, a type command 34, and a command sequence 35. The type command 34 indicates the type of command sequence 35 that follows. The command sequence 35 has several types, a type for making character registration, type for instructing character printing, type for instructing image printing, and the like. The types of command sequence 35 will be described in detail later with reference to FIG. 4. Groups of commands after the page start command 32 repetitively appear in correspondence with the number of pages of the document to be printed, and print commands for one document end in response to a job end command 36.

In FIG. 3, the position movement command 33 is always set before the type command 34, but is not always required. For example, when the type command 34 and command sequence 35 pertain to only registration of a character, the position movement command 33 is not necessary.

Figure 4:
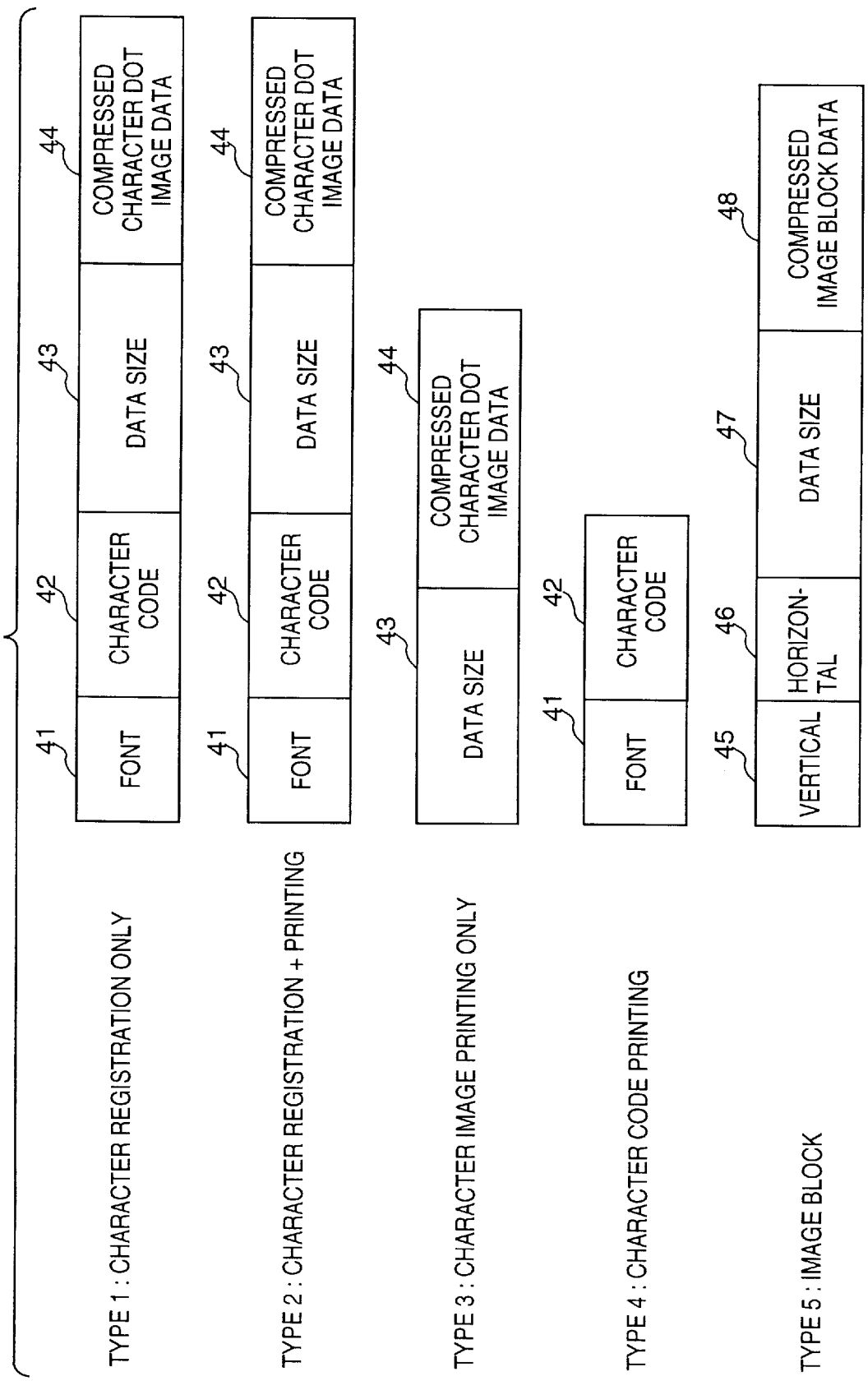
FIG. 4 is an explanatory view of the structures of command sequences.

FIG. 4 is an explanatory view of the structures of command sequences 35 in units of values of the type command 34.

When the type command 34 indicates type 1, that command is a "character registration only" command. The command sequence includes a font number 41, character code 42, data size 43, and compressed character dot image data 44.

Character data to be registered are classified in units of fonts, and are registered in the registered character data area 15 on the RAM 9 in correspondence with character codes. More specifically, such classification and association are managed on the registered character management table 14.

When the type command 34 indicates type 2, that command is a "character registration+printing" command, i.e., simultaneously instructs the registration and printing of a character. The format of the command sequence 35 at that time is the same as that of type 1. A character code 42 in this case implies code assignment of a character to be registered, and also a printing instruction of the already registered character.

When the type command 34 indicates type 3, that command is a "character image printing only" command. That is, character dot image data is printed without being registered. The command sequence 35 at that time includes a data size 43 and compressed character dot image data 44.

When the type command 34 indicates type 4, that command is a "character code printing" command. The command sequence 35 at that time includes a font number 41 and character code 42. The controller unit 3 looks up the registered character management table 14 using the font number 41 and character code 42 to find target registered character data from the registered character data area 15, expands the found data using the character expansion circuit 17, and maps it onto the frame buffer 11.

When the type command 34 indicates type 5, that command is an "image block paste" command, and the command sequence 35 at that time includes vertical and horizontal sizes 45 and 46 of an image block, data size 47, and compressed image block data 48. The controller unit 3 expands the compressed image block data using the image expansion circuit 16, and maps it onto the frame buffer 11. These five different type commands 34 are used.

Figure 5:
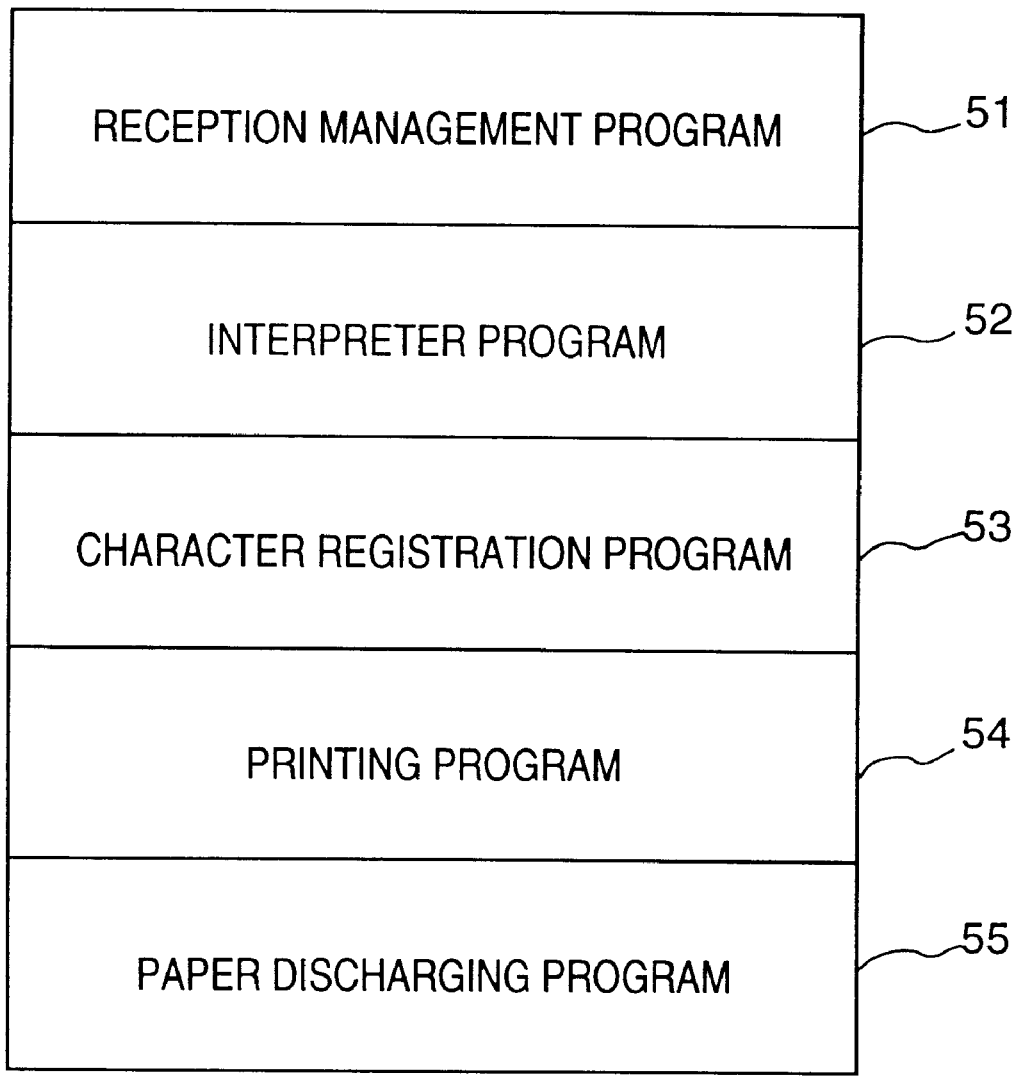
FIG. 5 is a view showing programs installed in a ROM.

FIG. 5 is a view for explaining the programs installed in the RAM 8 of the controller unit 3.

A reception management program 51 manages character and image data in units of pages stored in the reception buffer 10 using the page management table 13. Also, the program 51 instructs the reception unit 6 of the write position of the received data on the reception buffer 10.

An interpreter program 52 interprets character data stored in the reception buffer 10, i.e., character registration commands and character printing commands, or image data, i.e., image block paste commands, instructs a character registration program 53 of character registration, instructs a printing program 54 of mapping of a character onto the frame buffer 11, and pastes an image onto the frame buffer 11.

Also, upon completion of mapping of all the character and image data for a certain page onto the frame buffer 11, the interpreter program 52 instructs a paper discharge program 55 of video transfer of the image on the frame buffer 11 to the engine unit 4, and instructs the engine unit of execution of paper discharging. Furthermore, the program 52 deletes data for the paper discharged page from the reception buffer 10. Deletion is done by only erasing registration of the paper discharged page from the page management table 13. That is, the program 52 does not actually clear any data on the reception buffer 10.

The operations of the individual programs will be described in detail with reference to the flow charts (to be described later).

Note that the reception management program 51 and interpreter program 52 are started simultaneously when the power switch of the printer is turned on, and wait for data transmitted from the host 1. These two programs continue multitask operations until the power switch of the printer is turned off.

Figure 6A:
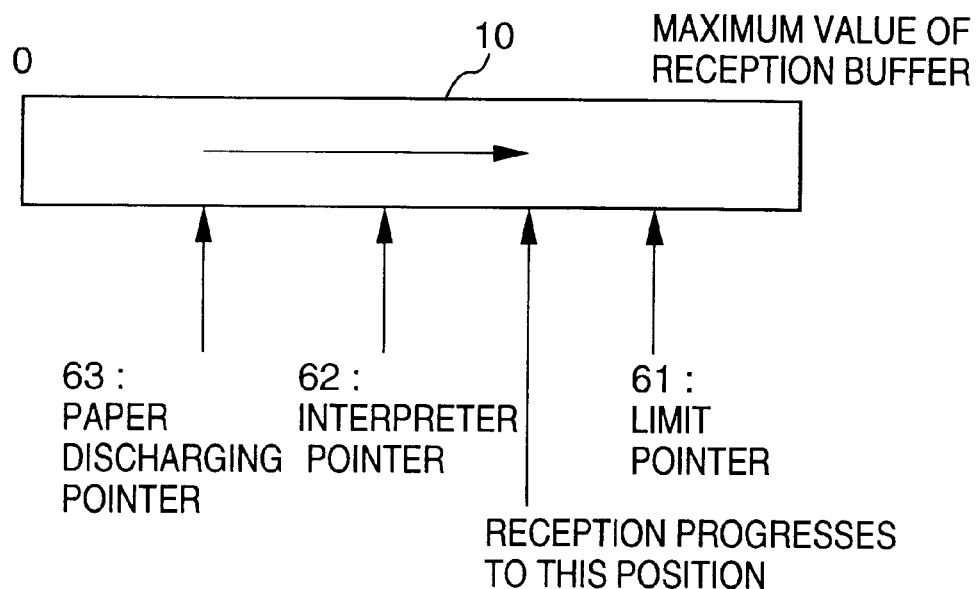
FIGS. 6A and 6B are explanatory views of pointers of a reception buffer.
Figure 6B:
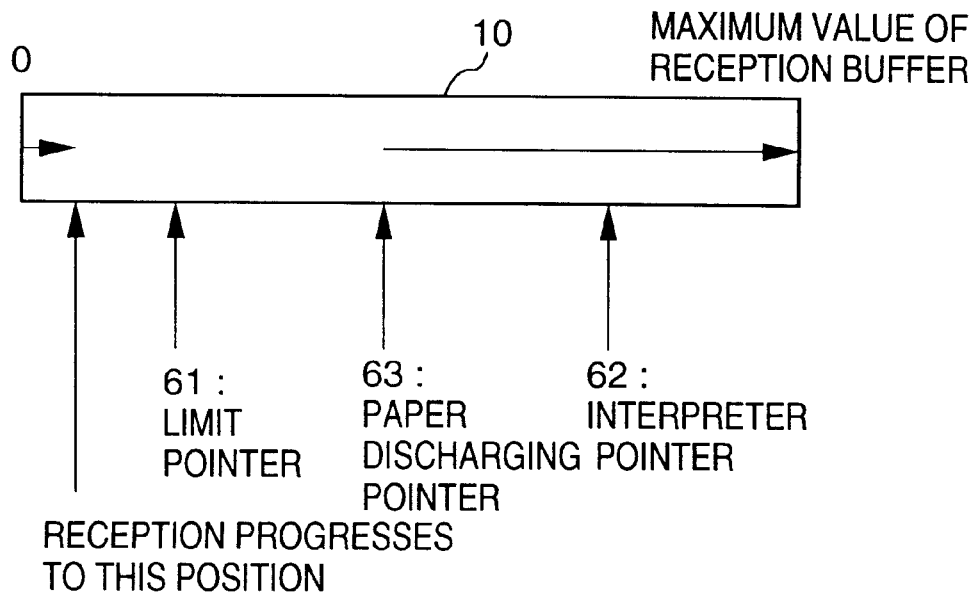

FIGS. 6A and 6B are views for explaining the positional relationship among pointers while a write of the received data is in progress. The reception buffer 10 has a so-called "ring buffer" structure.

The reception management program 51 instructs the reception unit 6 of a limit pointer 61 in advance, and a direct write of the received data is granted up to the position of the limit pointer 61 in the reception buffer 10. The write position itself, which is incremented in units of bytes, is managed by the reception unit 6.

Referring to FIG. 6A, immediately after the printer 2 is started, the limit pointer 61 matches the maximum value position of the reception buffer 10, i.e., the end address of the area on the reception buffer 10. However, in FIG. 6A, the limit pointer 61 is set slightly before the maximum value of the reception buffer 10, for the purpose of description. This state indicates that the received data has been written by the reception unit 6 up to a position slightly before the limit pointer 61.

The received data are interpreted in turn by the interpreter program 52, and printed paper sheets are discharged by the engine unit 4 from a page for which mapping of character and image data onto the frame buffer 11 has been done. Then, a first page for which paper discharge instruction to the engine unit 4 is not complete is pointed by an interpreter pointer 62. Also, a first page for which paper discharge instruction to the engine unit 4 is not complete is pointed by a paper discharge pointer 63. That is, data which have been received but remain uninterpreted are stored between the interpreter pointer 62 and the latest received data, and data which have been interpreted but remain unoutput are stored between the paper discharge pointer 63 and the interpreter pointer 62. Furthermore, as for a portion before the current address of the paper discharge pointer 62, since the corresponding paper sheets have already been discharged, and data stored therein are unnecessary, this portion is "erased", and newly received data can be written. Upon "erasing", the data are not actually cleared but newly received data are overwritten.

Note that the interpreter pointer 62 and paper discharge pointer 63 are set in units of pages. The interpreter program 52 can detect page boundary position and the like on the reception buffer 10 by looking up the page management table 13 created and managed by the reception management program 51.

FIG. 6B shows the state wherein the received data have been written up to the position of the maximum value of the reception buffer 10. In FIG. 6B, the reception management program 51 instructs the reception unit 6 to move the limit pointer 61 to a position near the start address of the reception buffer 10, and in the state shown in FIG. 6B, a write of the received data by the reception unit 6 is actually in progress slightly near the start address position. That is, so-called "ring buffer" operation is done.

The limit pointer 61 is updated in the following procedure. When the reception unit 6 has written the received data up to the position of the limit pointer 61, it informs the reception management program 51 that "write has reached the limit and no more data can be written". That is, the reception unit 6 requests the reception management program 51 to update the limit pointer 61. The reception management program 51 examines the paper discharge pointer 63 to check the presence/absence of a new empty area. Then, the program 51 instructs the reception unit 6 of the current position of the paper discharge pointer 63 as the new position of the limit pointer 61. In this fashion, the reception unit 6 can write received data from the old position to the new position of the limit pointer 61.

Note that the reception unit 6 communicates with the reception management program 51 not only when "the write position has reached the limit pointer 61" but also when "it detects the job start command 31, page start command 32, job end command 36", and the like from the received data. With this communication, the reception management program 51 can manage received pages while entrusting the reception unit 6 with actual reception jobs, i.e., control of signal lines and writes of received data in a memory.

Note that the reception unit 6 has a mechanism for writing data received from the host 1 in the reception buffer 10 at high speed, i.e., a so-called DMA (dynamic memory access) reception circuit. This circuit incorporates a FIFO (first-in, first-out) buffer. Image data sent from the host 1 is temporarily stored in this FIFO buffer, and is then written at the write position on the reception buffer 10 designated by the reception management program 51. Since such circuit is the state-of-art technique, a detailed description thereof will be omitted. The work area 12 includes the page management table 13, registered character management table 14, registered character data area 15, and the like, but a description of their detailed internal structures will also be omitted. However, these tables and areas have efficient structures so as not to consume excessive memory capacities.

<Printing Control Procedure>

The operation of the printing system according to the first embodiment of the present invention will be described below with reference to the flow charts.

(Printer Driver)

Figure 7:
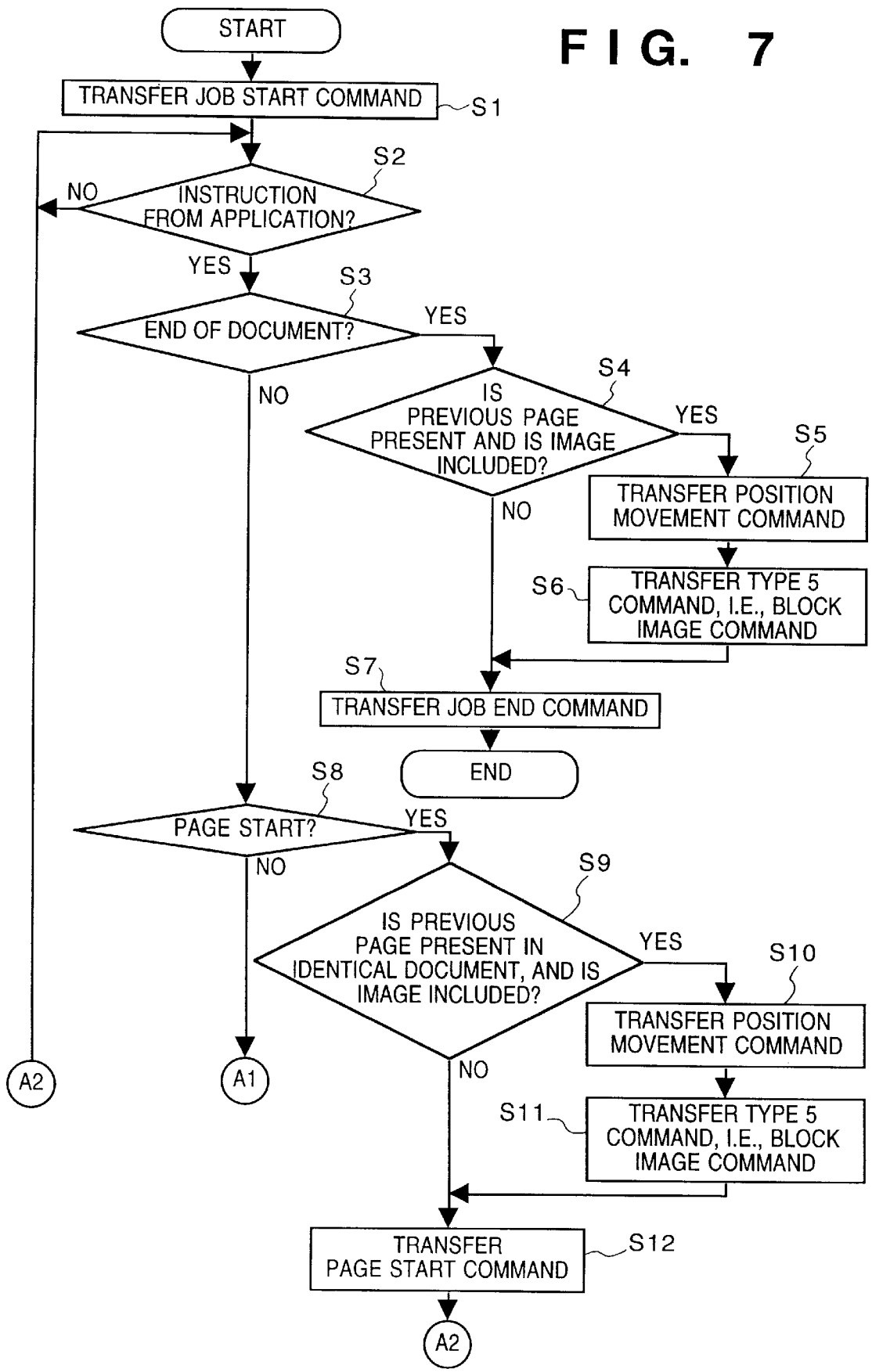
FIG. 7 is a flow chart showing the operation of a printer driver.

FIG. 7 is a flow chart for explaining the operation of a printer driver on the host 1. The printer driver generates character and image printer commands described above with the aid of FIGS. 3 and 4 from document data including both image and text data and created by an application software program used by the user, and transfers them to the printer 2. When the user instructs document printing from the application software program, the printer driver is started in the host 1.

At the time of starting, the driver assures a frame buffer (not shown) for one page on a memory of the host 1 and clears the frame buffer at the same time. Upon completion of document printing by the driver, the memory area used as the frame buffer is released.

In the actual processing, the driver transfers a job start command 31 to the printer 2 in step S1, and checks in step S2 if some instruction is received from an application program. If NO in step S2, the driver forms a loop and waits for reception of an instruction. On the other hand, if YES in step S2, the driver checks in step S3 if the received instruction is a document end instruction. If YES in step S3, the driver checks in step S4 if image data is included in the last page of a document before the document is to end. If YES in step S4, the driver transfers a position movement command 33 indicating the paste position of an image block in step S5, and also transfers a type command 34 of type 5, i.e., commands including vertical and horizontal sizes 45 and 46 of the image block, data size 47, and compressed image block 48 in step S6.

The image block transferred in step S6 is data including the entire last page as a single image block. An image for one page is mapped on the frame buffer for one page allocated on the memory on the host 1. After the image commands are transferred in step S6, the driver clears the contents of the frame buffer on the host.

If NO in step S4, or after step S6, the driver transfers a job end command 36 to the printer 2 in step S7, thus ending the driver processing routine.

If NO in step S3, the driver checks in step S8 if a page start instruction is received from the application program. If YES in step S8, the driver checks in step S9 if the previous page is present in an identical document and includes an image. In other words, it is checked if an image is mapped on a frame buffer for the previous page. If YES in step S9, the driver transfers a position movement command 33 indicating the paste position of an image block in step S10, and also transfers a type command 34 of type 5, i.e., image block commands 45, 46, 47, and 48 to the printer in step S11. Thereafter, the driver clears the contents of the frame buffer on the host 1.

If NO in step S9, or after step S11, the driver transfers a page start command 32 to the printer 2 in step S12, and the flow returns to step S2 to wait for the next instruction from the application program.

If NO in step S8, the driver checks in step S13 if a character printing instruction is received from the application program, and that character appears first in this document. If YES in step S13, the flow advances to step S14 to transfer a position movement command 33 to the printer 2. The driver then checks in step S15 if the number of registered characters has exceeded its limit. If NO in step S15, the driver transfers a type command 34 of type 2, i.e., "character registration+printing" commands 41, 42, 43, and 44 to the printer 2 in step S16. On the other hand, if it is determined in step S15 that the number of registered characters has exceeded the limit, the driver transfers a type command 34 of type 3, i.e., "character image printing only" commands 43 and 44 to the printer 2 in step S17. After step S16 or S17, the flow returns to step S2 to wait for the next instruction from the application program.

In step S17, the driver transfers a character dot image to the printer 2. In this case, commands that execute only pasting of a dot image but do not register it are used. As another method, when the number of registered characters has exceeded the limit, a character dot image may be directly mapped on the frame buffer on the host 1. In this case, in step S6 or S11, commands including data for one page as a single image block are transferred to the printer 2.

If NO in step S13, the driver checks in step S18 if the application program instructs the second or subsequent printing of that character. If YES in step S18, the driver transfers a position movement command 33 indicating the print position to the printer 2 in step S19, and also transfers a type command 34 of type 4, i.e., character code printing commands 41 and 42, to the printer 2 in step S20. Next, the flow returns to step S2 to wait for the next instruction from the application program.

If NO in step S18, it is determined that a ruled line drawing instruction, figure drawing instruction, image paste instruction, or the like has been received from the application program, and the driver maps such received data as an image onto the frame buffer on the host 1 in step S21. Then, the flow returns to step S2 to wait for the next instruction from the application program.

The host 1 sends print data as a command sequence to the printer in the above-mentioned procedure.

(Reception Management Program)

Figure 9:
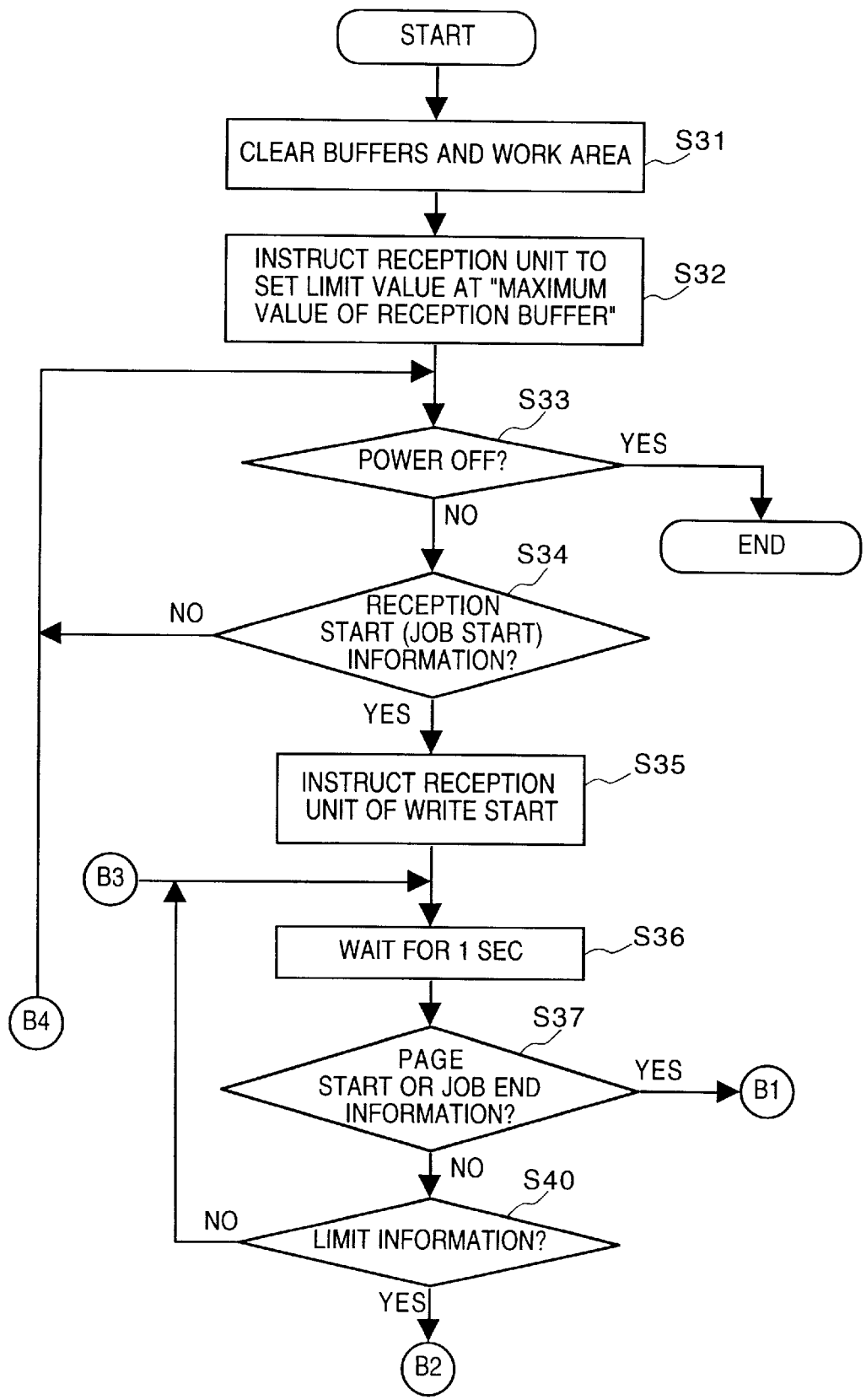
FIG. 9 is a flow chart showing the operation of a reception management program.
Figure 10:
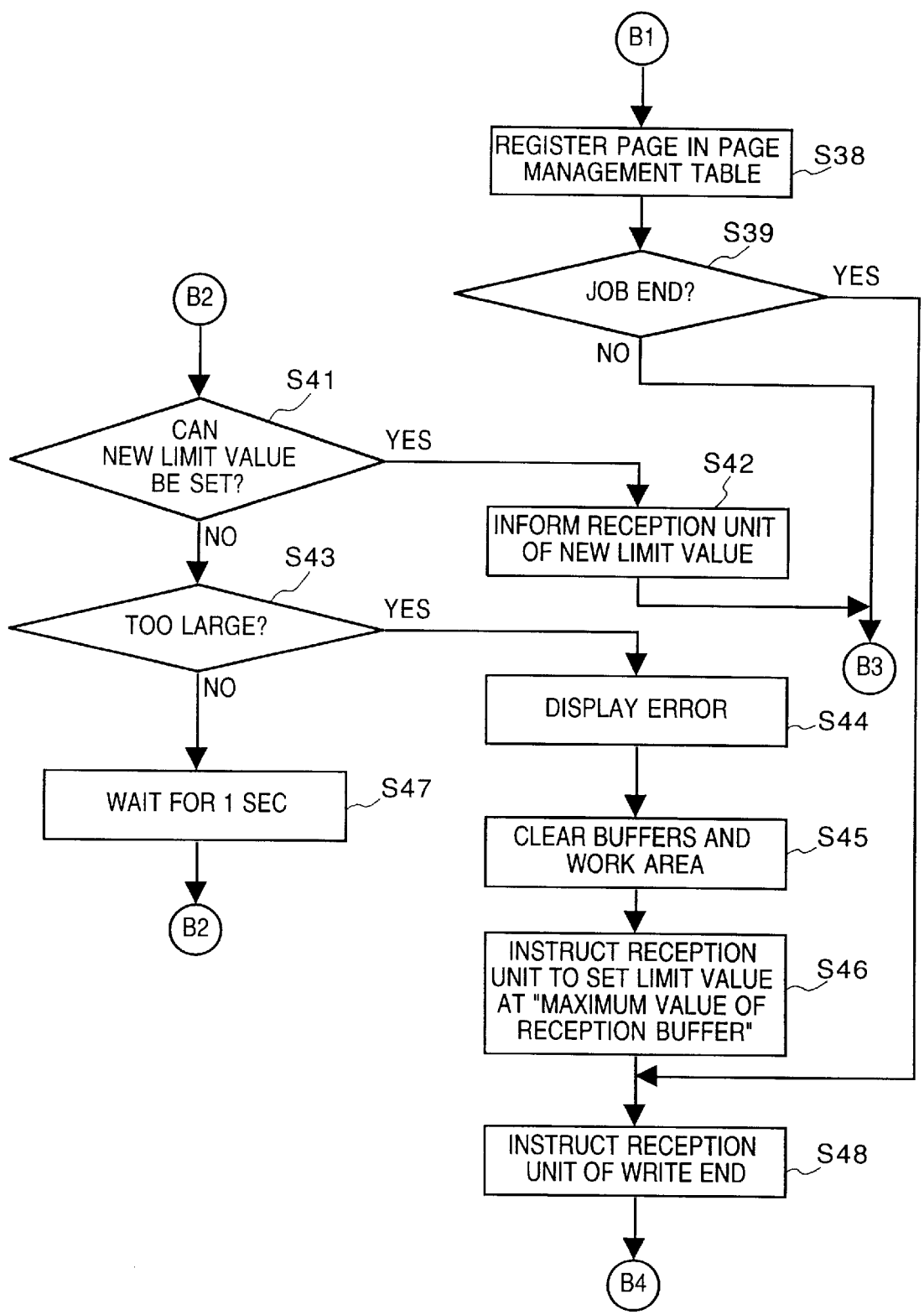
FIG. 10 is a flow chart showing the operation of the reception management program.

FIGS. 9 and 10 are flow charts for explaining the operation of the reception management program 51 in the printer 2. This program starts operation immediately after the power switch of the printer 2 is turned on.

In step S31, the program clears the contents of the reception buffer 10, the frame buffer 11, and the page management table 13, the registered character management table 14, and the like in the work area 12. In step S32, the program directs the reception unit 6 to set the received data write limit value for the reception unit 6, i.e., the value of the limit pointer 61 described above in FIG. 6, at the maximum value of the reception buffer. With this setup, the reception unit 6 can fully write data up to the size of the reception buffer. Thereafter, the program checks in step S33 if the user has turned off the power switch of the printer. If YES in step S33, this program ends its processing.

If NO in step S33, the program checks in step S34 if reception start information is received from the reception unit 6. The reception start information indicates whether or not the reception unit 6 detects a job start command 31 from transfer data received from the host 1. If NO in step S34, the flow returns to step S33, and the program forms a loop to wait for print commands transferred from the host 1.

If YES in step S34, the program instructs the reception unit 6 to write the received data in the reception buffer 10.

Upon detecting the job start command 31, the reception unit 6 temporarily stops reception from the host 1, and supplies detection information of the job start command 31 to the reception management program 51. Then, the unit 6 waits for a write instruction of the received data to the reception buffer 10 from the reception management program 51. This processing corresponds to step S35. On the other hand, the reception unit 6 discards all the received data before detection of the job start command 31. That is, the unit 6 receives data from the host 1 but does not write them in the reception buffer 10.

After step S35, the program waits for 1 sec in step S36. During this 1-sec interval, the reception unit 6 writes the received data in the reception buffer 10. Subsequently, the program checks in step S37 if detection information of a page start command 32 or job end command 36 is received from the reception unit 6. If YES in step S37, the program registers the received page in the page management table 13 in step S38. At this time, the program may often register not only a single page but also a plurality of pages in the page management table 13 at the same time. That is, at the time of step S37, some page start commands and job end commands may have already been queued.

The program checks in step S39 if the contents of the information from the reception unit 6 include a job end command 36. If YES in step S39, the program instructs the reception unit 6 of the end of write, and the flow then returns to step S33. Then, the program forms a loop and waits for reception of the next job. However, if NO in step S39, the flow then returns to step S36, and the program forms a loop to continue the write of the received data in the reception buffer 10.

Note that the reception unit 6 temporarily stops data reception upon detecting a job end command. More specifically, even when the reception unit 6 successively receives a plurality of jobs, it does not randomly write all the received data into the reception buffer 10 at one time, but writes them into the reception buffer 10 in units of jobs in response to the instructions from the reception management program 51.

If NO in step S37, the program checks in step S40 if information indicating that the write position of the received data has reached the designated limit value is received from the reception unit 6. If NO in step S40, the flow returns to step S36, and the program forms a loop to continue the write of the received data by the reception unit 6. On the other hand, if YES in step S40, the program checks in step S41 if the program can inform the reception unit 6 of a new limit value. If YES in step S41, the program informs the reception unit 6 of a new limit value in step S42. Thereafter, the flow returns to step S36, and the program forms a loop to continue the write of the received data into the reception buffer 10 by the reception unit 6.

If NO in step S41, the program checks in step S43 if the received data is too large. "Too large data" implies data for one page that cannot be received even when the reception buffer 10 is fully used. If YES in step S43, the program displays an error message on a panel of the printer 2 in step S44, and clears the contents of the reception buffer 10, the frame buffer 11, and the page management table 13, the registered character management table 14, and the like in the work area 12 in step S45. In step S46, the program directs the reception unit 6 to set the received data write limit value at the maximum value of the reception buffer. Next, the program instructs the reception unit 6 of the end of write, and the flow returns to step S33 to form a loop, thus waiting for job start information of the next document. With this processing, all the document jobs including a page that has caused errors arising from too large data are discarded from that giant page.

Note that "an error message is displayed on the panel of the printer 2" in step S44 in the above description, but no panel is described or explained in the block diagram of FIG. 1. However, a normal printer or the like has a liquid crystal panel, status indication lamp, or the like on the front or upper surface of the printer 2 to indicate a "printable", "error", or "out-of-paper" state. Hence, a detailed description thereof will be omitted.

(Reception Unit 6)

Figure 11:
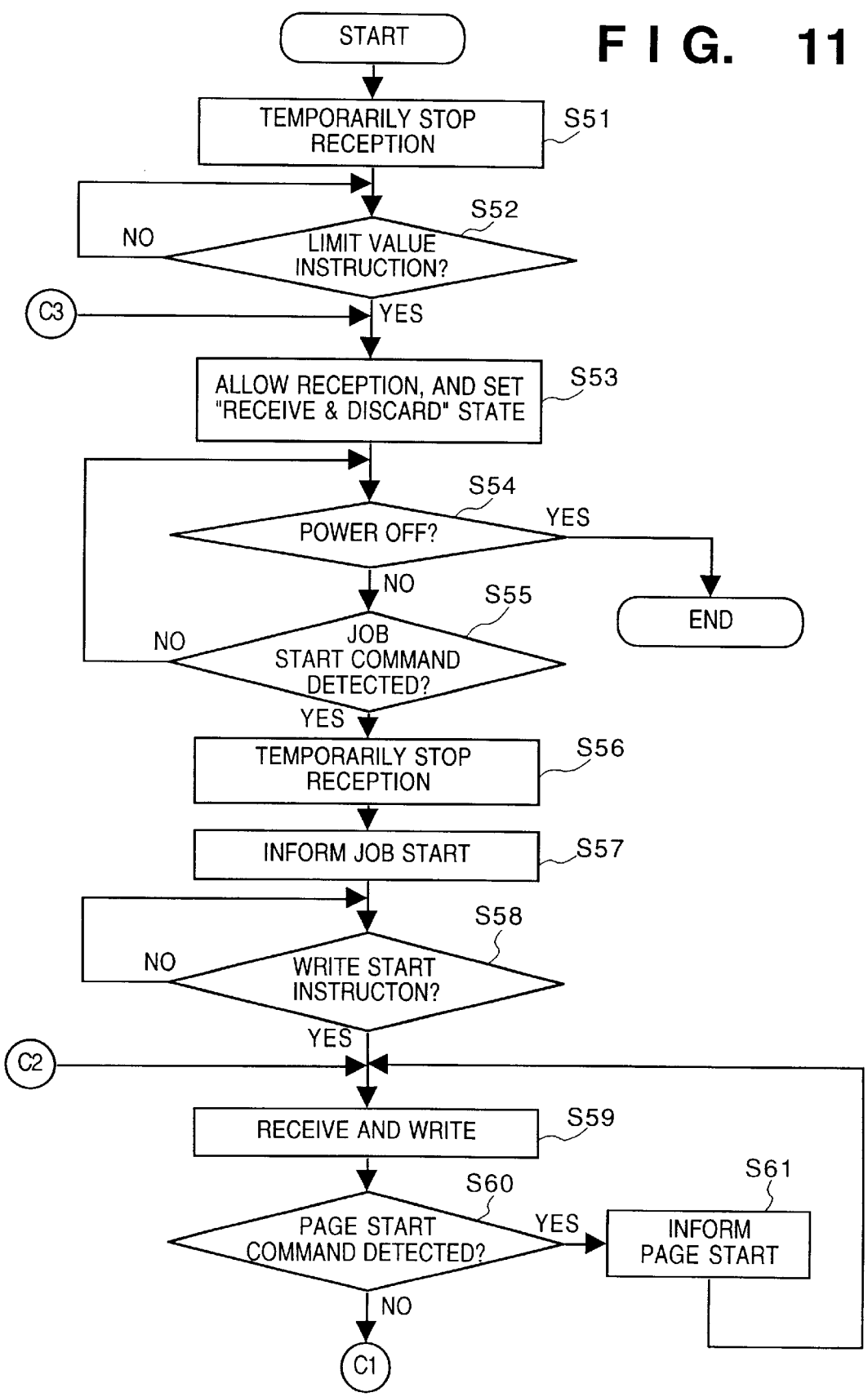
FIG. 11 is a flow chart showing the operation of a reception unit.
Figure 12:
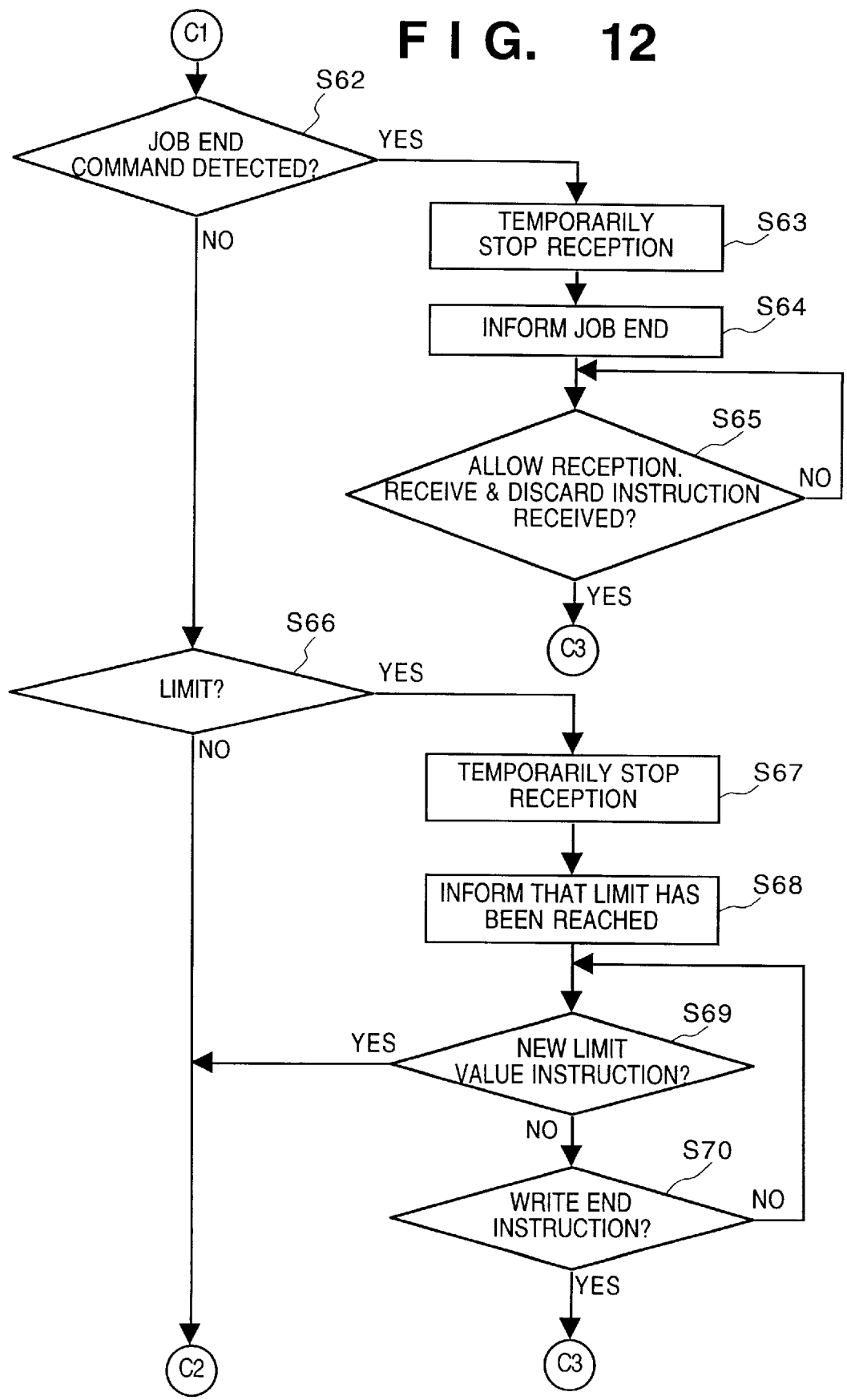
FIG. 12 is a flow chart showing the operation of the reception unit.

FIGS. 11 and 12 are flow charts for explaining the operation of the reception unit 6. The operation of the reception unit 6 has already been mentioned in FIGS. 9 and 10 upon describing the operation of the reception management program 51, but will be described in detail below using the flow charts. Although the reception unit 6 is a hardware circuit and is different from a normal program, its operation order will be described below with the aid of the flow charts.

The reception unit 6 starts operation simultaneously when the power switch of the printer 2 is turned on. In step S51, the unit 6 temporarily stops reception. More specifically, the reception unit 6 sets the printer 2 busy to deny data transfer from the host 1. Thereafter, in step S52, the reception unit 6 waits for an instruction of the limit value of the write position on the reception buffer 10 from the reception management program 51. Upon receiving the instruction, in step S53 the reception unit 6 is set in a state wherein it can receive data from the host 1 but discards the received data.

It is then checked in step S54 if the user has turned off the power switch of the printer 2. If YES in step S54, the reception unit 6 ends its operation. If NO in step S54, it is checked in step S55 if a job start command 31 is detected from the received data. If NO in step S55, the flow returns to step S54 to wait for the job start command 31 from the host 1.

If YES in step S55, the unit 6 temporarily stops reception in step S56, and supplies information indicating detection of the job start command 31 to the reception management program 51 in step S57. That is, reception is temporarily stopped by setting the printer 2 busy to deny data reception from the host 1.

In step S58, the reception unit 6 waits for a write start instruction to the reception buffer 10 from the reception management program 51. Upon detecting that instruction, the unit 6 starts and continues reception and write of data received from the host 1 onto the reception buffer 10 in step S59. It is checked in step S60 if a page start command 32 is detected. If YES in step S60, the unit 6 supplies detection information of the page start command 32 to the reception management program 51 in step S61. At this time, the reception management program 51 records the page position of the received document in the page management table 13. After step S61, the flow returns to step S59 to execute the data reception and write.

On the other hand, if NO in step S60, it is checked in step S62 if a job end command 36 is detected. If YES in step S62, the unit 6 temporarily stops reception in step S63, and supplies detection information of the job end command 36 to the reception management program 51 in step S64. At this time, the reception management program 51 records the end of the job on the page management table 13.

Subsequently, in step S65, the reception unit 6 waits for an instruction that allows reception but discards received data from the reception management program 51. Upon receiving the instruction, the flow returns to step S53 to wait for a job start command 31 of the next document.

If NO in step S62, it is checked in step S66 if the write position on the reception buffer 10 has reached the limit value. If YES in step S66, the unit 6 temporarily stops reception in step S67, and supplies information indicating that the write position on the reception buffer 10 has reached the limit value to the reception management program 51 in step S68.

It is then checked in step S69 if an instruction of a new limit value of the write position on the reception buffer 10 is received from the reception management program 51. If NO in step S69, it is checked in step S70 if a write end instruction is received from the reception management program 51. If NO in step S70, the flow returns to step S69 to form a loop. More specifically, the reception unit 6 waits for an instruction of a new limit value or write end instruction from the reception management program 51. Note that it is determined in step S70 that the write end instruction is received from the reception management program 51 when an error has arisen from too large data for one page that cannot be stored in the reception buffer 10 even when all the areas of the reception buffer 10 are used.

If NO in step S69, the flow returns to step S59 to continue the data reception and write. If YES in step S70, the flow returns to step S53, and thereafter, the subsequent data are received but discarded until the next job start command 31 is received. That is, a job of the document that has caused the error due to too large data is discarded.

On the other hand, if NO in step S66, the flow returns to step S59 to continue the data reception and write to the reception buffer.

(Interpreter Program)

Figure 13:
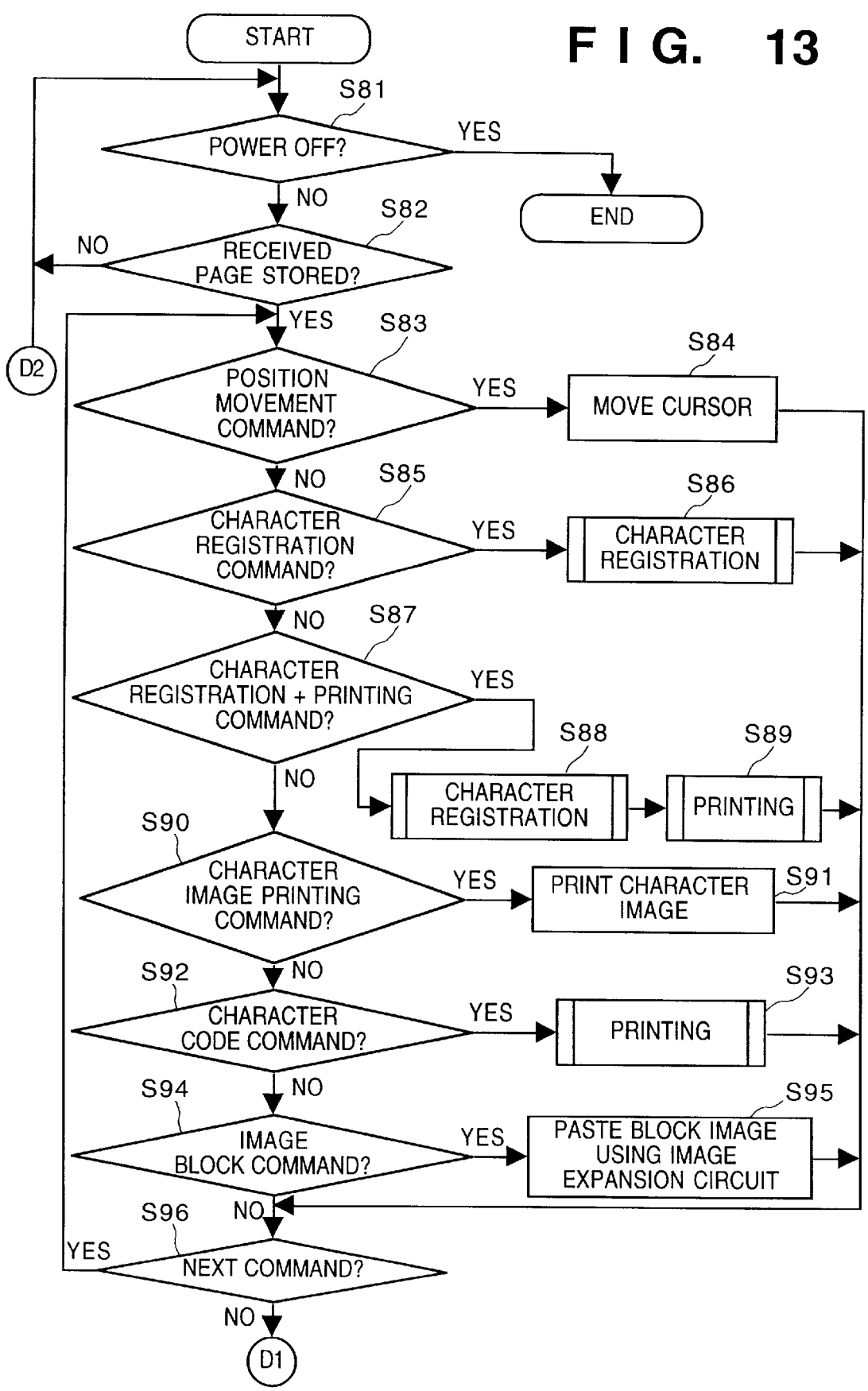
FIG. 13 is a flow chart showing the operation of an interpreter program.
Figure 14:
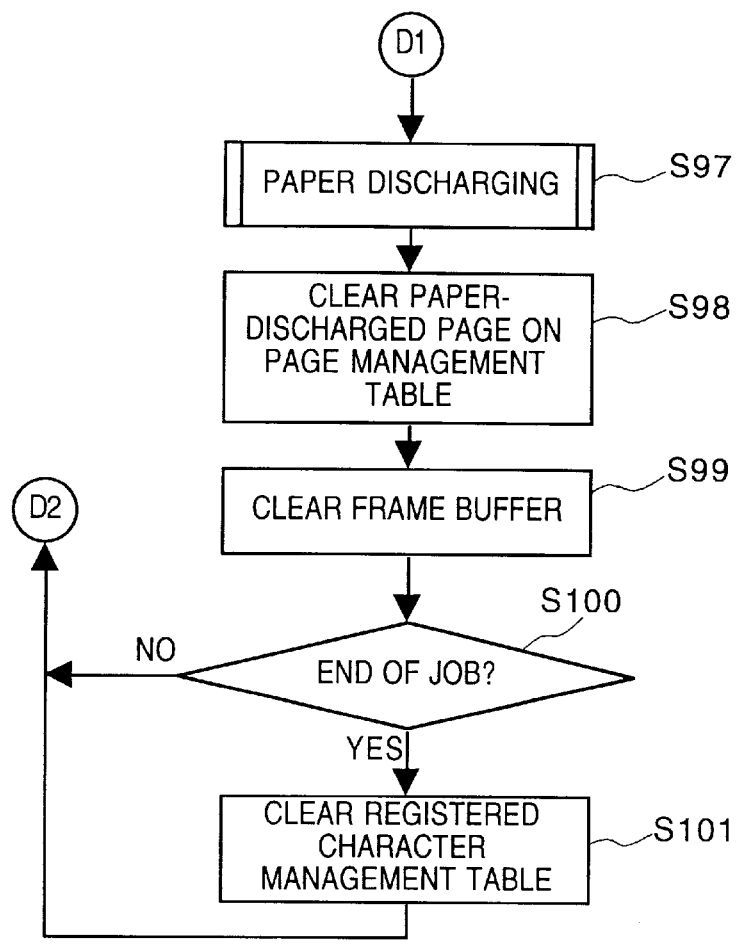
FIG. 14 is a flow chart showing the operation of the interpreter program.

FIGS. 13 and 14 are flow charts for explaining the operation of the interpreter program 52. The interpreter program 52 is started upon power ON of the printer 2, and interprets print commands in the reception buffer 10 written by the reception unit 6.

In step S81, the program checks if the user has turned off the power switch of the printer 2. If YES in step S81, this program ends its processing. If NO in step S81, the program checks in step S82 if the reception buffer 10 stores the received data for one page. If NO in step S82, the flow returns to step S81 to form a loop, thus waiting for reception of data from the host 1. In step S82, the program checks the presence/absence of received page data by looking up the page management table 13. The page management table 13 is managed by the reception management program 51, as has been described above with the aid of FIGS. 9 and 10.

If YES in step S82, the program interprets and processes print commands in that page in turn. The program checks in step S83 if the first command is a position movement command 33. If YES in step S83, the program moves the cursor in step S84. The "cursor" herein is an imaginary pointer that indicates the mapping position of interest of a character or image on the frame buffer 11. More specifically, this "cursor" is assured as variables indicating X- and Y-coordinates on the work area 12. After step S84, the flow jumps to step S96.

If NO in step S83, the program checks in step S85 if the command is a type command 34 of type 1, i.e., a character registration command. If YES in step S85, character registration is done by the character registration program 53 in step S86 and the flow jumps to step S96. The character registration will be described later with reference to FIG. 15.

If NO in step S85, the program checks in step S87 if the command is a type command 34 of type 2, i.e., a character registration+printing command. If YES in step S87, character registration is done in step S88, and printing is done in step S89. Next, the flow jumps to step S96. The character registration in step S88 is the same as that in step S86 above. The printing in step S89 is done by the printing program 54, and will be described in detail later with reference to FIG. 16.

If NO in step S87, the program checks in step S90 if the command is a type command 34 of type 3, i.e., a character image printing command. If YES in step S90, only printing of a character image is done in step S91 and the flow jumps to step S96.

If NO in step S90, the program checks in step S92 if the command is a type command 34 of type 4, i.e., a character code command. If YES in step S92, printing is done in step S93, and thereafter, the flow jumps to step S96. The printing in step S93 is the same as that in step S89 above.

If NO in step S92, the program checks in step S94 if the command is a type command of type 5, i.e., an image block command. If YES in step S94, in step S95 the program expands compressed image data using the image expansion circuit, and pastes the expanded image block onto the frame buffer 11. The flow then advances to step S96.

After step S84, S86, S89, S91, S93, or S95, or if NO in step S94, the flow advances to step S96. In step S96, the program checks if the received data of that page still include uninterpreted commands. If YES in step S96, the flow returns to step S83 to interpret the uninterpreted commands.

On the other hand, if it is determined in step S96 that no uninterpreted commands remain in that page, paper discharging is done by the paper discharge program 55 in step S97. The paper discharging will be described in detail later with reference to FIG. 17.

The program clears data of the paper-discharged page on the page management table 13 in step S98, and also clears the contents of the frame buffer 11 in step S99. The program then checks in step S100 if paper discharging of all the pages in that job is complete. If NO in step S100, the flow returns to step S81 to wait for data reception of the subsequent pages of the document.

If YES in step S100, the program clears the registered character management table 14 in step S101, and the flow returns to step S81 to wait for data reception of a job of the next document.

In step S98, the program clears page registration on the page management table 13. The reception management program 51 confirms that this area has been cleared, and then instructs the reception unit 6 of a new limit value of the received data write position.

(Character Registration Program)

Figure 15:
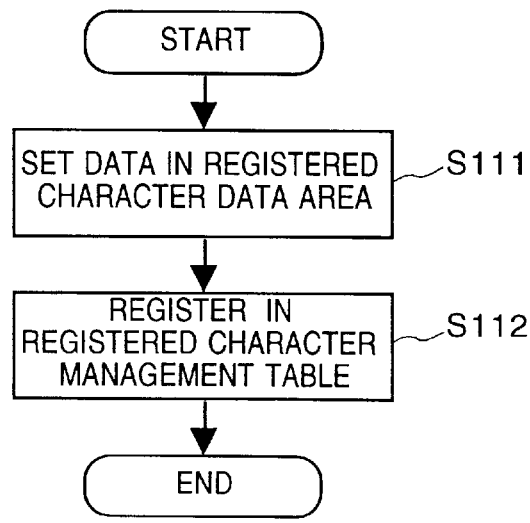
FIG. 15 is a flow chart showing the operation of a registration program.

FIG. 15 is a flow chart for explaining the operation of the character registration program 53 in detail.

This program is called from the interpreter program 52. In step S111, the program transfers compressed character dot image data to the registered character data area 15. After that, the program records the registration address, font number, character code, and the like in the registered character management table 14 in step S112, thus ending the processing.

(Printing Program)

Figure 16:
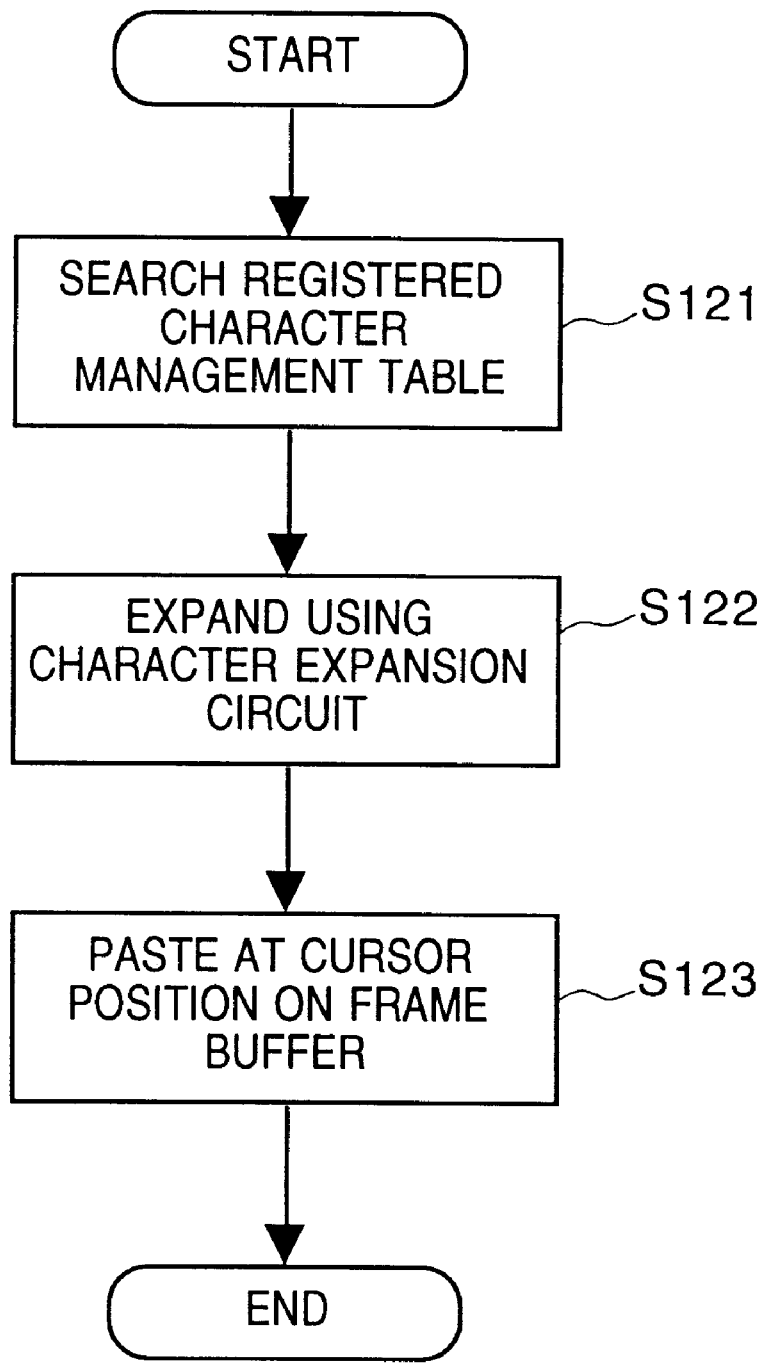
FIG. 16 is a flow chart showing the operation of a printing program.

FIG. 16 is a flow chart for explaining the operation of the printing program 54 in detail. This program is also called from the interpreter program 52.

In step S121, the program acquires the address of a registered character which has a font number matching the received font number 41 and a character code matching the received character code 42 from the registered character data area 15. The program expands the compressed dot image at that address using the character expansion circuit 17 in step S122, and pastes the expanded character dot image at the cursor position on the frame buffer 11 in step S123. Then, the processing of this program ends.

(Paper Discharge Program)

Figure 17:
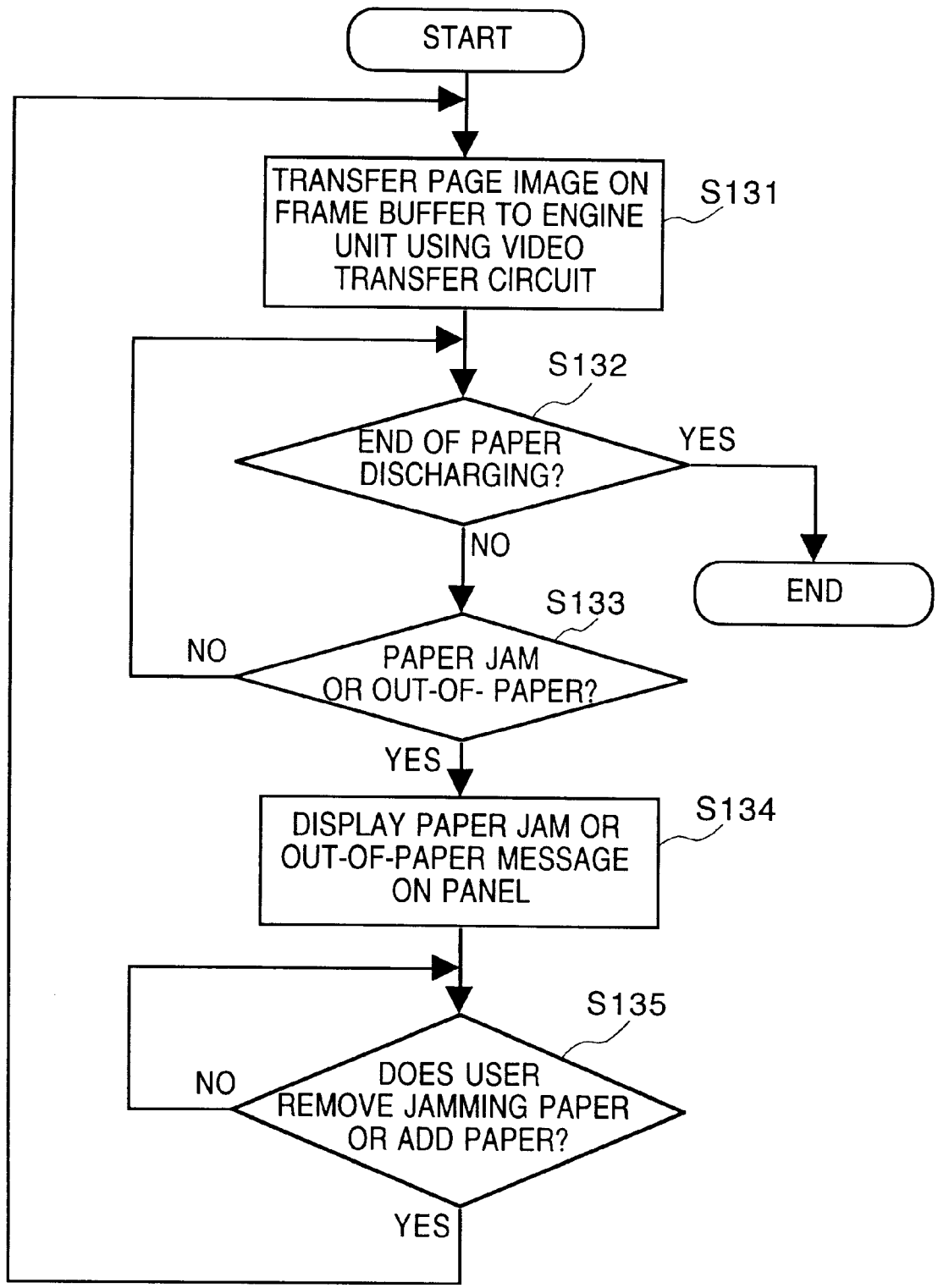
FIG. 17 is a flow chart showing the operation of a paper discharge program.

FIG. 17 is a flow chart for explaining the operation of the paper discharge program 55 in detail. This program is also called from the interpreter program 52.

In step S131, an image for one page on the frame buffer 11 is converted into a video signal by the video transfer circuit 7, and the video signal is supplied to the engine unit 4. In step S132, it is kept checked if discharging of a paper sheet subjected to printing by the engine unit is certainly complete. If YES in step S132, the processing of this program ends. On the other hand, if NO in step S132, it is checked if a "paper jam" or "out-of-paper" error has occurred in the printer 2. If neither of these errors have occurred, the flow returns to step S132 to form a loop, thus monitoring completion of paper discharging.

If a "paper jam" or "out-of-paper" error has occurred, a message indicating "paper jam, remove jamming paper" or "out-of-paper, refill paper sheets" is displayed on the panel of the printer in step S134. After that, the program waits in step S135 until the user removes the jamming paper sheet or refills paper sheets. If YES is determined in step S135, the flow returns to step S131 to output a video signal for an identical page again and to wait for completion of paper discharging.

<Effects Unique to First Embodiment>

With the above-mentioned arrangement, the printing system of this embodiment can provide the following unique effects.

(1) In this embodiment, the CPU of the controller unit 3 does not require any high-performance processor since it performs memory management and transfer of registered character data only, thus reducing the manufacturing cost. Data reception and write to the memory, expansion of compressed data, output of a video signal, and the like are done by hardware circuits. For this reason, as compared to a host-based printer premised on image transfer alone, an increase in cost can be minimized.

(2) Since the host is nearly free from any mapping of character images, the processing time of the printer driver on the host can be shortened. A host-based printer or the like to which all data must be sent as image data as well as character data requires a long character mapping time of the host. However, according to this embodiment, the time required for printing in the host can be shortened.

(3) Since most of characters can be sent as character codes, the quantity of data to be transferred to the printer can be reduced. A host-based printer or the like to which all data must be sent as image data as well as character data must support transfer of a huge amount of data to the printer. For this reason, the time required for printing can be shortened.

(4) Since the controller unit has a frame buffer for one page, and printing onto a paper sheet is started upon completion of mapping of characters and images for one page onto the frame buffer, no overrun errors as a problem unique to a printer premised on band processing occur.

(5) A host-based printer has a small reception buffer, and the host must successively send an image divided into bands to the printer. In this case, since the host gives top priority to data transfer, other application programs on the host may be locked. However, in this embodiment, since the controller unit has the frame buffer for one page, and printing onto a paper sheet is started upon completion of mapping of characters and images for one page onto the frame buffer, no locking or the like on the host occurs.

[Second Embodiment]

A printing system of the second embodiment will be described below with reference to the accompanying drawings.

<System Arrangement>

In the first embodiment, character and image data are mapped onto the frame buffer 11 on the RAM 9, and are then transferred to the engine unit 4 as a video signal. However, in the second embodiment, unlike in the first embodiment, character and image data are alternately mapped onto two band memories on the RAM 9, and are transferred to the engine unit 4 as a video signal.

Figure 18:
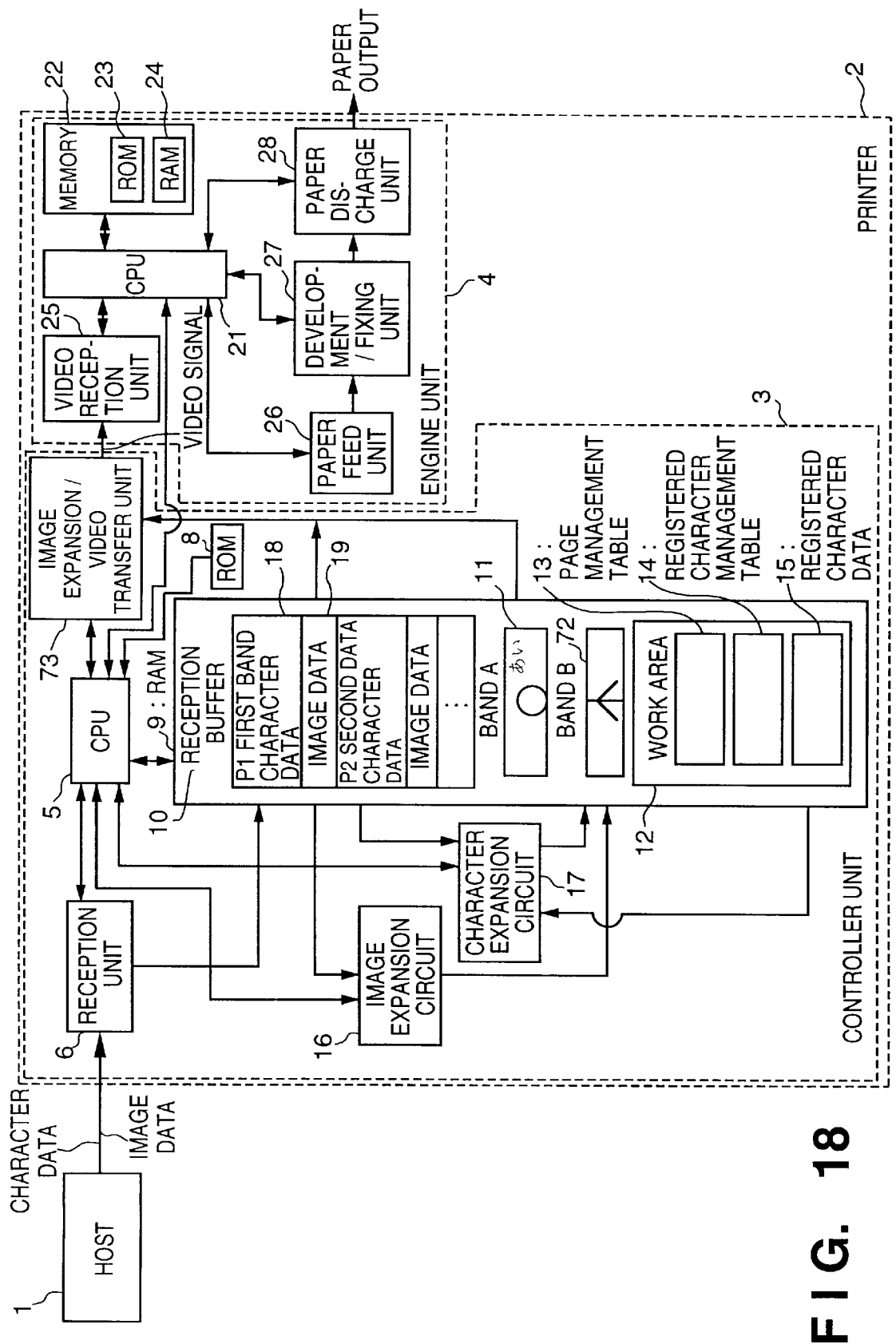
FIG. 18 is a block diagram showing the arrangement of the overall system according to the second embodiment.

FIG. 18 is a block diagram for explaining the arrangement of the entire system. Since most of components are the same as those described in FIG. 1, only differences will be explained below.

Bands A 71 and B 72 are allocated as two band memories on the RAM 9 in place of the frame buffer 11, and an image expansion/video transfer circuit 73 replaces the video transfer circuit 7. The image expansion/video transfer circuit 73 alternately converts memory images on the bands A 71 and B 72 into video signals, and transfers the converted video signals to the engine unit 4. As another function of the circuit 73, when data for a certain band sent from the driver is that for a blank band, a video signal for that portion is not transferred. As still another function of the circuit 73, when compressed image data for a certain band sent from the driver includes a single image block alone, the compressed image block is not mapped onto the band but is expanded to image data and is converted into a video signal to be transferred to the engine unit 4. That is, the circuit 73 has three different functions.

In data stored in the reception buffer 10 in the first embodiment, character and image data are arranged in units of pages. However, in this embodiment, a page is divided or segmented into 16 bands, and in each band, character and image data are arranged. Of course, the printer driver on the host 1 outputs data in such arrangement to the printer 2.

Figure 19:
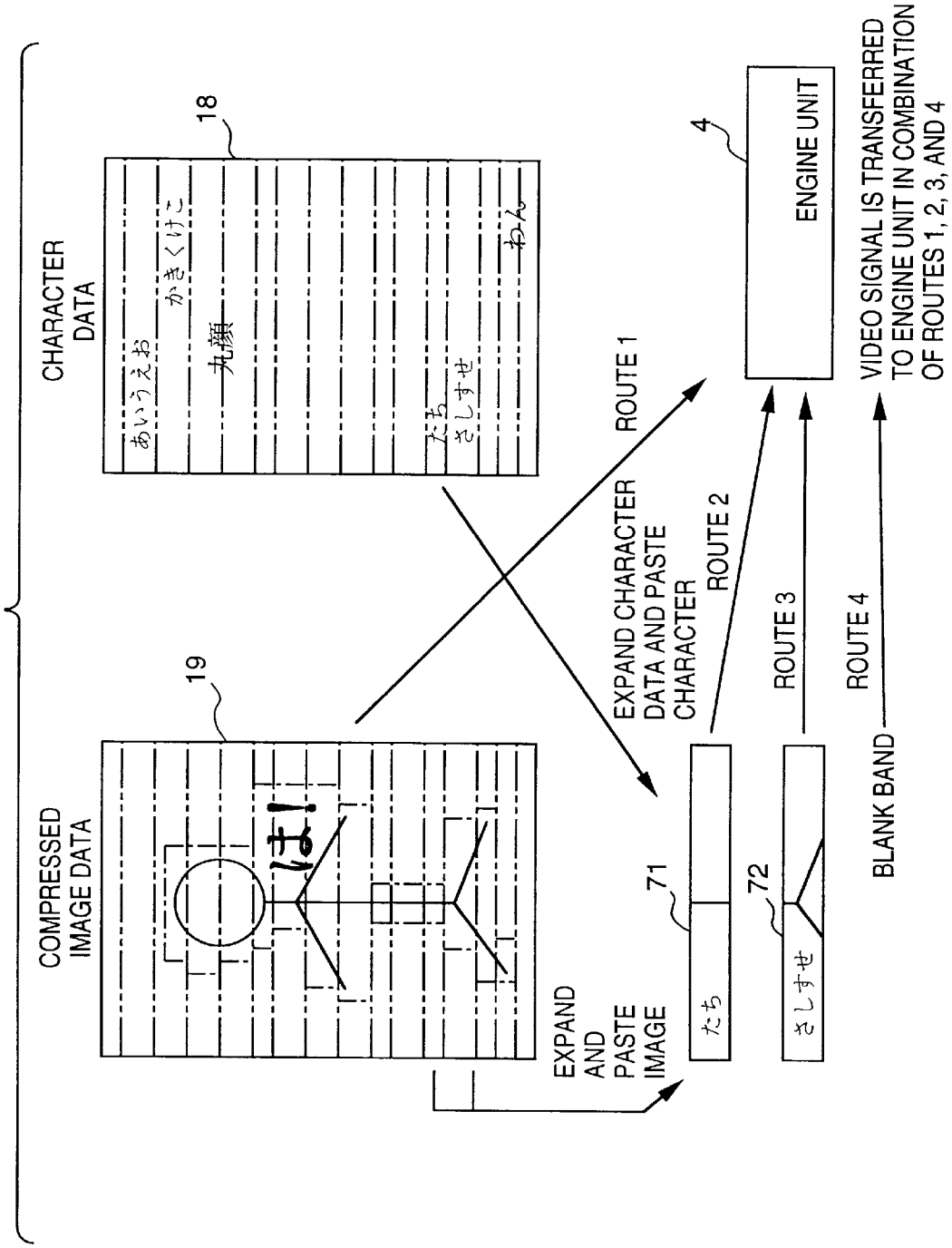
FIG. 19 is an explanatory view of the principle of band processing of a controller unit.

FIG. 19 is an explanatory view of the principle of video signal output of image and character data in the controller unit 3. Image and character data are transferred to the engine unit 4 via four routes. The first route is that for bands of image data alone without any intermediacy of band memories. When a band of image data alone is expanded, the expanded data is directly transferred to the printer engine. The second and third routes are those of bands including character data. Data for such band is temporarily mapped onto the band A 71 or B 72, and is alternately transferred from these bands to the engine unit. The fourth route is that for a blank band, and no video signal is transferred. In this manner, the four routes are provided in correspondence with the functions of the image expansion/video transfer circuit 73.

As has been partially described in reference to FIG. 18, the driver on the host 1 separates a document to be printed into a character portion, and a portion other than the character portion. The portion other than the character portion is mapped as an image onto the frame buffer on the host 1. The character and image data portions are separately transferred to the printer 2 in units of 16 bands obtained by dividing one page. In this case, as for the character data portion, compressed dot patterns of characters that appear in that portion are sent to and registered in the printer, and a character code sequence is then sent to the printer as print data. As in the first embodiment, a character need only be registered once in each document. Upon completion of printing of one document job, the registered characters are cleared.

The 16 divided bands have an equal height. That is, the bands are equally divided.

As for characters across two bands, their print codes are transferred from the driver to the printer 2 while they belong to these two bands.

A large character is mapped as an image, and the image is transferred from the driver to the printer 2. The character size that can be processed by the character expansion circuit 17 is limited, and a character larger than that limit is processed as an image, as described above.

An image mapped on the frame buffer on the host 1 is divided into 16 bands, and only a rectangular portion actually including an image is extracted from each band. The rectangular portion is compressed, and is transferred as a single image block from the driver to the printer 2. In FIG. 19, only portions bounded by dotted lines of image data are actually transferred as image blocks.

When a certain band includes both an image block and character data, the controller unit 3 of the printer 2 expands received compressed image data 19 using the image expansion circuit 16, and maps it onto the band A 71 or B 72. Also, the unit 3 expands registered compressed dot image data in units of character codes included in received character data 18, and maps the expanded image data onto the band A 71 or B 72. The character and image data are ORed, and the OR of these data is written on the band.

Note that data for odd bands is mapped onto the band A 71, and data for even bands is mapped onto the band B 72.

Upon completion of mapping of character and image data onto the band A 71, a video transfer instruction to the engine unit 4 is input to the image expansion/video transfer circuit 73. During output of a video signal from the circuit 73, character and image data are mapped onto the band B 72. When mapping onto the band B 72 has ended, and the previously instructed video output from the band A 71 has ended, a video signal output instruction of the band B 72 is input to the image expansion/video transfer circuit 73. Then, mapping of character and image data onto the band A 71 is started.

As described above, printing for one page is done by mapping of character and image data onto the two band memories, and output of video signals from these memories. Data for a band including characters only is mapped and printed by the similar process described above.

In case of a blank band including neither character nor image data, the image expansion/video transfer circuit 73 stops transfer of the video signal to the engine unit 4 for a duration corresponding to the height of one band.

If data for a certain band includes an image block alone, a data expansion instruction of the image block and video signal output instruction to the engine unit 4 are input to the image expansion/video transfer circuit 73. That is, a video signal is directly transferred to the engine unit 4 without image mapping onto the band memory.

FIG. 19 illustrates that video signals are output via the above-mentioned four routes. Printing for one page is done by a combination of these routes.

Figure 20:
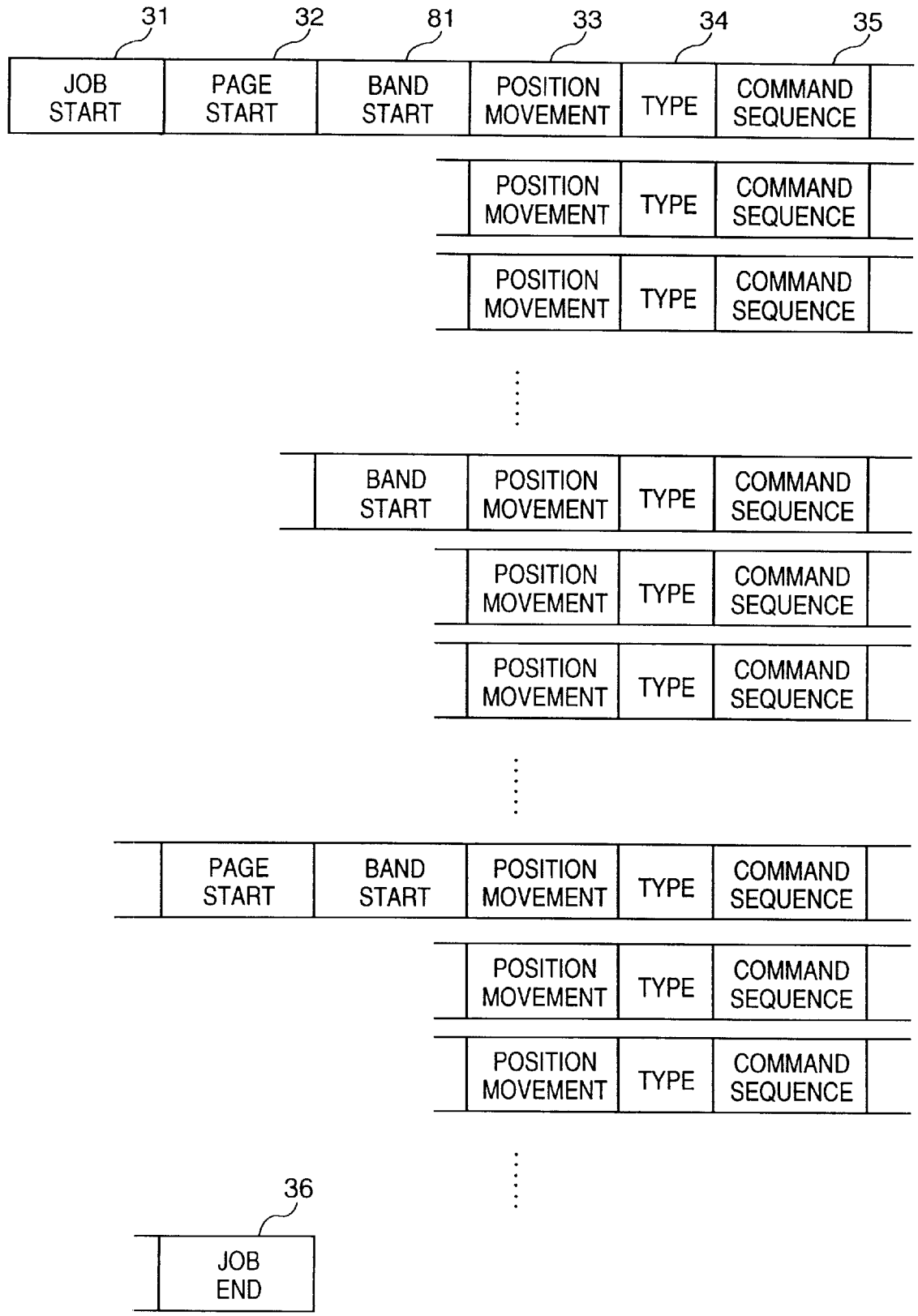
FIG. 20 is an explanatory view of the command structure.

FIG. 20 is an explanatory view of the command structure of character and image data to be sent from the host 1 to the printer 2. The difference from FIG. 3 of the first embodiment is that a band start command 81 is inserted after a page start command 32.

Sixteen band start commands 81 repetitively appear per page. The band start command 81 is issued even for a band including neither character nor image data.

Note that the structures of command sequences 35 in units of type commands 34 are the same as those in FIG. 4 of the first embodiment, and a detailed description thereof will be omitted.

Figure 21:
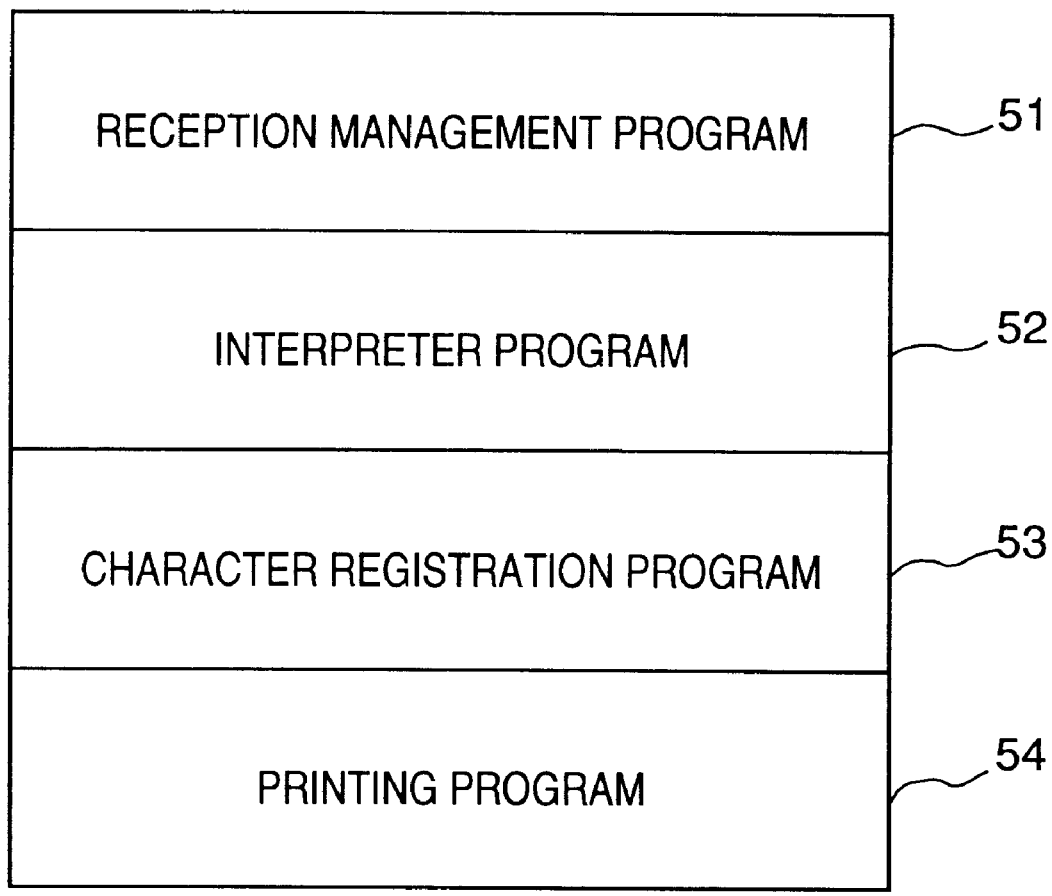
FIG. 21 is a view showing programs installed in a ROM.

FIG. 21 is a view for explaining programs installed in the ROM 8 of the controller unit 3. The paper discharge program 55 installed in the first embodiment is omitted from FIG. 21, but the interpreter program 52 executes interpretation and video output in units of bands, and paper discharging. The reception management program 51 and character registration program 53 are the same as those in the first embodiment, but the operations of the interpreter program and printing program 54 will be described in detail later with reference to the flow charts.

In the first embodiment, the positional relationship among the pointers while a write of received data is in progress in the reception buffer 10 has been described with reference to FIGS. 6A and 6B. In the second embodiment as well, a write to the reception buffer is done in the same manner as in the first embodiment, and a detailed description thereof will be omitted.

The work area 12 includes the page management table 13, registered character management table 14, registered character data area 15, and the like, and a detailed description thereof will be omitted since they are the same as those in the first embodiment.

<Control Procedure of System>

The operations according to the second embodiment of the present invention will be described below with reference to the flow charts.

Figure 22:
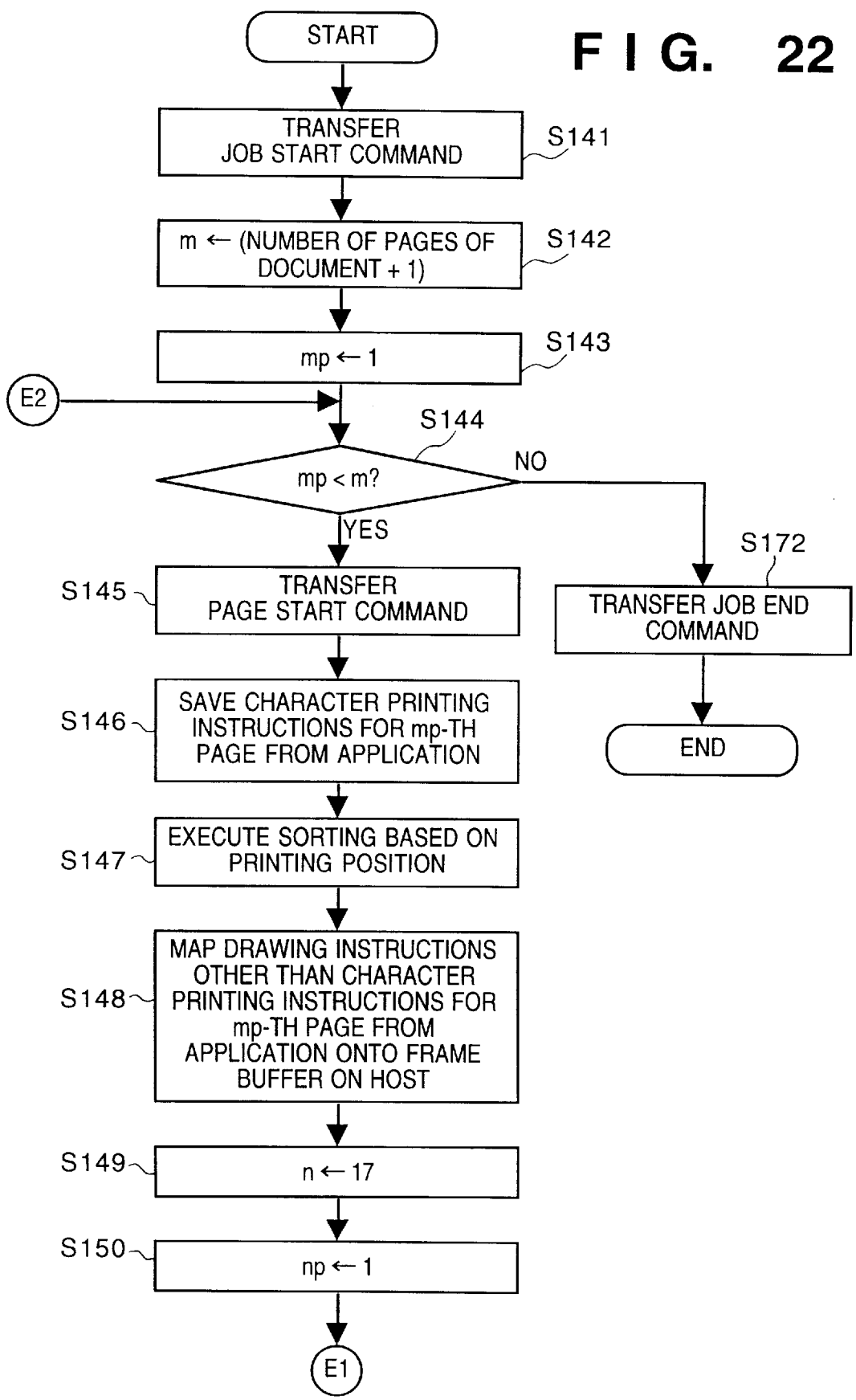
FIG. 22 is a flow chart showing the operation of a printer driver.
Figure 23:
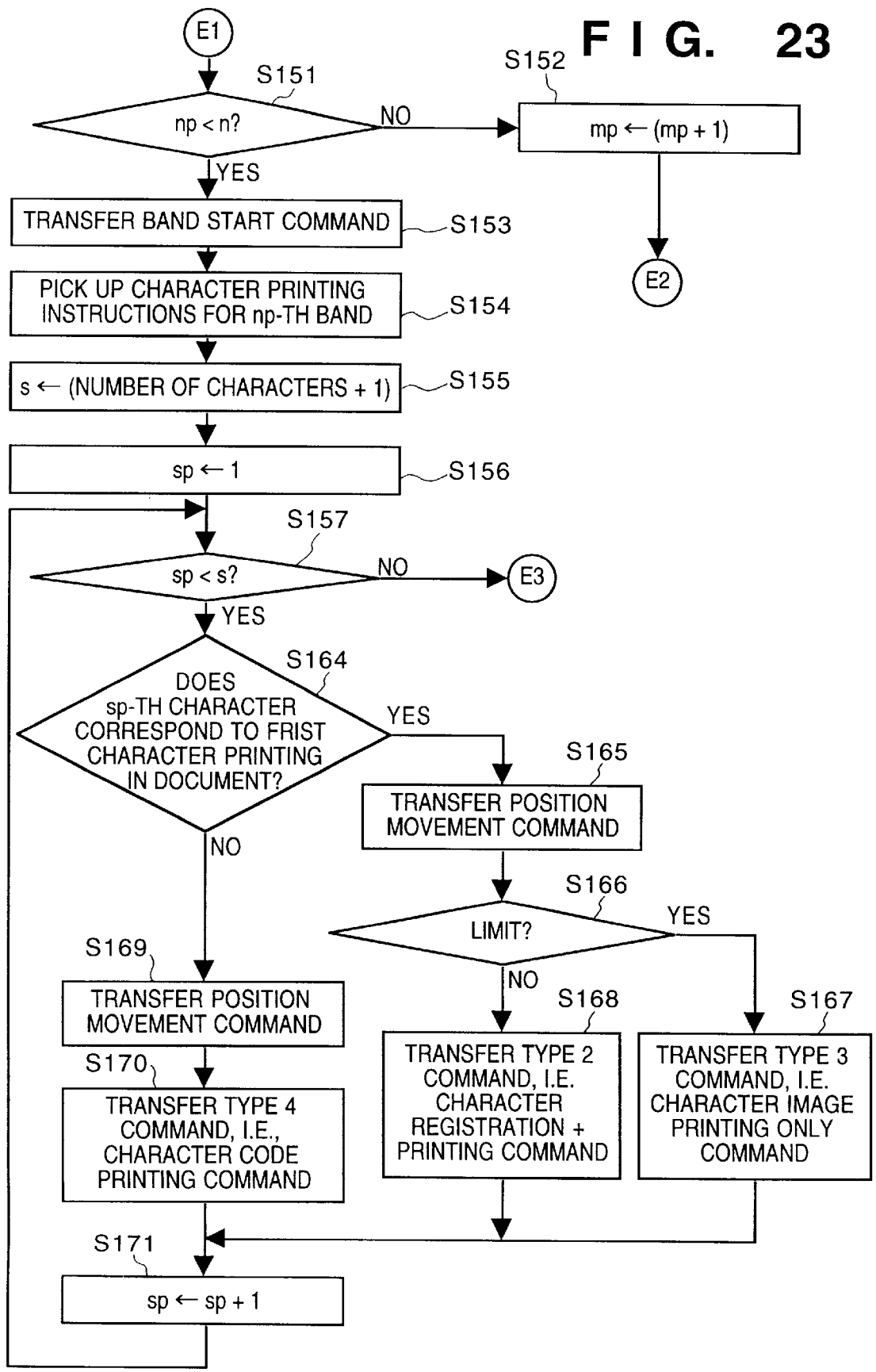
FIG. 23 is a flow chart showing the operation of the printer driver.
Figure 24:
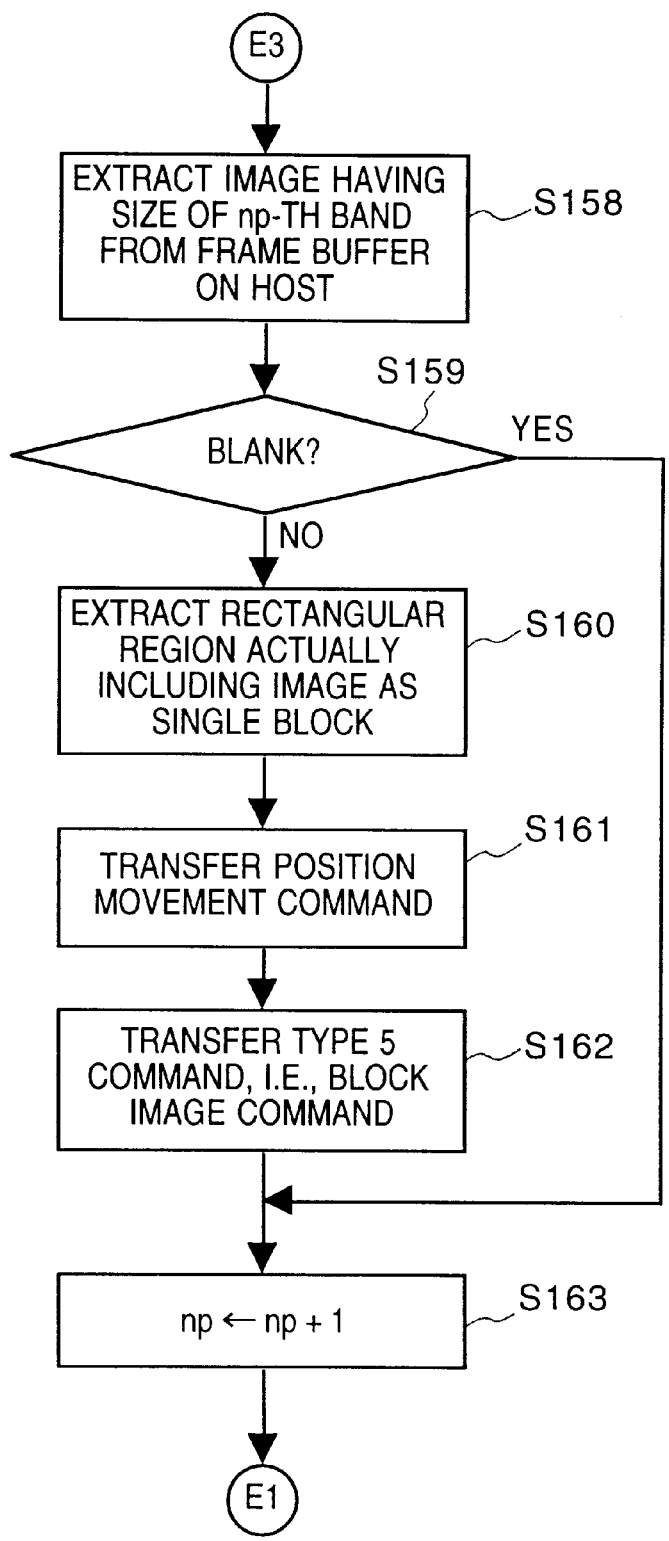
FIG. 24 is a flow chart showing the operation of the printer driver.
Figure 25:
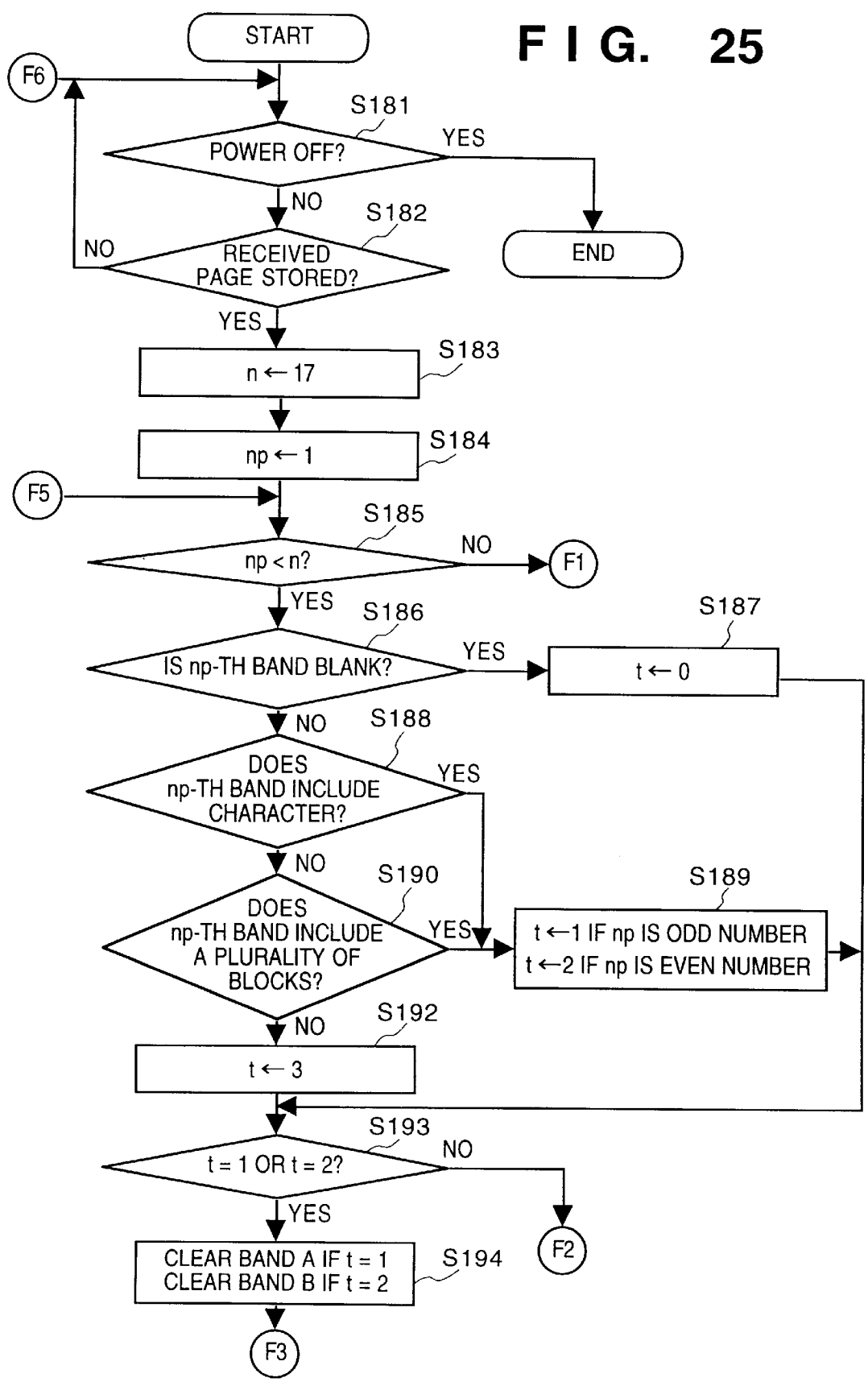
FIG. 25 is a flow chart showing the operation of an interpreter program.
Figure 26:
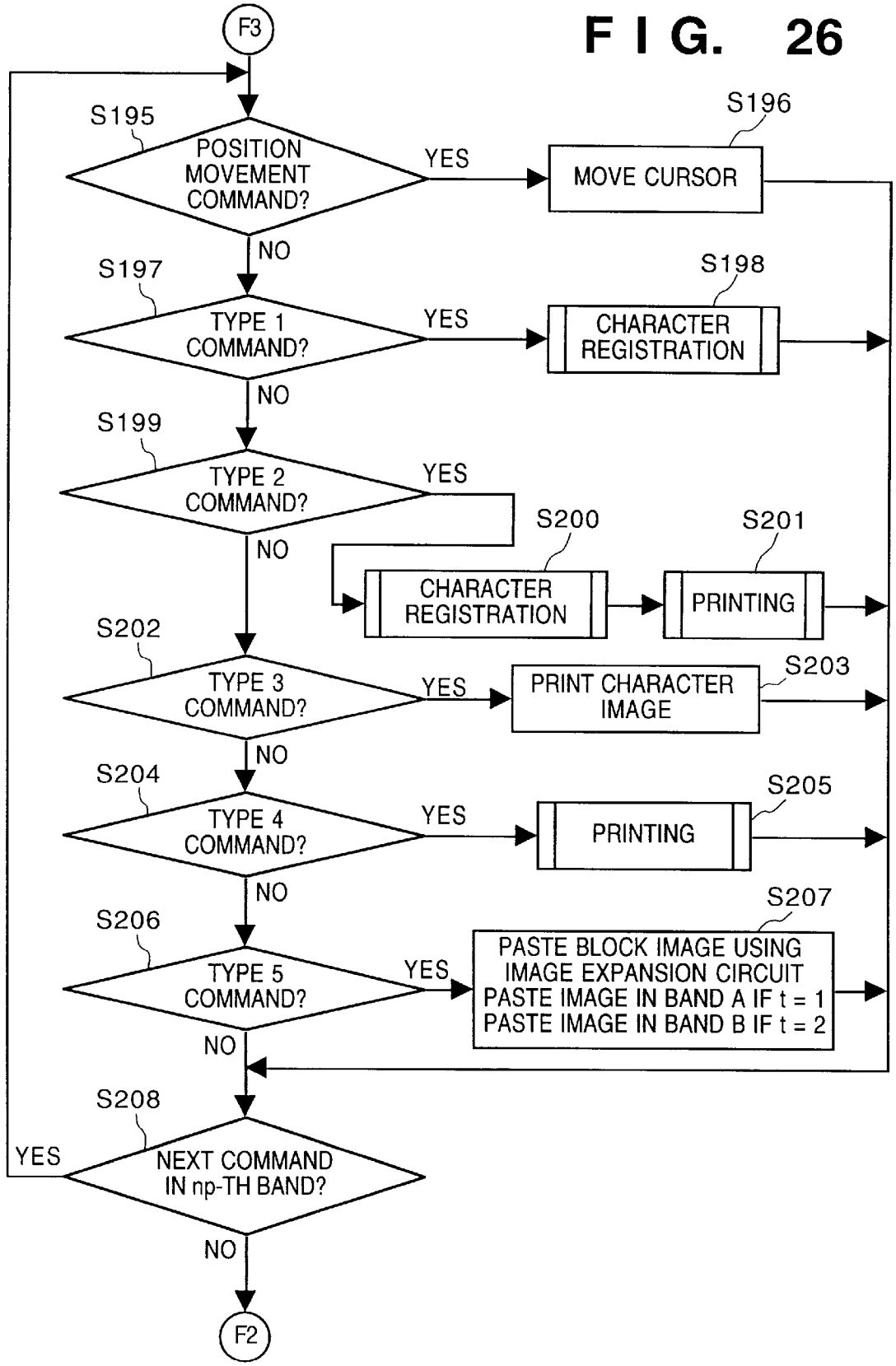
FIG. 26 is a flow chart showing the operation of the interpreter program.

FIGS. 22 to 24 are flow charts for explaining the operation of the printer driver on the host 1. The printer driver generates character and image printer commands described above with the aid of FIG. 20 from document data created by an application software program used by the user, and transfers them to the printer 2. When the user instructs document printing from the application software program, the printer driver is started in the host 1.

At the time of starting, the driver assures a frame buffer for one page (not shown) on a memory of the host 1 and clears the frame buffer at the same time. Upon completion of document printing by the driver, the memory area used as the frame buffer is released.

The driver transfers a job start command 31 to the printer 2 in step S141, sets, in a variable m, a value obtained by adding 1 to the number of pages of the document to be printed in step S142, and sets 1 in a variable mp indicating the page number of interest in step S143. The driver then checks in step S144 if the variable mp is smaller than the variable m. If NO in step S144, since processing of all the pages of the document is complete, the driver transfers a job end command in step S172, thus ending its processing.

On the other hand, if YES in step S144, the driver transfers a page start command 32 to the printer 2 in step S145, saves character printing instructions of the mp-th page from the application program in step S146, and sorts the saved character printing instructions based on their print positions in step S147. Henceforth, the driver maps drawing instructions other than the character printing instructions of the mp-th page from the application program onto the frame buffer on the host 1 in step S148. The drawing instructions other than the character printing instructions include ruled line and figure drawing instructions, image paste instruction, and the like.

In sorting of the character printing instructions based on their printing positions in step S147, the character printing instructions are sorted based on their printing positions in the longitudinal direction of a paper sheet, and are then sorted based on their printing positions in the widthwise direction of the paper sheet. With this sorting, the character printing instructions are sorted so that their instructed printing positions are arranged in turn from the upper left position to the lower right position on a vertically elongated paper sheet.

Subsequently, the driver sets 17 in a variable n in step S149. The value "17" is obtained by adding 1 to a value "16" which means that the paper size is equally divided into 16 bands in its longitudinal direction. Hence, if the number of bands is other than 16, the value to be set in n is determined accordingly. In step S150, the driver sets 1 in a variable np indicating the band number of interest. The driver then checks in step S151 if the variable np is smaller than the variable n. If NO in step S151, since it indicates that the processing for 16 band of one page is complete, the contents of the variable mp are incremented by 1, and the flow returns to step S144 to start band output processing of the next page.

If YES in step S151, the driver transfers a band start command 81 to the printer 2 in step S153, and picks up character printing instructions included in the np-th band from the saved printing instructions from the application program in step S154. The driver then sets a value obtained by adding 1 to the number of picked-up characters in a variable s in step S155, and also sets 1 in a variable sp indicating the position of the character of interest in one band in step S156.

Note that the character printing instructions to be picked up in step S154 include those of characters which are included in the np-th band albeit partially. Hence, some characters are printed across two bands depending on their printing positions.

The driver checks in step S157 if the variable sp is smaller than the variable s. If NO in step S157, since transfer processing of character data included in the np-th band is complete, the driver starts transfer processing of image data of the np-th band in step S158 and the subsequent steps. That is, the driver extracts an image corresponding to the position and size of the np-th band from the frame buffer on the host in step S158, and checks in step S159 if the np-th band is a blank band. If YES in step S159, the flow jumps to step S163 without any processing.

On the other hand, if NO in step S159, the driver extracts a rectangular region actually including an image as a single block in step S160. The driver transfers a position movement command 33 indicating the paste position of the extracted block to the printer 2 in step S161, and then transfers commands corresponding to type 5, i.e., image block commands 45, 46, 47, and 48, to the printer 2 in step S162. Of course, the image block data is transferred after being compressed.

The driver increments the contents of the variable np by 1 in step S163, and the flow then returns to step S151 to start the next band transfer processing.

If YES in step S157, the driver checks in step S164 if the sp-th character is the first character to be printed in this document. If YES in step S164, the driver transfers a position movement command 33 indicating the printing position to the printer 2 in step S165, and checks in step S166 if the number of registered characters has reached a limit on the printer 2 side. If YES in step S166, the driver transfers commands corresponding to type 3, i.e., character image printing only commands 43 and 44, to the printer 2 in step S167. Next, the flow then advances to step S171.

If NO in step S166, the driver transfers commands corresponding to type 2, i.e., character registration+printing commands 41, 42, 43, and 44, to the printer 2 in step S168, and the flow advances to step S171. Of course, a dot image for each character to be transferred to the printer 2 is compressed.

If NO in step S164, since it indicates that this printing instruction is the second or subsequent printing instruction of that character, the driver transfers a position movement command 33 indicating the printing position to the printer 2 in step S169, and also transfers a type command 34 of type 4, i.e., character code printing commands 41 and 42, to the printer 2 in step S170.

In step S171, the driver increments the contents of the variable sp by 1, and the flow then returns to step S157 to execute transfer processing of the next character data to the printer 2.

FIGS. 25, 26, 27, and 28 are flow charts for explaining the operation of the interpreter program 52. The interpreter program 52 is also started upon power ON of the printer 2, and then executes interpretation of print commands in the reception buffer 10 written by the reception unit 6 and paper discharging.

In step S181, the program checks if the user has turned off the power switch of the printer 2. If YES in step S181, this program ends its processing. If NO in step S181, the program checks in step S182 if received data for one page are stored in the reception buffer 10. If NO in step S182, the flow returns to step S181 to form a loop, thus waiting for reception of data from the host 1.

Figure 8:
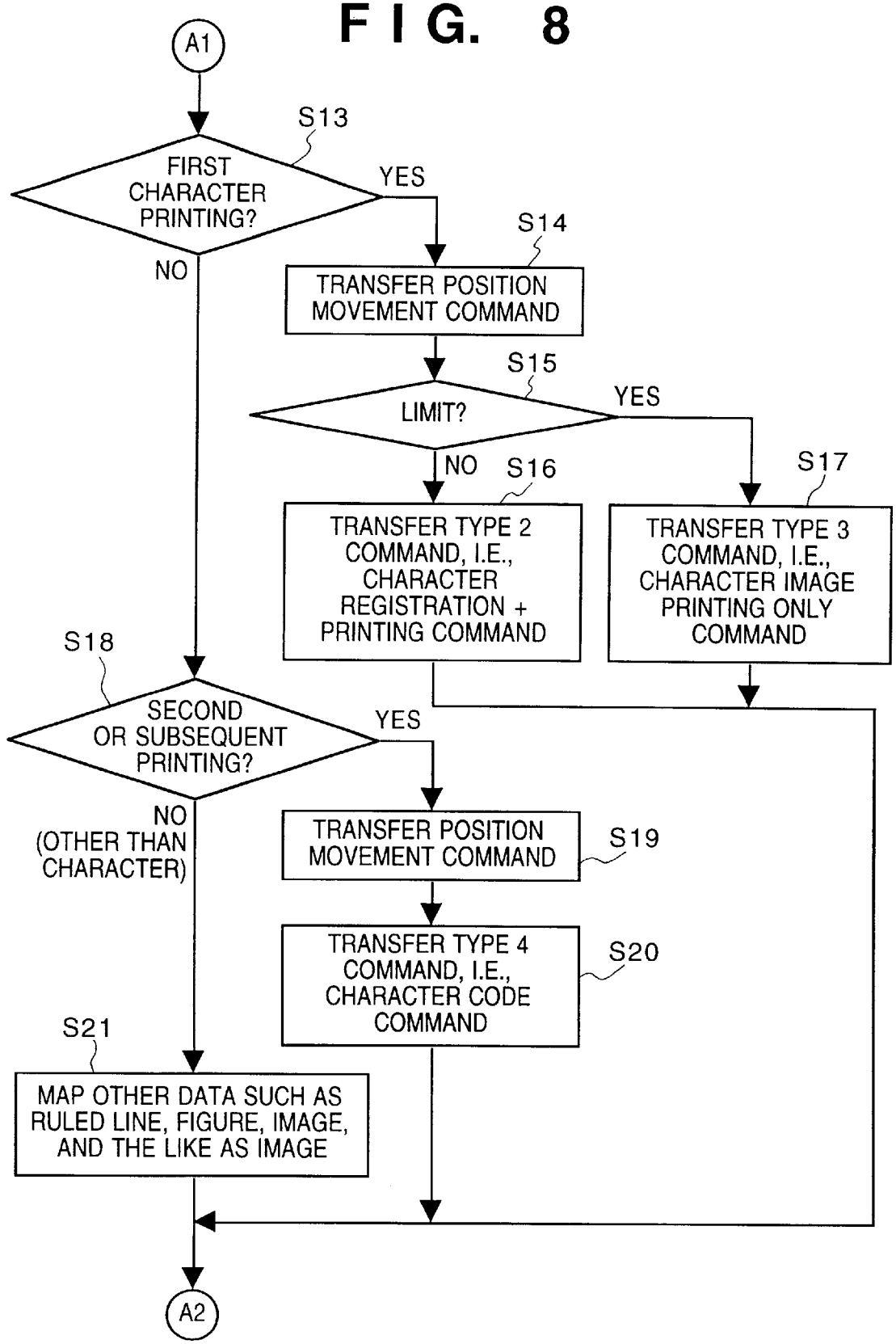
FIG. 8 is a flow chart showing the operation of the printer driver.

Note that the program looks up the page management table 13 in step S182 to check the presence/absence of any received page. The page management table 13 is managed by the reception management program 51 by the operation described above with the aid of the flow chart of FIG. 8 in the first embodiment.

If YES in step S182, the program interprets and processes print commands of that page in turn. In step S183, the program sets "17" in the variable n. The value "17" is obtained by adding 1 to the number "16" of divided bands per page. In step S184, the program sets 1 in the variable np. The program then checks in step S185 if the variable np is smaller than the variable n. If NO in step S185, it indicates that processing of all the bands is complete, and the flow jumps to step S223 to wait for the end of paper discharging.

If YES in step S185, the program checks in step S186 if the np-th band includes neither character data nor image data, i.e., is a blank band. If YES in step S186, after the program sets 0 in a variable t in step S187, the flow jumps to step S193.

If NO in step S186, the program checks in step S188 if data for the np-th band include character data. If YES in step S188, in step S189 the program sets 1 in the variable t if the variable np is an odd number, or sets "2" in the variable t if the variable np is an even number. Thereafter, the flow jumps to step S193.

If NO in step S188, the program checks in step S190 if data for the np-th band include a plurality of image block data. If YES in step S190, in step S189 the program sets 1 in the variable t if the variable np is an odd number, or sets "2" in the variable t if the variable np is an even number. Next, the flow jumps to step S193. Note that more than one image blocks are never present in a single band in the operation of the driver described above with reference to FIG. 22.

If NO in step S190, it indicates that a single image block is present as data for the np-th band, and the program sets 3 in the variable t in step S192. The flow then advances to step S193.

The program checks in step S193 if the variable t is 1 or 2. If YES in step S193, the program interprets character and image block data included in the np-th band in turn from the head data and maps them onto the bands A 71 and B 72 in step S194 and the subsequent steps. In step S194, the program clears the band A 71 if the variable t is 1 or clears the band B 72 if the variable t is 2. The program then checks in step S195 if the command to be interpreted is a position movement command 33. If YES in step S195, the program moves a cursor in step S196. The "cursor" is an imaginary pointer that indicates the mapping position of a character or image on the band memory. More specifically, this "cursor" is assured as variables indicating X- and Y-coordinates on the work area 12. The cursor position has the upper left end of each band as an origin. The position movement command 33 sent from the driver is transferred on the basis of the relative position that assumes the upper left end of each band as an origin. That is, the position movement command 33 does not have the upper left end of a page as an origin. After step S196, the flow jumps to step S208.

If NO in step S195, the program checks in step S197 if the command is a type command 34 of type 1. If YES in step S197, after character registration is done by the character registration program 53 in step S198, the flow jumps to step S208. Since the character registration is the same as that described above with the aid of the flow chart in FIG. 15 of the first embodiment, a detailed description thereof will be omitted.

If NO in step S197, the program checks in step S199 if the command is a type command 34 of type 2. If YES in step S199, character registration is done in step S200, and printing is done in step S201. The flow then jumps to step S208. The character registration in step S200 is the same as that in step S198 above. On the other hand, printing in step S201 is done by the printing program 54, and will be described in detail later with reference to FIG. 29.

If NO in step S199, the program checks in step S202 if the command is a type command 34 of type 3. If YES in step S202, after printing of only a character image is done in step S203, the flow jumps to step S208.

If NO in step S202, the program checks in step S204 if the command is a type command 34 of type 4. If YES in step S204, after printing is done in step S205, the flow jumps to step S208. Note that the printing in step S205 is the same as that in step S201 above.

If NO in step S204, the program checks in step S206 if the command is a type command 34 of type 5. If YES in step S206, in step S207 the program expands compressed image data using the image expansion circuit 16, and pastes the expanded image block to the band 71 or 72. In this case, if the variable t is 1, the program pastes the expanded data onto the band A 71; if the variable t is 2, the program pastes it onto the band B 72. Thereafter, the flow advances to step S208.

After step S196, S198, S201, S203, S205, or S207, or if NO in step S206, the flow advances to step S208. In step S208, the program checks if the received data for the np-th band still include uninterpreted commands. If YES in step S208, the flow returns to step S195 to interpret the uninterpreted commands.

Figure 27:
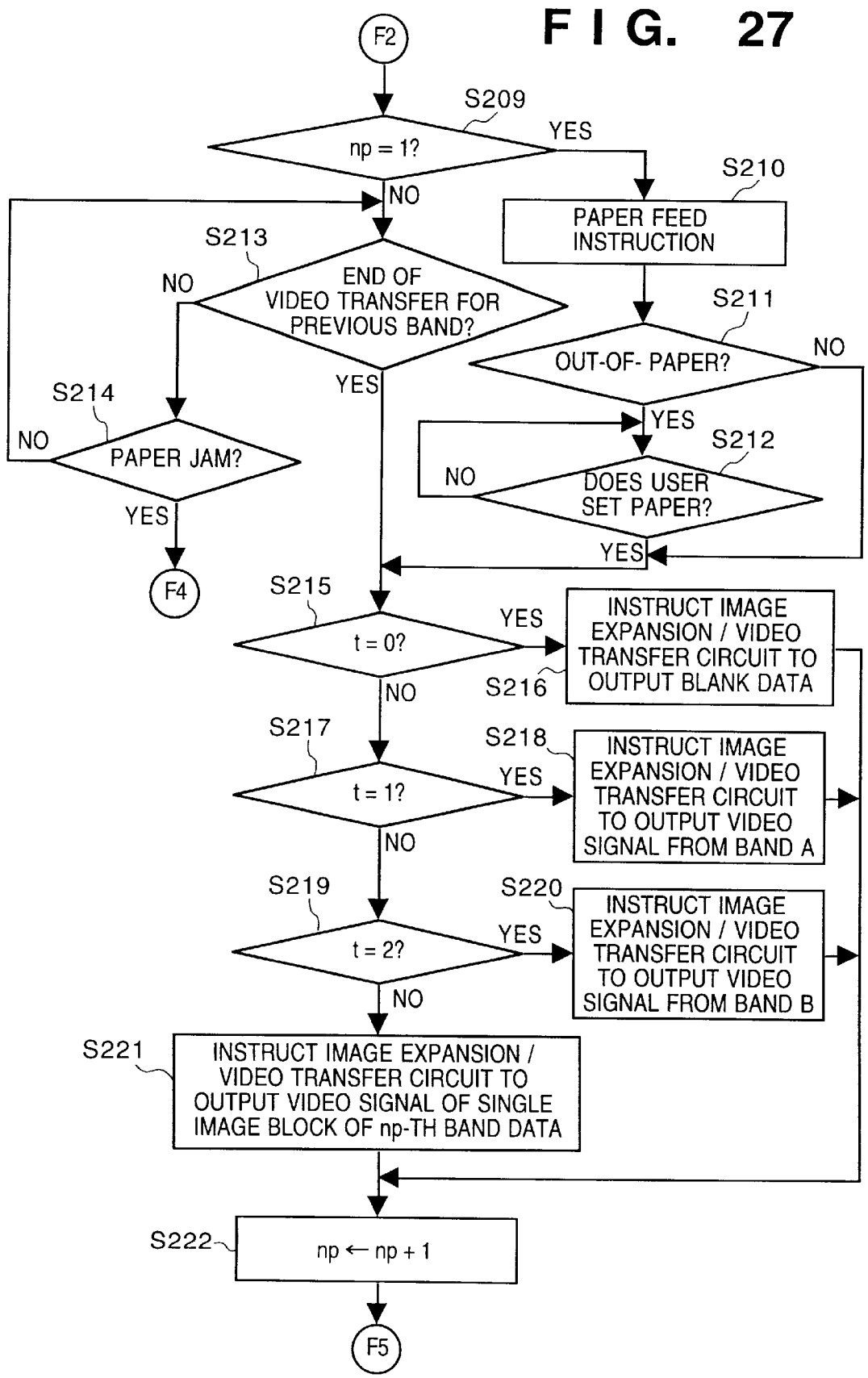
FIG. 27 is a flow chart showing the operation of the interpreter program.
Figure 28:
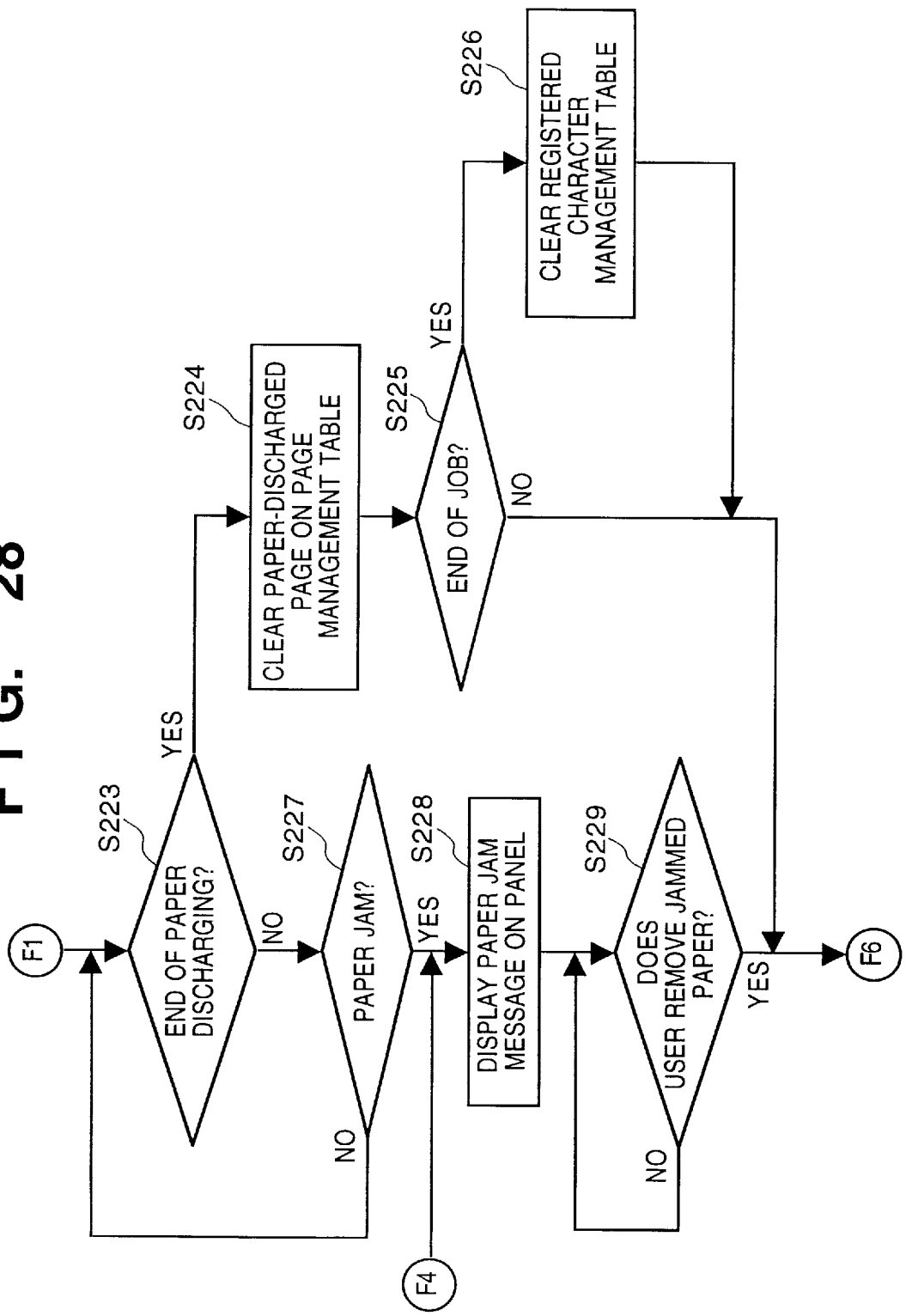
FIG. 28 is a flow chart showing the operation of the interpreter program.

If NO in step S193 or step S208, the flow jumps to step S209 in FIG. 27. In steps S209 to S222, video signal output processing to the engine unit 4 is done in units of bands.

In step S209, the program checks if the variable np is 1. That is, the program checks if the band of interest is the first band of a certain page. If YES in step S209, the program supplies a paper feed start instruction to the engine unit 4 in step S210, and checks in step S211 if the engine unit 4 has detected an out-of-paper state. If YES in step S211, the program waits until the user additionally sets paper sheets in step S212, and thereafter, the flow jumps to step S215. If NO in step S211, i.e., if paper sheets are set, the flow jumps to step S215.

On the other hand, if it is determined in step S209 that the band of interest is not the first band, the program waits for the end of video transfer of data for the previous band in step S213. During waiting, the program always monitors in step S214 if paper jam has occurred. If paper jam has occurred, the flow jumps from step S214 to step S228 to recover from paper jam.

If YES in step S213, i.e., if video transfer of data for the previous band is complete, the program checks in step S215 if the variable t is 0. If YES in step S215, after the program instructs the image expansion/video transfer circuit 73 to output a blank band in step S216, the flow jumps to step S222.

If NO in step S215, the program checks in step S217 if the variable t is 1. If YES in step S217, after the program instructs the image expansion/video transfer circuit 73 to output a video signal from the band A 71 in step S218, the flow jumps to step S222.

If NO in step S217, the program checks in step S219 if the variable t is 2. If YES in step S219, after the program instructs the image expansion/video transfer circuit 73 to output a video signal from the band B 72 in step S220, the flow jumps to step S222.

If NO in step S219, the program instructs the image expansion/video transfer circuit 73 to output a video signal of a single image block included in the np-th band while expanding compressed image data in step S221, and the flow then advances to step S222.

In step S222, the program increments the variable np by 1, and the flow returns to step S185 to start mapping of the next band data onto the band memory and video signal output processing.

If NO in step S185, output processing of all the bands is complete, and the program waits for completion of discharging of the printed paper sheet in step S223 and the subsequent step. In step S223 in FIG. 28, the program checks if paper discharging is complete. If NO in step S223, the program checks in step S227 if paper jam has occurred. If NO in step S227, the flow returns to step S223 to form a loop, thus waiting for completion of paper discharging.

If the program determines in step S223 that paper discharging is complete, the program clears the description of the paper-discharged page on the page management table 13 in step S224, and checks the end of job in step S225 i.e., if all the pages of a single document have been discharged. If YES in step S225, the program clears the registered character management table 14 in step S226, and the flow returns to step S181 to wait for data reception of the next document job.

If NO in step S225, the flow also returns to step S181 to wait for data reception of the subsequent page of that document.

On the other hand, if YES in step S227, the program displays a paper jam message on the panel in step S228, and waits until the user removes the jammed paper sheet in step S229. If the paper sheet has been removed, the flow returns to step S181, and the program re-executes mapping of received page data onto the band, video output, and paper discharging, which have already been done previously.

Note that the program clears page registration on the page management table 13 in step S224. The reception management program 51 confirms that this area has been cleared, and then instructs the reception unit 6 of a new limit value of the received data write position.

Figure 29:
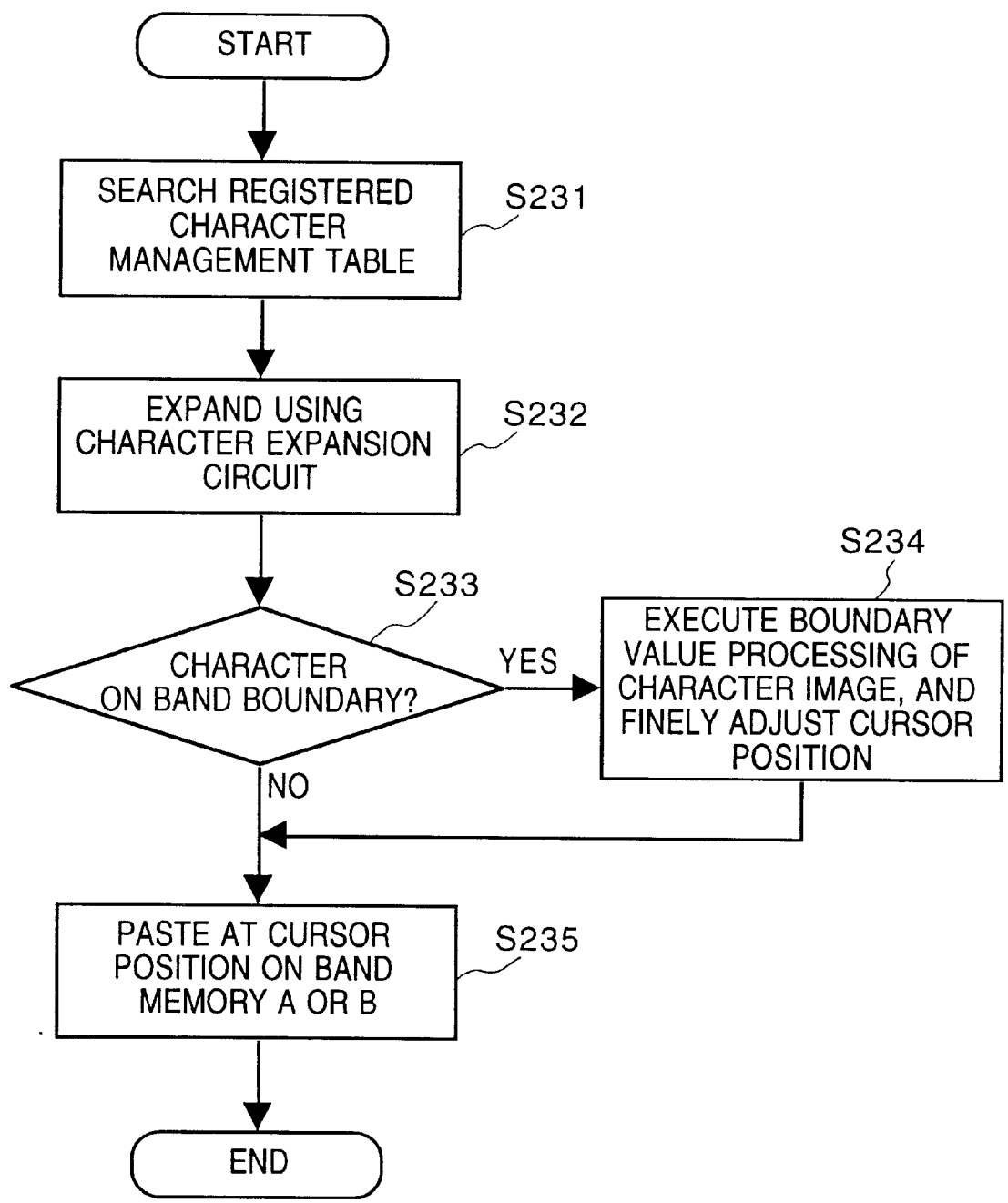
FIG. 29 is a flow chart showing the operation of a printing program.

FIG. 29 is a flow chart for explaining the operation of the printing program 54 in detail. This program is also called from the interpreter program 52.

In step S231, the program searches the registered character management table 14 to acquire the address, of a registered character whose font number and character code match, on the registered character data area 15. In step S232, the program expands compressed dot image data using the character expansion circuit 17. In step S233, the program checks if the character to be pasted is on a band boundary. If YES in step S233, the program executes boundary value processing of a character image and also finely adjusts the cursor position in step S234. Thereafter, the flow advances to step S235. If NO in step S233, the flow also advances to step S235.

In the boundary value processing in step S234, only a portion included in the region of the current band is extracted from a character image for one character. Since only that small image portion is pasted into the band region, the cursor position must also be finely adjusted to move to a position within the band region.

For example, assume that a certain character extends from the upper boundary of the current band by about the upper half portion of its character box. Since the cursor position is located at the upper left end of the character box, it is present outside the band region at that time. The boundary value processing is done to extract only the lower half image of the character box that falls within the band region. As a result, the upper left end position of the character box of the lower half character becomes a new cursor position. This position is located on the upper boundary of the band region. This is "fine adjustment of the cursor position".

Also, when a character box is on one of the four corners of the band region, a character image portion included in the band region is similarly extracted, and the cursor position is finely adjusted.

In step S235, the program pastes the expanded character dot image at the cursor position on the band A 71 or B 72. If the variable t described above in FIG. 25 is 1, the dot image is pasted onto the band A 71; if the variable t is 2, the image is pasted onto the band B 72. Finally, this program ends its processing.

The operation of the image expansion/video transfer circuit 73 will be described below with reference to FIGS. 30 to 33. Although the image expansion/video transfer circuit 73 is a hardware circuit and is not a program, its operation will be explained with the aid of the flow charts in FIGS. 31, 32, and 33. As described above, the interpreter program 52 instructs the image expansion/video transfer circuit 73 to output a video signal to the engine unit 4. The processing of the image expansion/video transfer circuit 73 includes three different processing operations, i.e., blank band processing, video signal output processing from the band A 71 or B 72, and direct expansion of compressed image data from the compressed image block data and video signal output processing of the expanded data.

The image expansion/video transfer circuit 73 includes a line buffer (not shown) for storing expanded data for one line after compressed image data is expanded from image block data. The circuit 73 generates a video signal based on data stored in this line buffer, and outputs it to the engine unit 4.

Figure 30:
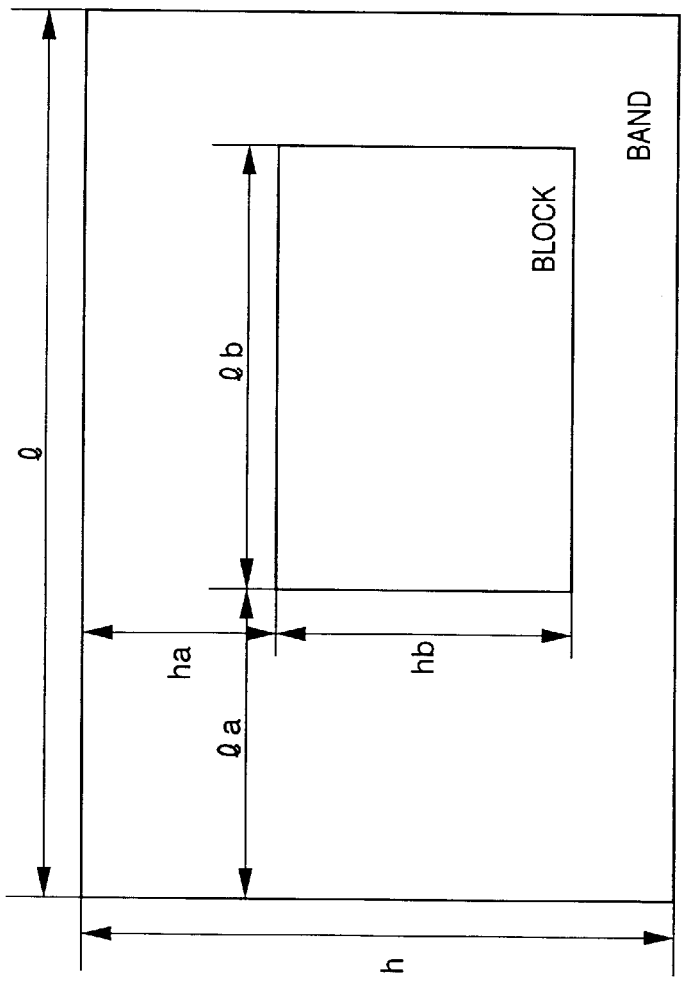
FIG. 30 is an explanatory view of variables used upon video output of a band.
Figure 31:
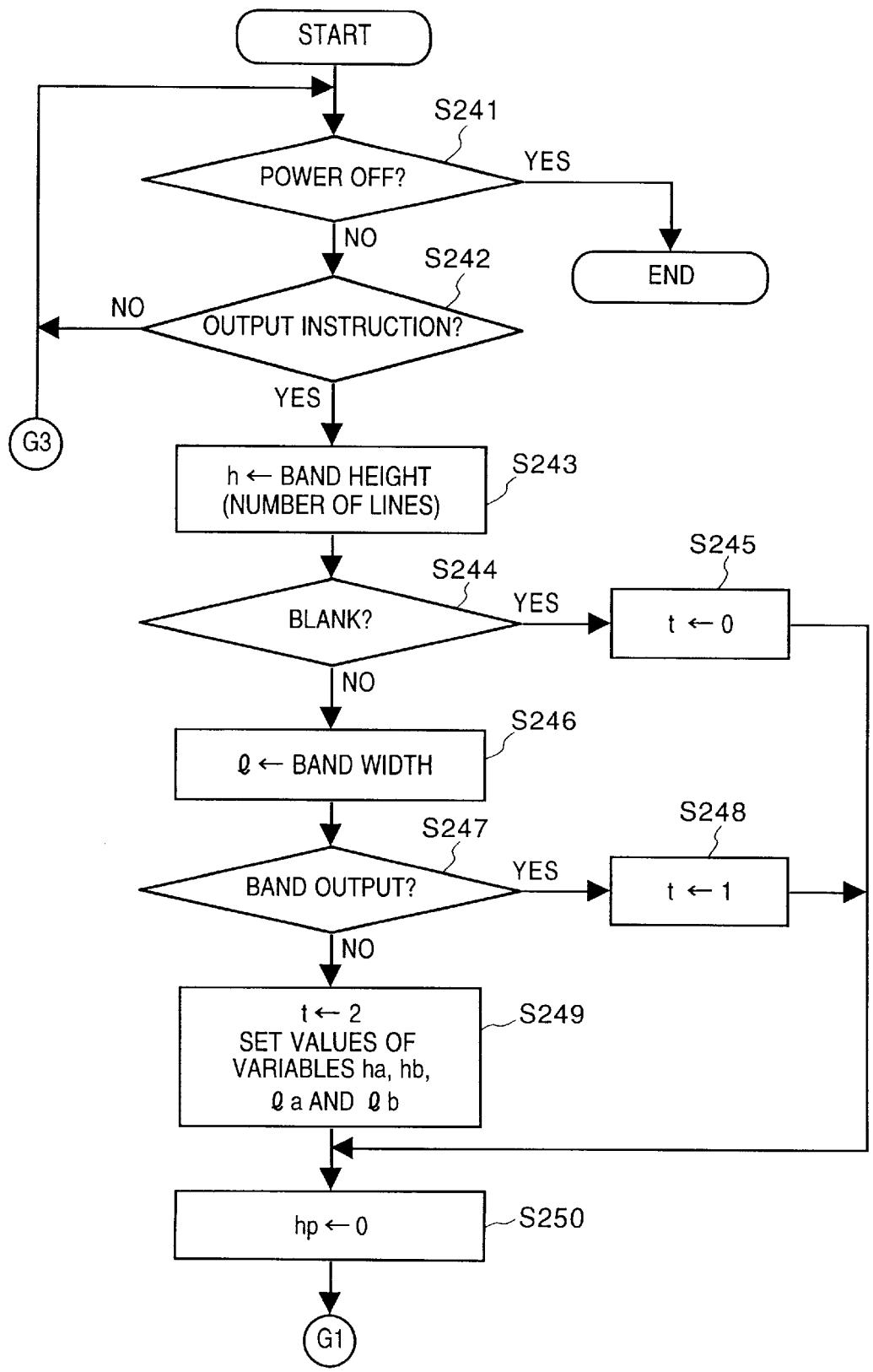
FIG. 31 is a flow chart showing the operation of an image expansion/video transfer circuit.

The variables used in the flow charts in FIGS. 31, 32, and 33 will be explained below with reference to FIG. 30.

A variable h indicates the height of a band, which corresponds to the number of lines upon outputting a video signal. A variable 1 indicates the width of a band, which is set in units of bytes. That is, dots corresponding in number to a multiple of 8 are converted into black and white bits of a video signal, and are output.

A variable ha indicates the top margin from the first line of a certain band to an image block. That is, the variable ha indicates the number of lines for which no video signal need be sent. A variable hb indicates the height of an image block, i.e., the number of lines of the block.

A variable la is the left margin of an image block. In this portion, no video signal need be sent. A variable lb is the width of an image block, which is also set in units of bytes. That is, dots corresponding in number to a multiple of 8 are converted into black and white bits of a video signal, and are output.

The above description of the operation of the driver on the host 1 does not suggest any adjustment of the width of a band or image block to "the size in units of bytes", but such adjustment to a given unit is required to allow high-speed image output using a hardware circuit. The driver transfers print commands to the printer 2 under such conditions.

The operation of the image expansion/video transfer circuit 73 will be explained below with reference to FIGS. 31, 32, and 33.

This circuit starts its operation immediately after the power switch of the printer 2 is turned on. In step S241, it is checked if the user has turned off the power switch of the printer 2. If YES in step S241, this circuits ends operation. If NO in step S241, it is checked in step S242 if the circuit has received a video signal output instruction from the interpreter program 52. If NO in step S242, the flow returns to step S241 to form a loop, thus waiting for an instruction from the interpreter program 52.

If YES in step S242, the height of a band, i.e., the total number of lines of the band, is set in the variable h in step S243. This value is given together with the video signal output instruction from the interpreter program 52. In step S244, it is checked if the instruction from the interpreter program 52 is a blank band output instruction. If YES in step S244, 0 is set in the variable t in step S245, and the flow jumps to step S250.

If NO in step S244, the value of the band width is set in the variable l in step S246. This value is also given together with the video signal output instruction from the interpreter program 52. It is then checked in step S247 if the instruction from the interpreter program 52 is a video signal output instruction from the band A 71 or B 72. If YES in step S247, 1 is set in the variable t, and the flow then jumps to step S250.

If NO is determined in step S247, the received instruction indicates that a single image block is present in the band, and the compressed image block data is expanded by the image expansion/video transfer circuit 73 to output a video signal. In step S249, 2 is set in the variable t, the top margin of the block is set in the variable ha, the block height, i.e., the total number of lines of the block, is set in the variable hb, the left margin of the block is set in the variable la, and the width of the block is set in the variable lb. These values are also given together with the video signal output instruction from the interpreter program 52. The flow then advances to step S250.

In step S250, 0 is set in a variable hp. The variable hp serves as a counter indicating the position of a line on the band from which a video signal is to be output. It is then checked in step S251 if the variable t is 0 or 1. If the variable t is 0 or 1, it is checked in step S252 if the circuit has received a video signal output request from the engine unit 4. If NO in step S252, a loop is formed to wait for that request. If the video signal output request is received, it is checked in step S253 if the variable t is 1. If NO in step S253, the flow jumps to step S255. If YES in step S253, in step S254 data on the hp-th line on the band A 71 or B 72 is converted into a video signal, and the video signal is output to the engine unit 4. Thereafter, the flow advances to step S255. Note that in step S254, the output instruction from the band A 71 or B 72 is given together with the video output instruction from the interpreter program 52.

In step S255, the variable hp is incremented by 1. In step S256, it is checked if the variable hp is smaller than the variable h. If YES in step S256, i.e., if the band still includes lines for which video signals to be output still remain, the flow returns to step S252 to output a video signal for the next line.

If NO in step S256, i.e., if video signals for all the lines in the band are output, information indicating the end of output of video signals for the instructed band is supplied to the interpreter program 52 in step S257. This information also includes completion of the blank band output processing. The flow then returns to step S241 to wait for the next video output instruction from the interpreter program 52.

If NO in step S251, the received instruction is a video signal output instruction from image block data in the band. In this case, in step S258 in FIG. 33, compressed image data for the first line in the block data is expanded and the expanded data is set in the internal line buffer of the image expansion/video transfer circuit 73 in step S258. Expansion of the compressed data in advance can prevent any video output timing delay upon expanding data at the time of outputting a video signal.

Thereafter, in step S259, a loop is formed to wait for a video signal request from the engine unit 4. If the video signal request is received, it is checked in step S260 if the variable hp is smaller than the variable ha. If YES in step S260, the flow jumps to step S267 without any processing. This means that no video signal is sent in the top margin portion of the block.

If NO in step S260, it is checked in step S261 if the variable hp is smaller than the sum of the variables ha and hb. If NO in step S261, the flow jumps to step S267 without sending any video signal. This means that if the portion beneath the block in the band is blank, i.e., the bottom margin is present, no video signal is set for that portion.

If YES in step S261, no video signal is sent in correspondence with the size of the variable la in step S262. Next, in step S263 data on the internal line buffer of the image expansion/video transfer circuit 73 is converted into a video signal in correspondence with the size of the variable lb, and the video signal is output to the engine unit 4. In step S264, the sum of 1 and the value obtained by subtracting the variable ha from the variable hp is set in a variable hbp.

Subsequently, it is checked in step S265 if the variable hbp is smaller than the variable hb. If NO in step S265, i.e., if video signals for all the lines in the block are output, the flow jumps to step S267 without any processing.

If YES in step S265, i.e., if the block includes lines for which video signals to be output still remain, in step S266 compressed image for the hbp-th line designated by the variable hbp in the block data is expanded, and the expanded data is set in the internal line buffer of the image expansion/ video transfer circuit 73. The flow then advances to step S267.

In this processing as well, expansion of the compressed data in advance can prevent any video output timing delay due to expansion upon outputting a video signal.

In step S267, the variable hp is incremented by 1, and it is then checked in step S268 if the variable hp is smaller than the variable h. If YES in step S268, the flow returns to step S259 to continue the video signal output processing of the next line in the band.

Figure 32:
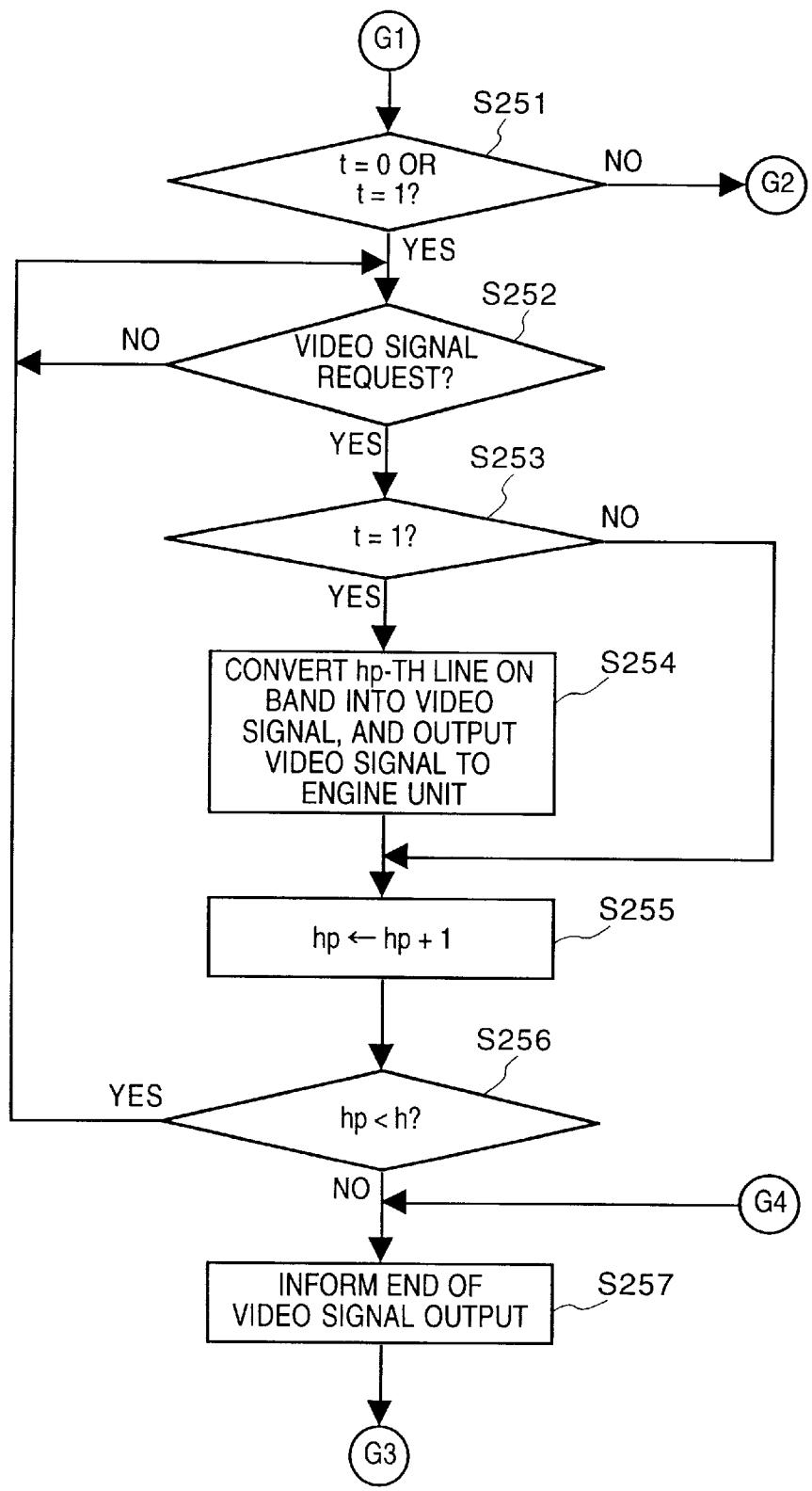
FIG. 32 is a flow chart showing the operation of the image expansion/video transfer circuit.
Figure 33:
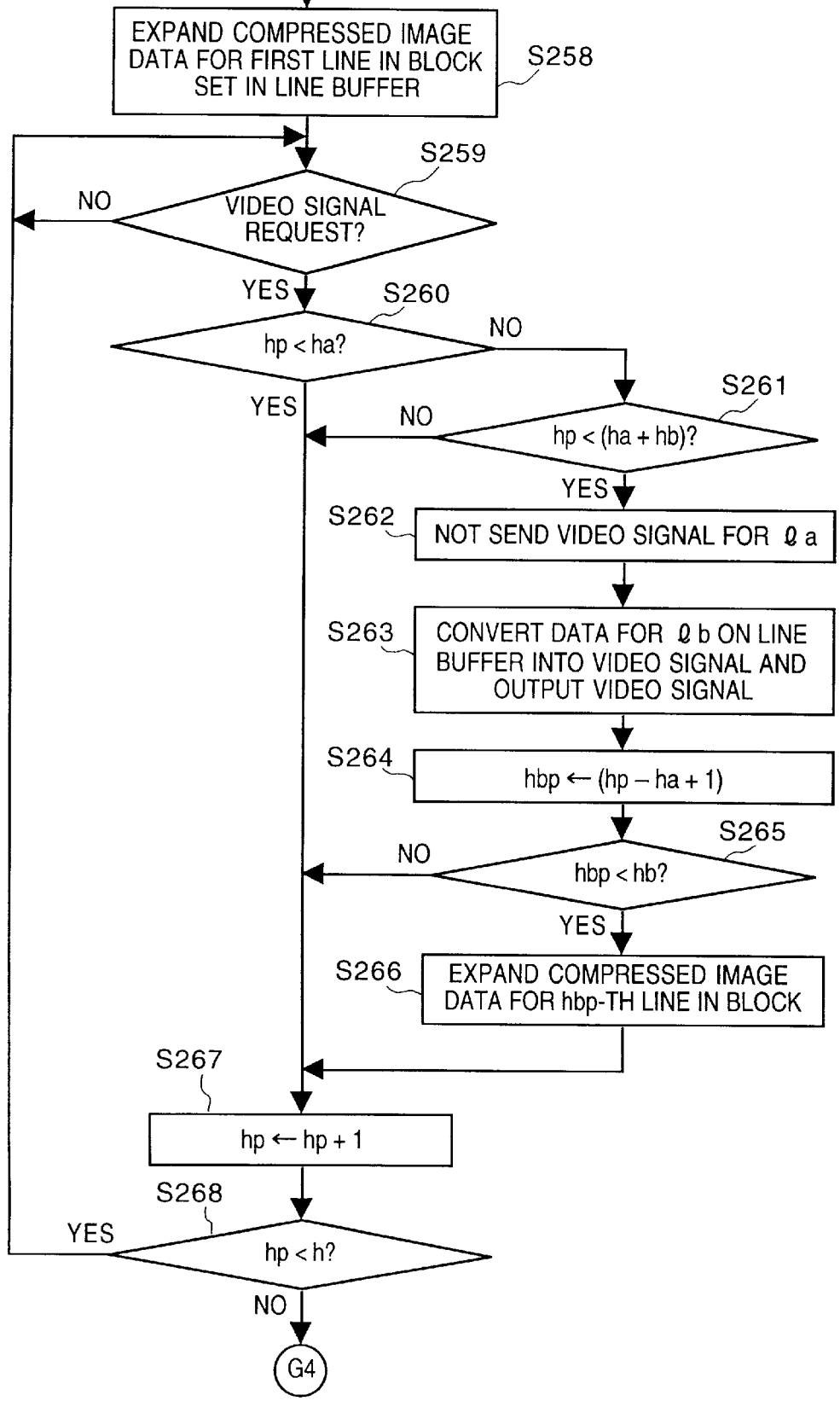
FIG. 33 is a flow chart showing the operation of the image expansion/video transfer circuit.

If NO in step S268, after the flow jumps to step S257 in FIG. 32 to supply information indicating the end of video signal output to the interpreter program 52, the flow returns to step S241 to wait for the next video signal output instruction from the interpreter program 52.

In step S257, the interval from when the image expansion/ video transfer circuit 73 supplies information indicating the end of video signal output to the interpreter program 52 until the interpreter program 52 supplies the video signal output instruction for the next band to the image expansion/video transfer circuit 73 must be very short. If this interval becomes a long time lag, since no video signal is output during this interval, a white stripe is formed on that line portion on the printed paper sheet. That is, a gap is formed between adjacent bands. Consequently, the processing between adjacent bands upon paper discharging of the interpreter program 52 must be done very quickly.

<Effects Unique to Second Embodiment>

With the above arrangement, the following effects are expected.

(1) In this embodiment, since the band memories are arranged in place of the frame buffer and printing is done by band processing, the memory capacity can be reduced, and the manufacturing cost of the apparatus can also be reduced.

(2) In this embodiment, printing starts after data for one page is received by the reception buffer. For this reason, since this embodiment does not assign top priority to data transfer to the printer unlike in the host-based printer, other application programs can be prevented from being locked on the host.

(3) In this embodiment, since the driver on the host transfers a block (rectangular portion) actually including an image in the band region to the printer in place of image data having a size of the band itself, the volume of data to be transferred can be reduced.

(4) In this embodiment, when a blank band is present, since the controller unit instructs the image expansion/video transfer circuit not to send any video signal in place of mapping the blank portion onto the band memory and sending that video signal to the engine unit, the load on the CPU can be reduced.

(5) In this embodiment, when a band includes an image alone without any characters, the controller unit instructs only expansion of the compressed image data, conversion into a video signal, and output of the video signal to the engine unit in place of mapping that image onto the band memory and outputting the video signal to the engine unit. Hence, the load on the CPU can be reduced.

[Third Embodiment]

The third embodiment will be described below with reference to the accompanying drawings.

<Arrangement of System>

In the second embodiment, one page is equally divided into 16 bands. However, in the third embodiment, the number of bands and the height of each band can be variably set, and when image data include repetitive image patterns in units of bands, the driver sends a repetition command of a band to the printer, thereby reducing the quantity of image data to be transferred.

However, since the constituting elements, program operations, and the like of this embodiment are nearly the same as those in the second embodiment, the differences will be mainly described below.

Since the block arrangement is the same as that in FIG. 18 of the second embodiment, a detailed description thereof will be omitted. In the third embodiment, the band height is arbitrarily set within the band height of the band A 71 or B 72 allocated on the RAM 9 in FIG. 18.

Figure 34:
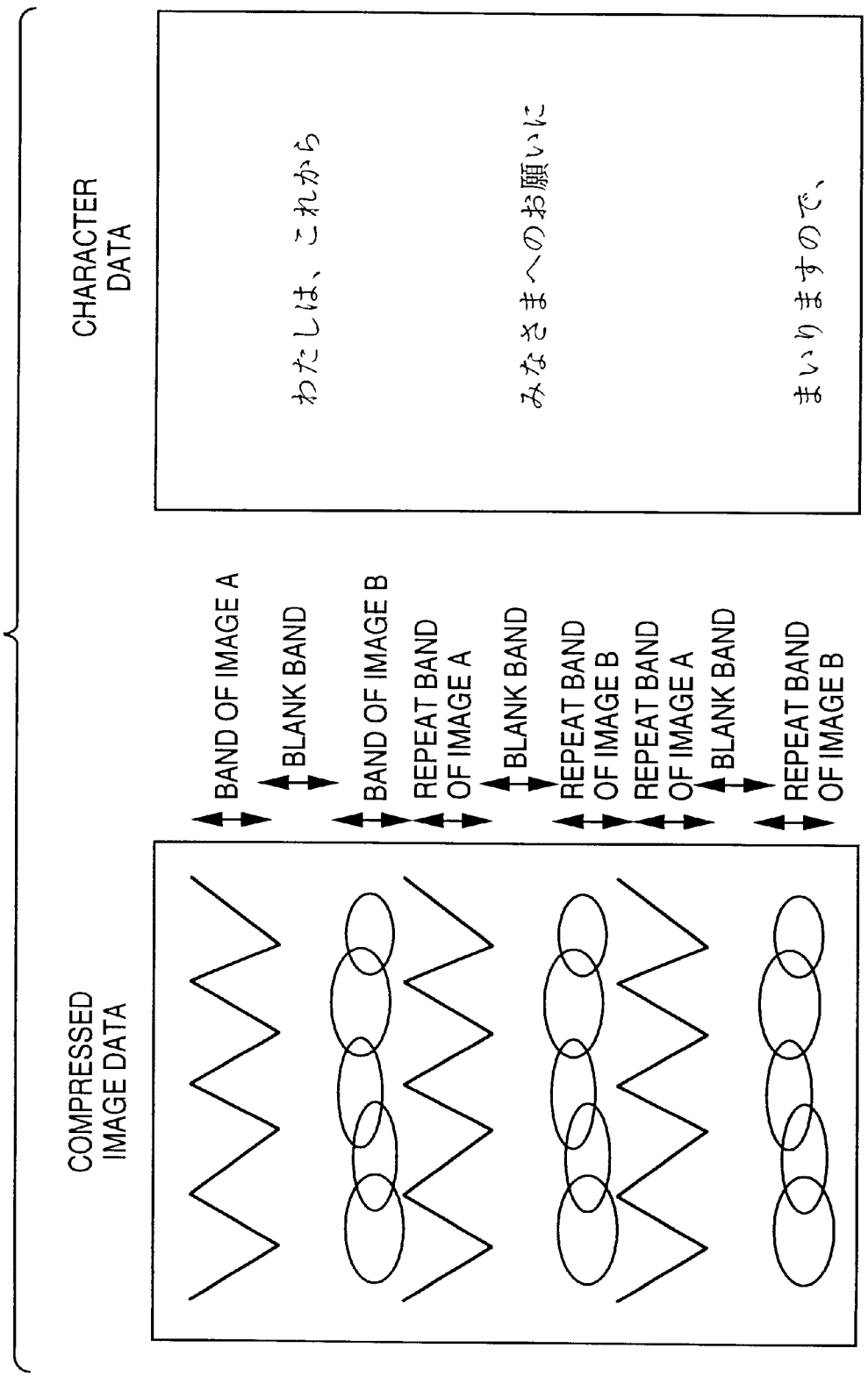
FIG. 34 is an explanatory view of the principle of repetition of image bands according to the third embodiment.

FIG. 34 is an explanatory view of the principle of printing in this embodiment.

The driver on the host 1 divides a document to be printed into character and image data, and transfers them to the printer 2 like in the first and second embodiments.

In this embodiment, the driver performs pattern recognition in units of bands in an image for one page mapped on the frame buffer on the host 1 before it sends image data to the printer 2, and checks if bands include repetitive patterns. In this case, the band height can be arbitrarily changed. As for the pattern recognition technique, since various methods are known to those who are skilled in the art, a detailed description thereof will be omitted.

In the left image in FIG. 34, a band set of a band of image A including a wavy figure, a blank band, and a band of image B including a chain-like figure repetitively appears three times. In such case, as for the bands of images A and B that appear for the second and subsequent times, print commands indicating that these band data are the same as the band data of images A and B that appeared first are transferred to the printer 2. The processing of a character data portion is the same as that in the second embodiment.

Figure 35:
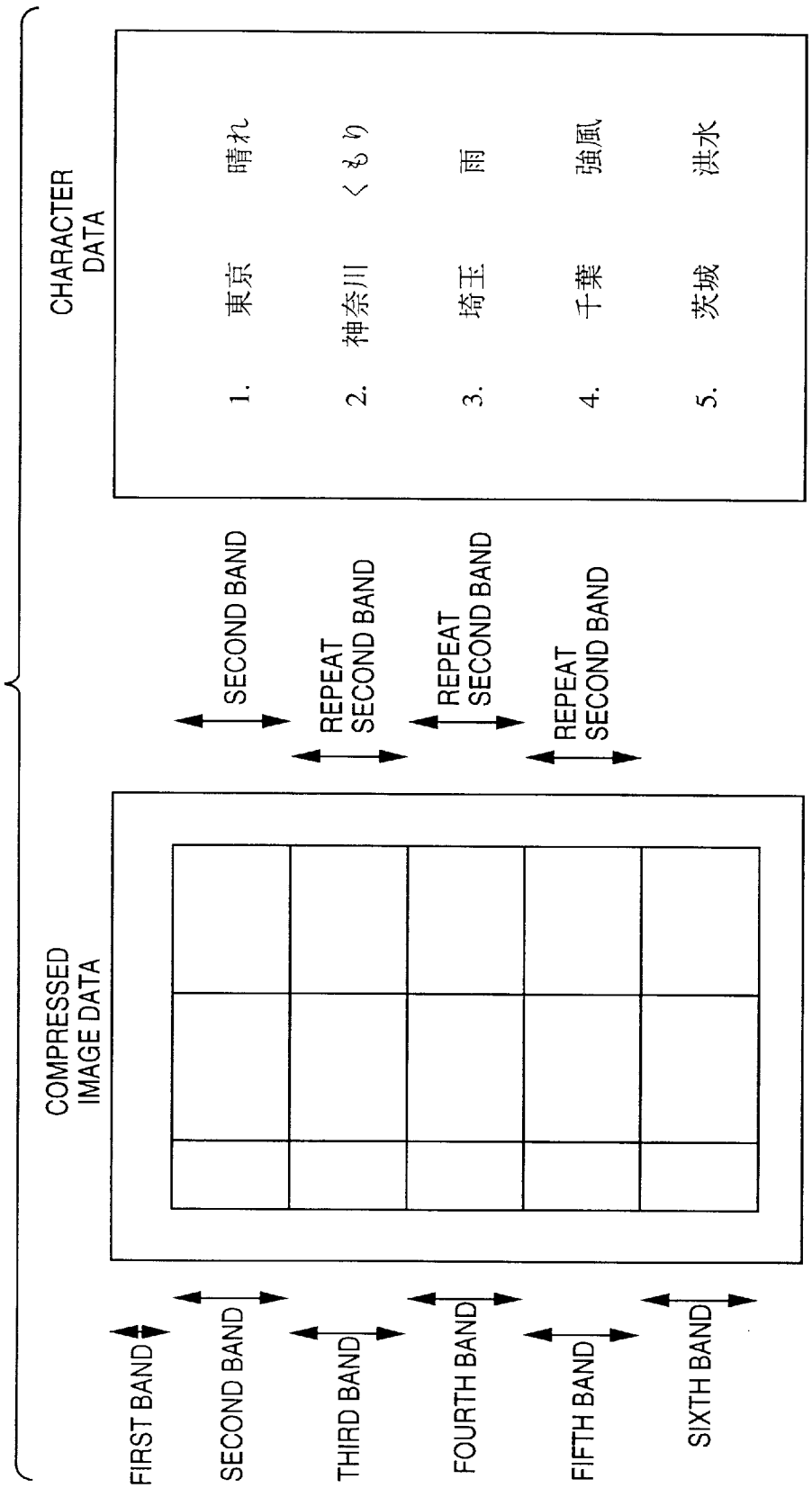
FIG. 35 is an explanatory view of an example of repetition of image bands.

The example shown in FIG. 34 is rarely encountered in actual documents, but an example of repetitive image bands in FIG. 35 is likely to frequently appear in actual documents.

In this example, only a ruled line image portion of a table from which character portions are removed will be assumed. As shown in the left image in FIG. 35, this image can be divided into the first to sixth bands, image data of the first, second, and sixth bands are directly transferred to the printer 2 as print commands, but it is determined that the third, fourth, and fifth bands include repetitive images of that in the second band, and a print command instructing "repetition of the second band" is transferred to the printer 2.

Figure 36:
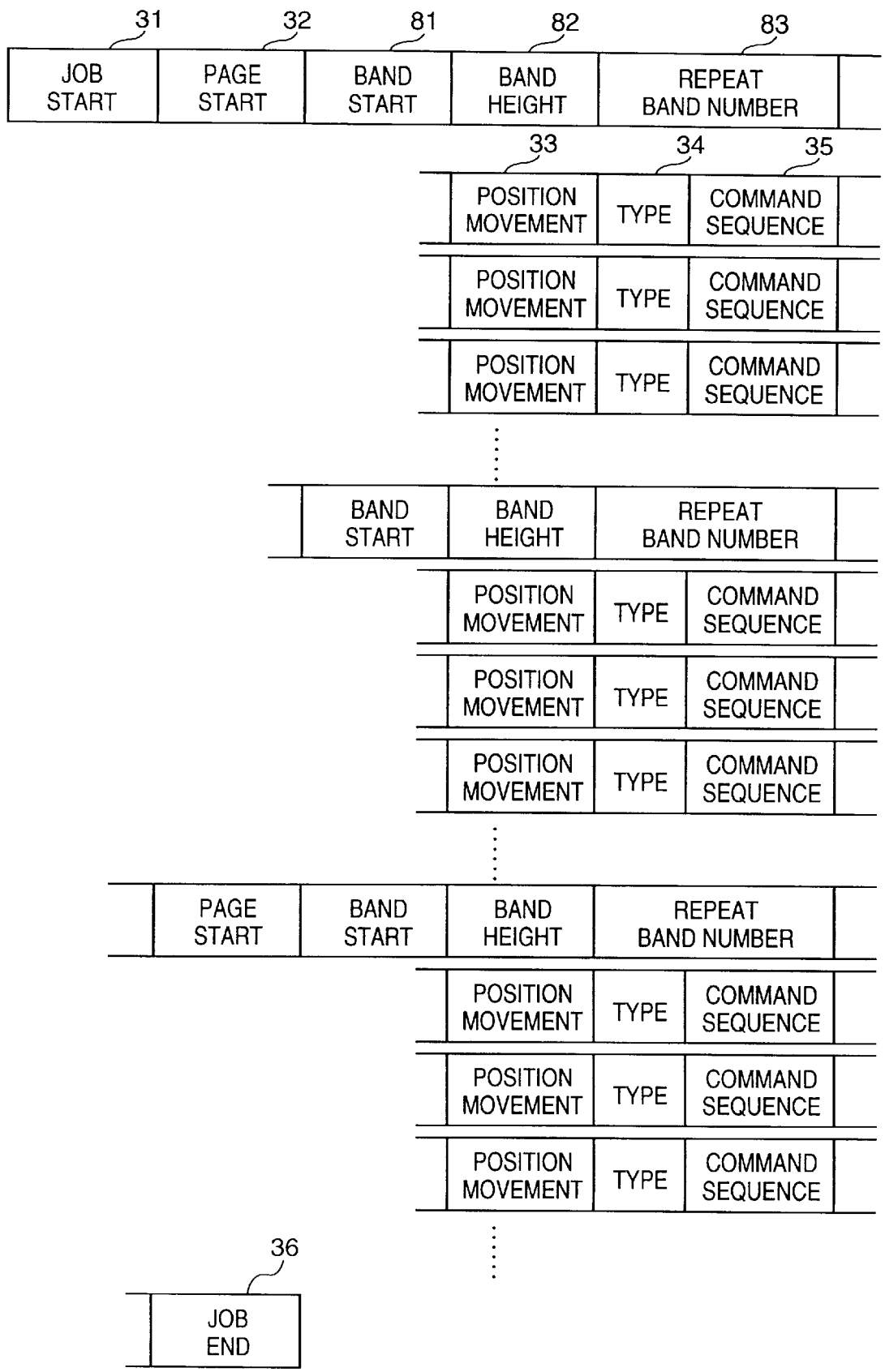
FIG. 36 is an explanatory view of the command structure.
Figure 37:
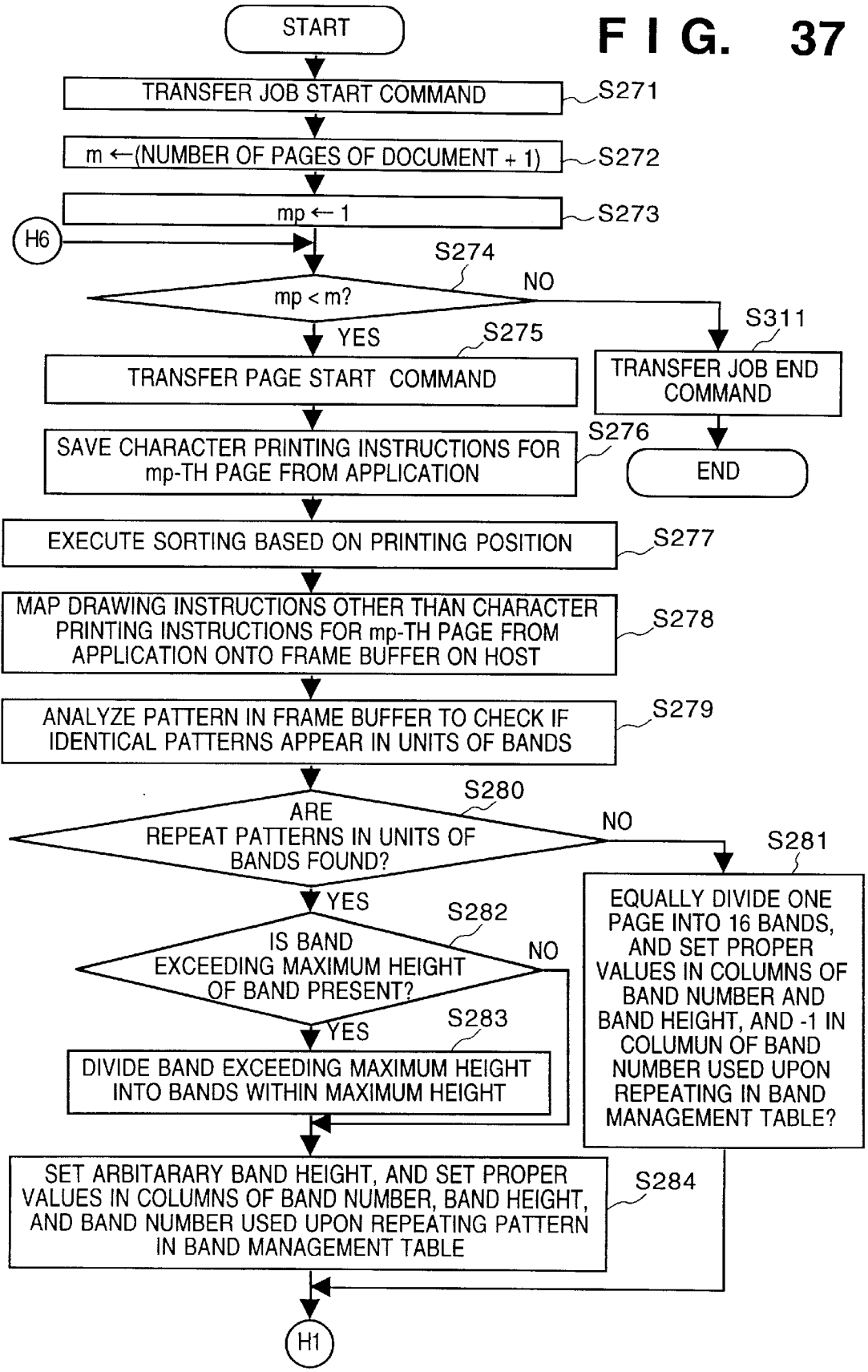
FIG. 37 is a flow chart showing the operation of a printer driver.

FIG. 36 is an explanatory view of the command structure of character and image data sent from the host 1 to the printer 2. The command structure shown in FIG. 36 is substantially the same as that shown in FIG. 20 of the second embodiment, except that a band height command 82 and repeat band number 83 are added after the band start command 81.

An arbitrary number of band start commands 81 repetitively appear per page. The band height command 82 is also arbitrarily set in units of bands within the band height of the band A 71 or B 72. The repeat band number 83 indicates the order of bands that appear in that page, and 1 represents the head band of that page. When the band does not include any repetitive image, i.e., includes a new image, −1 is set in the band number.

The names of the programs installed in the ROM 8 of the controller unit 3 are the same as those shown in FIG. 21 of the second embodiment. The operations of the programs are substantially the same as those in the second embodiment except for the interpreter program 52. Since the operation of the reception unit 6 is the same as that in the first embodiment and the operation of the image expansion/video transfer circuit 73 is the same as that in the second embodiment, a detailed description thereof will be omitted. The operation of the interpreter program 52 is substantially the same as that in the second embodiment, but will be described in detail later with reference to the flow charts in FIGS. 40 to 43.

The operation of the driver on the host 1 is substantially the same as that in the second embodiment, but will be explained below with reference to the flow charts in FIGS. 37, 38, 39A, and 39B.

<System Control>

The operation according to the third embodiment of the present invention will be described below with reference to the flow charts. The operations of the driver and interpreter program 52, different from those in the second embodiment, will be explained below.

FIGS. 37, 38, 39A, and 39B are flow charts for explaining the operation of the printer driver on the host 1. The printer driver generates character and image printer commands described above with the aid of FIG. 36 from document data created by an application software program used by the user, and transfers them to the printer 2. When the user instructs document printing from the application software program, the printer driver is started in the host 1.

At the time of starting, the driver assures a frame buffer (not shown) for one page on a memory of the host 1 and clears the frame buffer at the same time. Upon completion of document printing by the driver, the memory area used as the frame buffer is released.

The driver transfers a job start command 31 to the printer 2 in step S271, sets the value as the sum of the number of pages of a document to be printed and 1 in a variable m in step S272, and sets 1 in a variable mp in step S273. The driver checks in step S274 if the variable mp is smaller than the variable m. If NO in step S274, the processing for all the pages of the document is complete, and the driver transfers a job end command in step S311, thus ending its processing.

If YES in step S274, the driver transfers a page start command 32 to the printer 2 in step S275, saves character printing instructions of the mp-th page from the application program in step S276, sorts the saved character printing instructions based on their print positions in step S277, and maps drawing instructions other than character printing instructions for the mp-th page from the application program onto the frame buffer on the host 1 in step S278. The drawing instructions other than the character printing instructions include ruled line and figure drawing instructions, image paste instructions, and the like.

In sorting of the character printing instructions based on their printing positions in step S277, the character printing instructions are sorted based on their printing positions in the longitudinal direction of a paper sheet, and are then sorted based on their printing positions in the widthwise direction of the paper sheet. When an A4-size paper sheet is set in the portrait position, the instructions are sorted from the upper to lower positions, and are then sorted from the left to right.

The driver analyzes the contents of the frame buffer by pattern recognition to check in step S279 if the mapped image includes repetitive image patterns in units of bands, and then checks in step S280 if repetitive patterns are found. If NO in step S280, since an image for one page is equally divided into 16 bands, proper values are set in the columns of band number, band height, and band number used upon repeating a pattern in a band management table, in step S281. Especially, −1 is set in the column of band number used upon repeating a pattern. Thereafter, the flow jumps to step S285 in FIG. 38.

If YES in step S280, in steps S282 and S283 a band whose band height exceeds the maximum height, i.e., the height of the band A 71 or B 72 is divided so that the divided band height becomes equal to or smaller than the maximum band height. Thereafter, the flow advances to step S284. If NO is determined in step S282, the flow also advances to step S284. In this case, since the band height is set not equally but arbitrarily in units of bands, proper values are set in the columns of band numbers, band heights, and a band number used upon repeating a pattern in the band management table in step S284. The flow then advances to step S285.

Note that the band management table is allocated on the host 1 for the purpose of convenience upon generating print commands associated with bands by the driver, and includes three items, i.e., the band number, band height, and band number column used upon repeating an image pattern.

Figure 38:
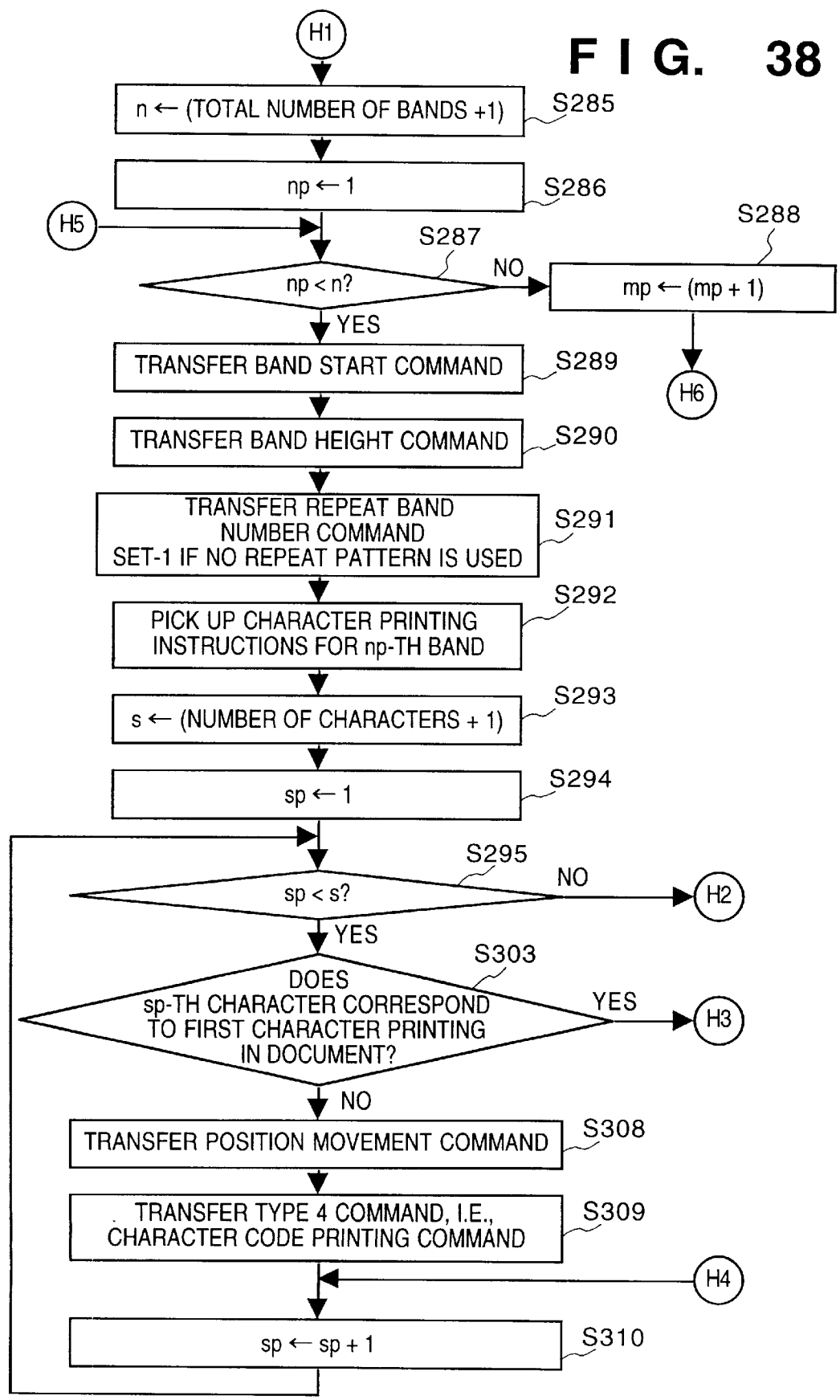
FIG. 38 is a flow chart showing the operation of the printer driver.
Figure 39A:
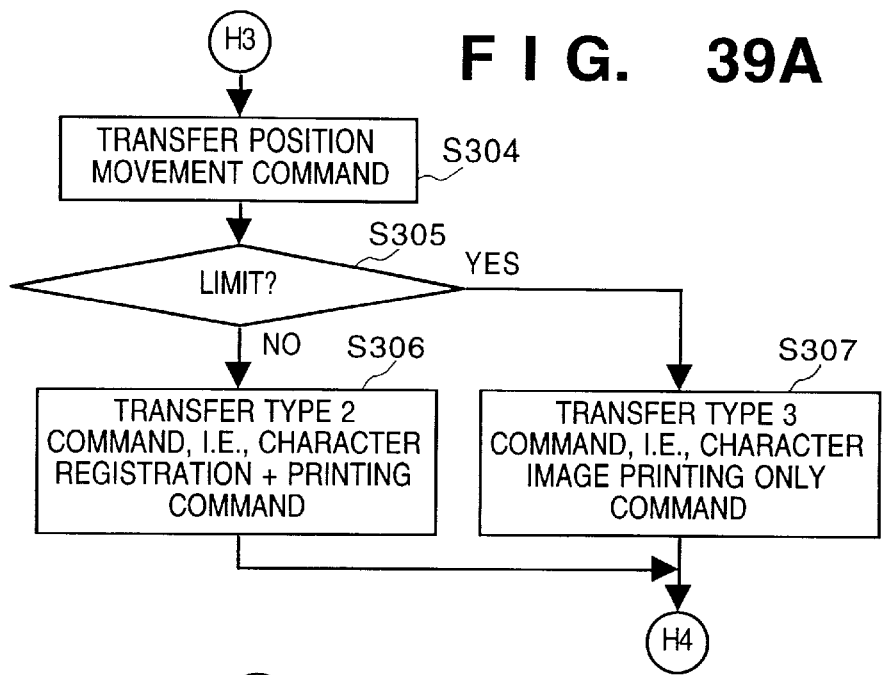
FIGS. 39A and 39B are flow charts showing the operation of the printer driver.
Figure 39B:
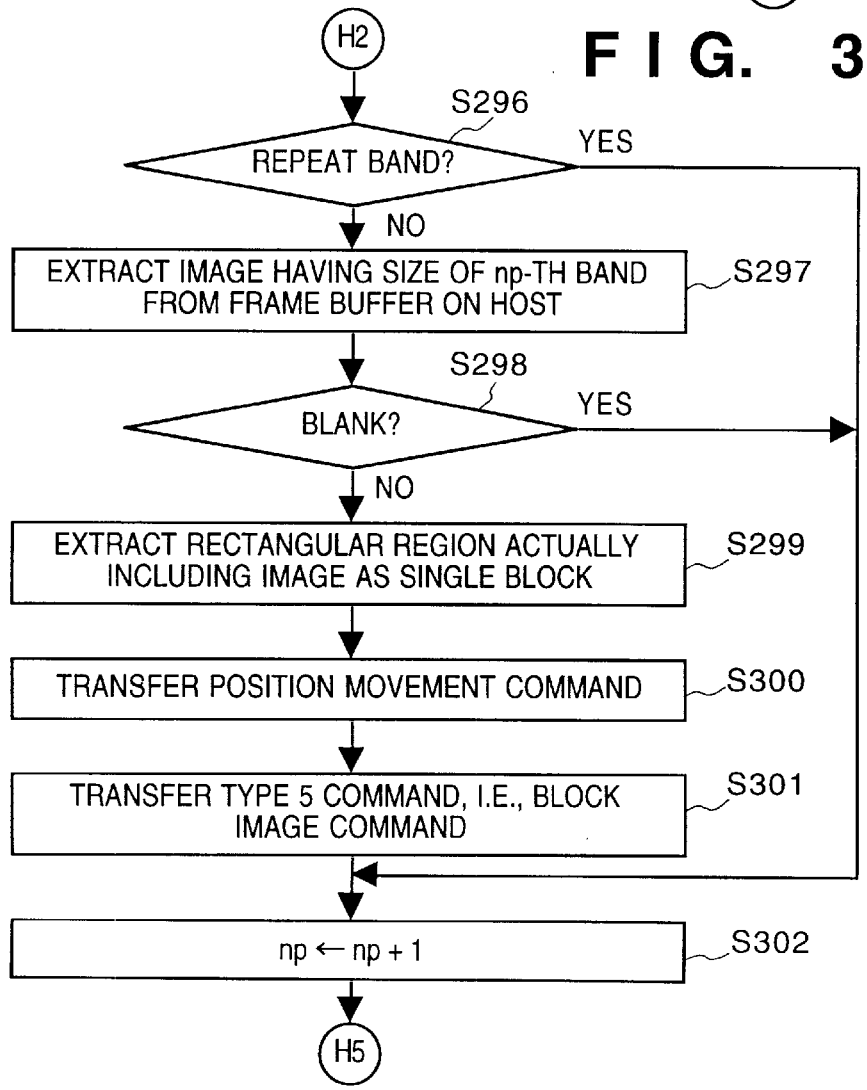
Figure 40:
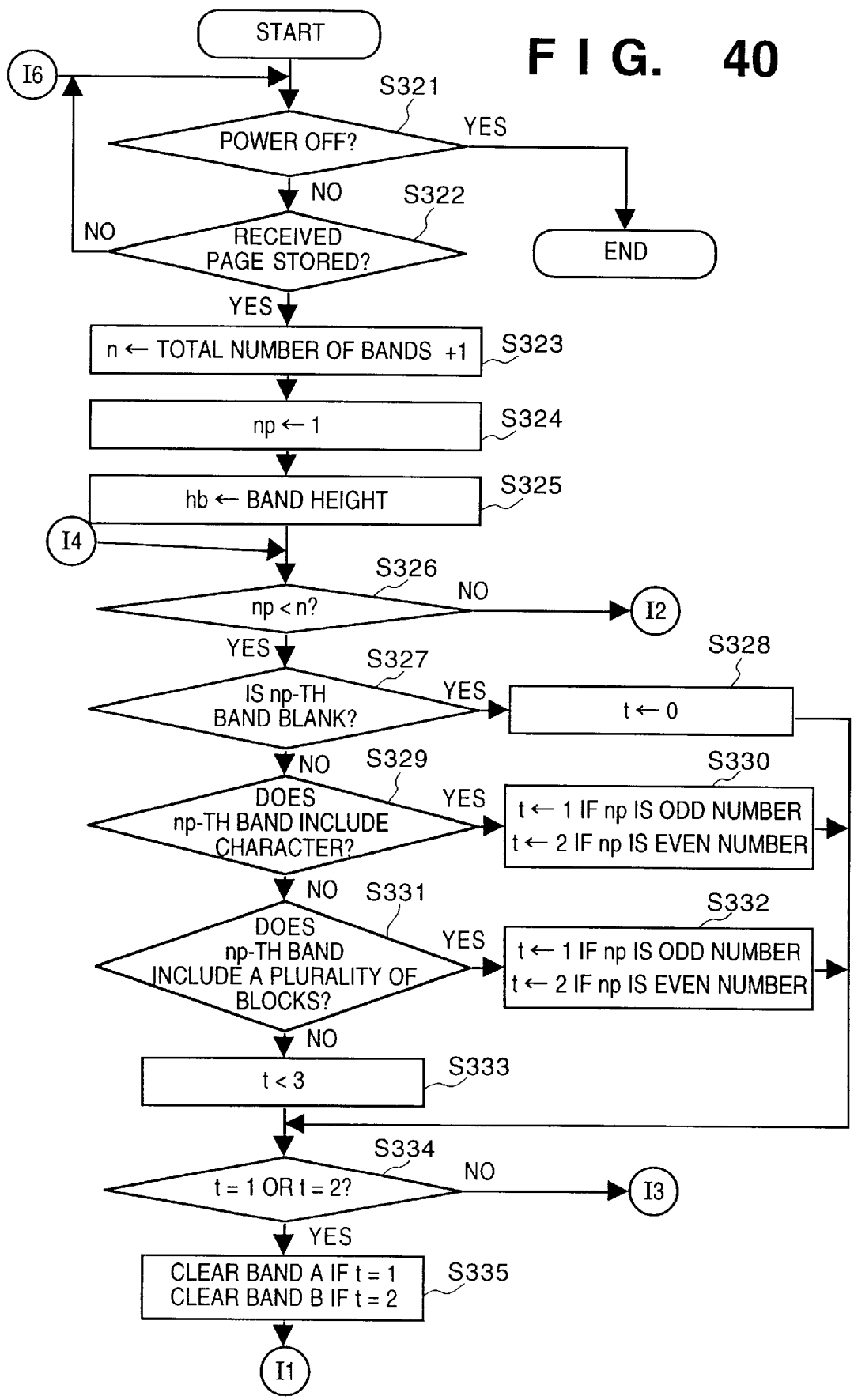
FIG. 40 is a flow chart showing the operation of an interpreter program.
Figure 41:
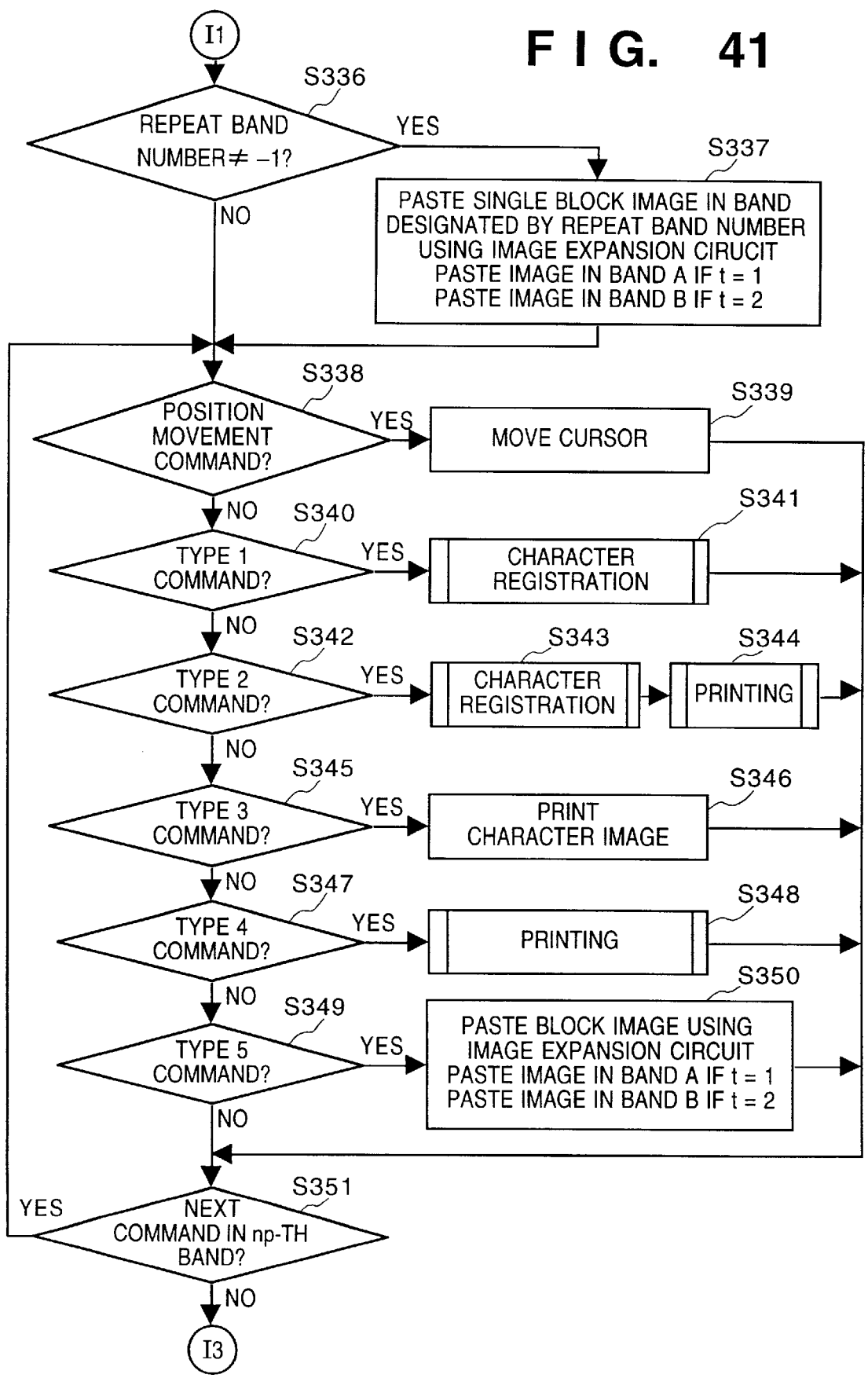
FIG. 41 is a flow chart showing the operation of the interpreter program.

Referring to FIG. 38, in step S285 the driver sets a value obtained by adding 1 to the total number of bands in a variable n. The driver sets 1 in a variable np in step S286, and checks in step S287 if the variable np is smaller than the variable n. If NO in step S287, this means that processing for all the bands in one page is complete, and the driver increments the variable mp by 1 in step S288. Next, the flow returns to step S274 to start the band output processing for the next page.

If YES in step S287, the driver transfers a band start command 81 to the printer 2 in step S289, a band height command 82 in step S290, and a repeat band number command 83 in step S291. If the current band does not include any repetitive image, −1 is set in the command 83, and is transferred.

The driver picks up character printing instructions included in the np-th band from the saved printing instructions from the application program in step S292, sets a value obtained by adding 1 to the number of picked-up characters in a variable s in step S293, and sets 1 in a variable sp in step S294.

Note that the character printing instructions to be picked up in step S292 include those of characters which are included in the np-th band albeit partially. Hence, some characters are printed across two bands depending on their printing positions.

The driver checks in step S295 if the variable sp is smaller than the variable s. If NO in step S295, it is determined that all the character data included in the np-th band have already been transferred, and transfer of image data for the np-band is started in step S296 and the subsequent steps. That is, the driver checks in step S296 if the current band is a repeat band. If YES in step S296, the flow jumps to step S302 without any processing.

If NO in step S296, the driver extracts an image corresponding to the position and size of the np-th band from the frame buffer on the host in step S297, and checks in step S298 if the np-band is a blank band. If YES in step S298, the flow jumps to step S302 without any processing.

If NO in step S298, the driver extracts a rectangular region actually including an image as a single block in step S299. The driver transfers a position movement command 33 indicating the paste position of that block to the printer 2 in step S300, and transfers a command sequence of type 5, i.e., image block commands 45, 46, 47, and 48 to the printer 2 in step S301. Of course, the image block data is transferred upon being compressed.

The driver increments the contents of the variable np by 1 in step S302, and the flow then returns to step S287 to start the next band transfer processing.

If YES in step S295, the driver checks in step S303 if the sp-th character is the first character to be printed in this document. If YES in step S303, the driver transfers a position movement command 33 indicating the printing position to the printer 2 in step S304, and checks in step S305 if the number of registered characters has reached a limit on the printer 2 side. If YES in step S305, the driver transfers a command sequence of type 3, i.e., character image printing only commands 43 and 44, to the printer 2 in step S307, and the flow jumps to step S310.

If NO in step S305, the driver transfers a command sequence of type 2, i.e., character registration+printing commands 41, 42, 43, and 44, to the printer in step S306, and the flow jumps to step S310. Of course, a dot image for each character to be transferred to the printer 2 is compressed.

If NO in step S303, since it indicates that this printing instruction is the second or subsequent printing instruction of that character, the driver transfers a position movement command 33 indicating the printing position to the printer 2 in step S308, and also transfers a command sequence of type 4, i.e., character code printing commands 41 and 42, to the printer 2 in step S309.

The driver increments the variable sp by 1 in step S310, and the flow returns to step S295 to transfer the next character data to the printer 2.

FIGS. 40 to 43 are flow charts for explaining the operation of the interpreter program 52. Upon power ON of the printer 2, the interpreter program 52 is also started to execute interpretation of print commands in the reception buffer 10 written by the reception unit 6 and paper discharging.

The program checks in step S321 if the user has turned off the power switch of the printer 2. If YES in step S321, this program ends its processing. If NO in step S321, the driver checks in step S322 if received data for one page are stored in the reception buffer 10. If NO in step S322, the flow returns to step S321 to form a loop, thus waiting for reception of data from the host 1.

Note that the program looks up the page management table 13 in step S322 to check the presence/absence of any received page. The page management table 13 is managed by the reception management program 51 by the operation described above with the aid of the flow charts in FIGS. 9 and 10 in the first embodiment.

If YES in step S322, the program interprets and processes print commands of that page in turn. The program sets "the total number of bands+1" in a variable n in step S323, sets 1 in a variable np in step S324, and sets the band height in a variable hb in step S325. The program then checks in step S326 if the variable np is smaller than the variable n. If NO in step S326, it indicates that the processing for all the bands is complete, and the flow jumps to step S368 to wait for completion of paper discharging.

If YES in step S326, the program checks in step S327 if the np-th band includes neither character data nor image data, i.e., is a blank band. If YES in step S327, the program sets 0 in a variable t in step S328. The flow then jumps to step S344.

If NO in step S327, the program checks in step S329 if data for the np-th band include character data. If YES in step S329, in step S330 the program sets 1 in the variable t if the variable np is an odd number, or sets 2 in the variable t if the variable np is an even number. Thereafter, the flow jumps to step S334.

If NO in step S329, the program checks in step S331 if data for the np-th band include a plurality of image block data. If YES in step S331, in step 322 the program sets 1 in the variable t if the variable np is an odd number, or sets "2" in the variable t if the variable np is an even number. Henceforth, the flow jumps to step S334. Note that a plurality of image blocks are never present in a single band in the operation of the driver described above with reference to FIGS. 37, 38, 39A, and 39B.

If NO in step S331, it indicates that a single image block is present as data for the np-th band. The program sets 3 in the variable t in step S333, and the flow advances to step S334.

The program checks in step S334 if the variable t is 1 or 2. If YES in step S334, the program interprets character and image block data included in the np-th band in turn from the head data and maps them onto the bands A 71 and B 72 in step S335 and the subsequent steps. In step S335, the program clears the band A 71 if the variable t is 1 or clears the band B 72 if the variable t is 2.

The program then checks in step S336 if the repeat band number command 83 of the current band is other than −1. If NO in step S336, the flow advances to step S338 without any processing; otherwise, processing is done in step S337 and the flow then advances to step S338. In step S337, the program pastes a single image block in the band designated by the repeat band number onto the band memory using the image expansion circuit 16. In this case, if the variable t is 1, the image block is pasted onto the band A 71; if the variable t is 2, the image block is pasted onto the band B 72.

The program then checks in step S338 if the command to be interpreted is a position movement command 33. If YES in step S338, the program moves a cursor in step S339. The "cursor" is an imaginary pointer that indicates the mapping position of a character or image on the band memory. More specifically, this "cursor" is assured as variables indicating X- and Y-coordinates on the work area 12. The cursor position has the upper left end of each band as an origin. The position movement command 33 sent from the driver is transferred on the basis of the relative position that assumes the upper left end of each band as an origin. That is, the position movement command 33 does not have the upper left end of a page as an origin. After step S339, the flow jumps to step S351.

If NO in step S338, the program checks in step S340 if the command is a type command 34 of type 1. If YES in step S340, character registration is done by the character registration program 53 in step S341, and the flow jumps to step S351. Since the character registration is the same as that described above with the aid of the flow chart in FIG. 15 of the first embodiment, a detailed description thereof will be omitted.

If NO in step S340, the program checks in step S342 if the command is a type command 34 of type 2. If YES in step S340, after character registration is done in step S343 and printing is done in step S344, the flow jumps to step S351. The character registration in step S343 is the same as that in step S341 above. On the other hand, printing in step S344 is done by the printing program 54.

If NO in step S342, the program checks in step S345 if the command is a type command 34 of type 3. If YES in step S345, printing of only a character image is done in step S346, and the flow jumps to step S351.

If NO in step S345, the program checks in step S347 if the command is a type command 34 of type 4. If YES in step S347, printing is done in step S348, and the flow jumps to step S351. The printing in step S348 is the same as that in step S344 above.

If NO in step S347, the program checks in step S349 if the command is a type command 34 of type 5. If YES in step S349, in step S350 the program expands compressed image data using the image expansion circuit 16, and pastes the expanded image block to the band 71 or 72. In this case, if the variable t is 1, the program pastes the expanded data onto the band A 71; if the variable t is 2, the program pastes it onto the band B 72. After that, the flow jumps to step S351.

After step S339, S341, S344, S346, S348, or S350, or if NO in step S349, the flow advances to step S351. In step S351, the program checks if the received data for the np-th band still include uninterpreted commands. If YES in step 351, the flow returns to step S338 to interpret the uninterpreted commands.

Figure 42:
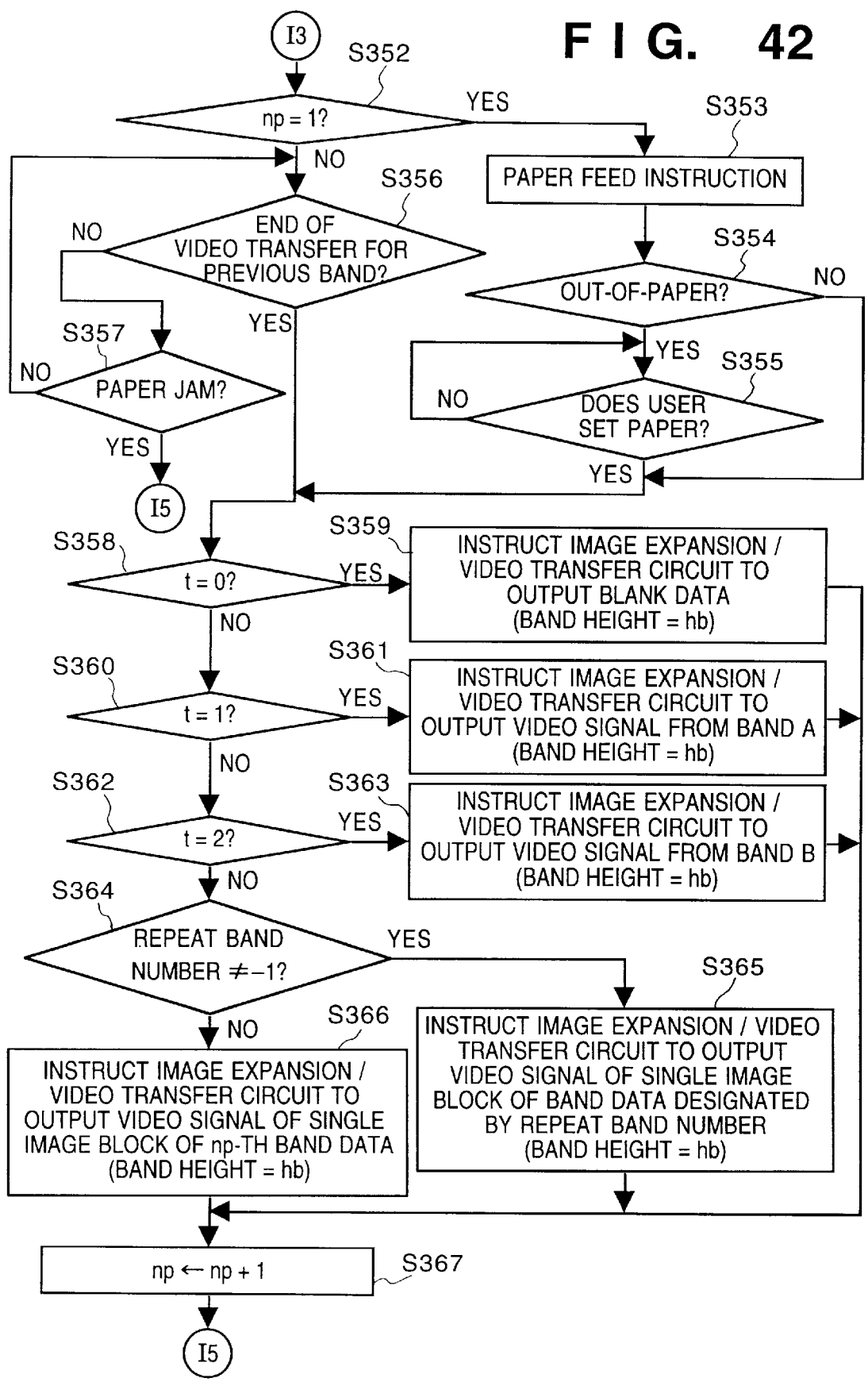
FIG. 42 is a flow chart showing the operation of the interpreter program.
Figure 43:
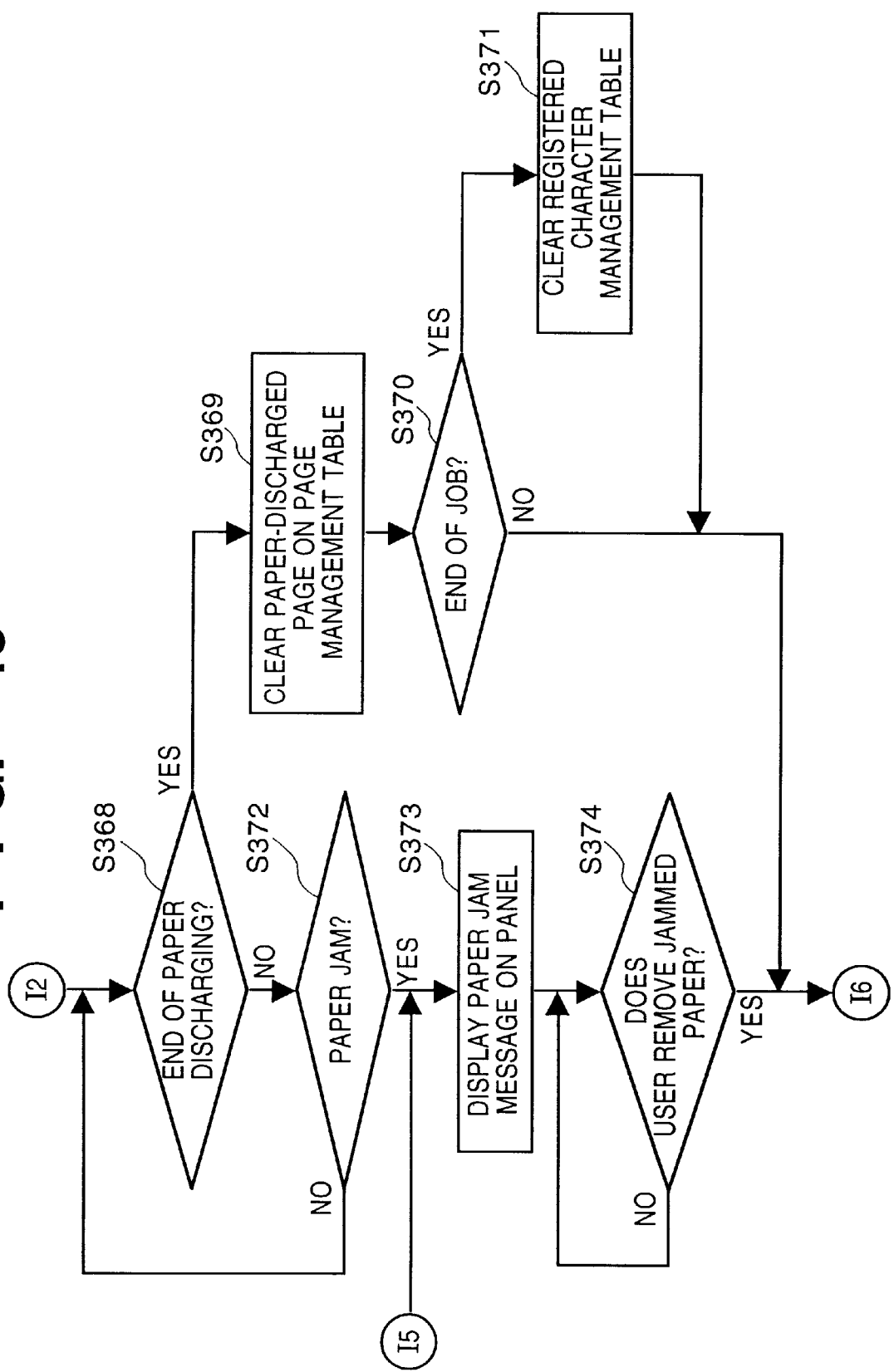
FIG. 43 is a flow chart showing the operation of the interpreter program.

If NO in step S334 or S351, the flow jumps to step S352 in FIG. 42.

In steps S352 to S367, video signal output processing to the engine unit 4 is done in units of bands.

The program checks in step S352 if the variable np is 1. That is, the program checks if the band of interest is the first band of a certain page. If YES in step S352, the program supplies a paper feed start instruction to the engine unit 4 in step S353, and checks in step S354 if the engine unit 4 has detected an out-of-paper state. If YES in step S354, the program waits until the user additionally sets paper sheets in step S355, and the flow jumps to step S358. If NO in step S354, i.e., if paper sheets are set, the flow jumps to step S358.

On the other hand, if it is determined in step S352 that the band of interest is not the first band, the program waits for the end of video transfer of data for the previous band in step S356. During waiting, the program always monitors in step S357 if paper jam has occurred. If paper jam has occurred, the flow jumps from step S357 to step S373 to recover from paper jam.

If YES in step S356, i.e., if video transfer of data for the previous band is complete, the program checks in step S358 if the variable t is 0. If YES in step S358, the program supplies a blank band output processing instruction together with the value of the variable hb as the band height to the image expansion/video transfer circuit 73 in step S359, and the flow then jumps to step S367.

If NO in step S358, the program checks in step S360 if the variable t is 1. If YES in step S360, the program sends a video signal output instruction from the band A 71 together with the value of the variable hb as the band height to the image expansion/video transfer circuit 73 in step S361, and the flow then jumps to step S367.

If NO in step S360, the program checks in step S362 if the variable t is 2. If YES in step S362, the program sends a video signal output instruction from the band B 72 together with the value of the variable hb as the band height to the image expansion/video transfer circuit 73 in step S363, and the flow then jumps to step S367.

If NO in step S362, the program checks in step S364 if the repeat band number is other than −1. If YES in step S364, in step S365 the program instructs the image expansion/video transfer circuit 73 to output a video signal while expanding compressed image data of a single image block in a band designated by the repeat band number to have the value of the variable hb as the band height. Subsequently, the flow advances to step S367.

If NO in step S364, in step S366 the program instructs the image expansion/video transfer circuit 73 to output a video signal while expanding a signal image block included in the np-th band data to have the value of the variable hb as the band height. Thereafter, the flow advances to step S367.

In step S367, the program increments the variable np by 1, and the flow then returns to step S326 to start mapping of the next band data onto the band memory and video signal output processing.

If NO in step S326, output processing of all the bands is complete, and the program waits for completion of discharging of the printed paper sheet in step S368 and the subsequent steps. The program checks in step S368 if paper discharging is complete. If NO in step S368, the program checks in step S372 if paper jam has occurred. If NO in step S372, the flow returns to step S368 to form a loop, thus waiting for completion of paper discharging.

If the program determines in step S368 that paper discharging is complete, the program clears the description of the paper-discharged page on the page management table 13 in step S369, and checks the end of job in step S370 i.e., if all the pages of a single document have been discharged. If YES in step S370, the program clears the registered character management table 14 in step S371, and the flow returns to step S321 to wait for data reception of the next document job.

On the other hand, if NO in step S370, the flow also returns to step S321 to wait for data reception of the subsequent page of that document.

If YES in step S372, the program displays a paper jam message on the panel in step S373, and waits until the user removes the jamming paper sheet in step S374. If the paper sheet has been removed, the flow returns to step S321, and the program re-executes mapping of the received page data onto the band, video output, and paper discharging, which have already been done previously.

Note that the program clears page registration on the page management table 13 in step S369. The reception management program 51 confirms that this area has been cleared, and then instructs the reception unit 6 of a new limit value of the received data write position.

<Effects Unique to Third Embodiment>

(1) In this embodiment, the driver analyzes the image pattern on the frame buffer, and if it detects that identical patterns repetitively appear in units of bands, the driver sends only a repetition command as data of such repetitive band portions. Hence, the volume of image data to be transferred can be reduced. Also, the transfer time can be shortened. Furthermore, the memory capacity of the reception buffer on the printer side can be reduced.

(2) As has been described above using FIG. 35, this embodiment is effective for printing a table document or the like which often includes repetitive patterns.

[Fourth Embodiment]

The fourth embodiment will be explained below with reference to the accompanying drawings.

<System Arrangement>

In the fourth embodiment, when a giant image that cannot be stored in the reception buffer of the printer is to be printed, the reception buffer is divided into some portions, and an image portion in one divided portion is output while another portion receives and stores another image portion, in place of the printing control method described in the first to third embodiments, thereby printing a giant image by repeating the above-mentioned operations.

More specifically, the system of this embodiment is based on the third embodiment. All data in a document are processed as image data, most of the RAM area of the printer is used as a reception buffer, and data for a giant image page on the reception buffer is directly subjected to image expansion and video transfer to the engine unit in the image expansion/video transfer circuit, thus printing a document including a giant image page. Since the constituting elements, program operations, and the like of the fourth embodiment are substantially the same as those in the third embodiment, the differences will be mainly elaborated upon.

In the following description, the printing mode in the third embodiment will be referred to as a "synthesis mode". This is because character and image data are separately processed on the host, and character and image data are ORed (synthesized) and output on the printer. A mode for outputting a giant image will be referred to as a "simplified synchronization mode" hereinafter. This is because when image data for one page is giant or has a large size, printing is done by passively synchronously repeating data transfer in units of bands from the host and feeding of a paper sheet in the printer as data are received.

Figure 59B:
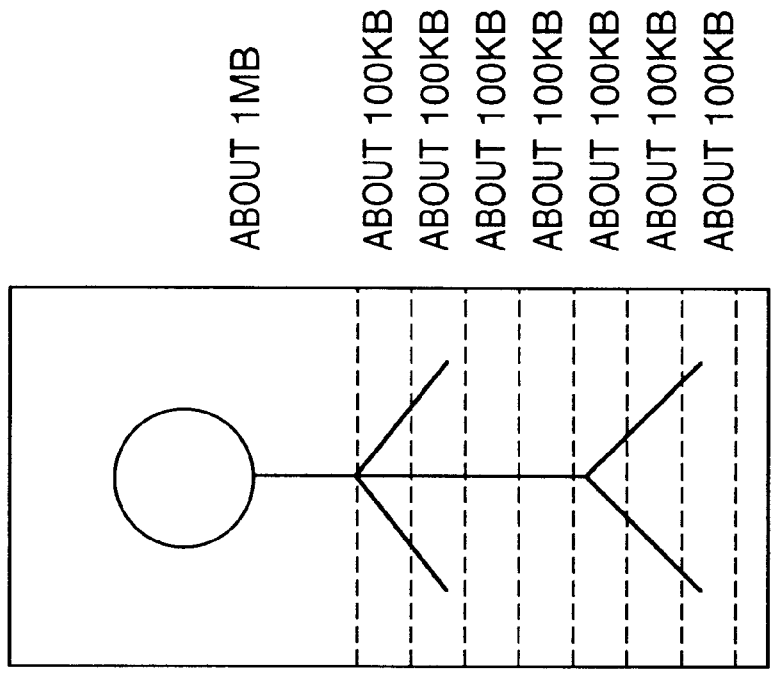
FIGS. 59A and 59B are views showing the principle of the procedure for outputting a huge image.
Figure 59A:
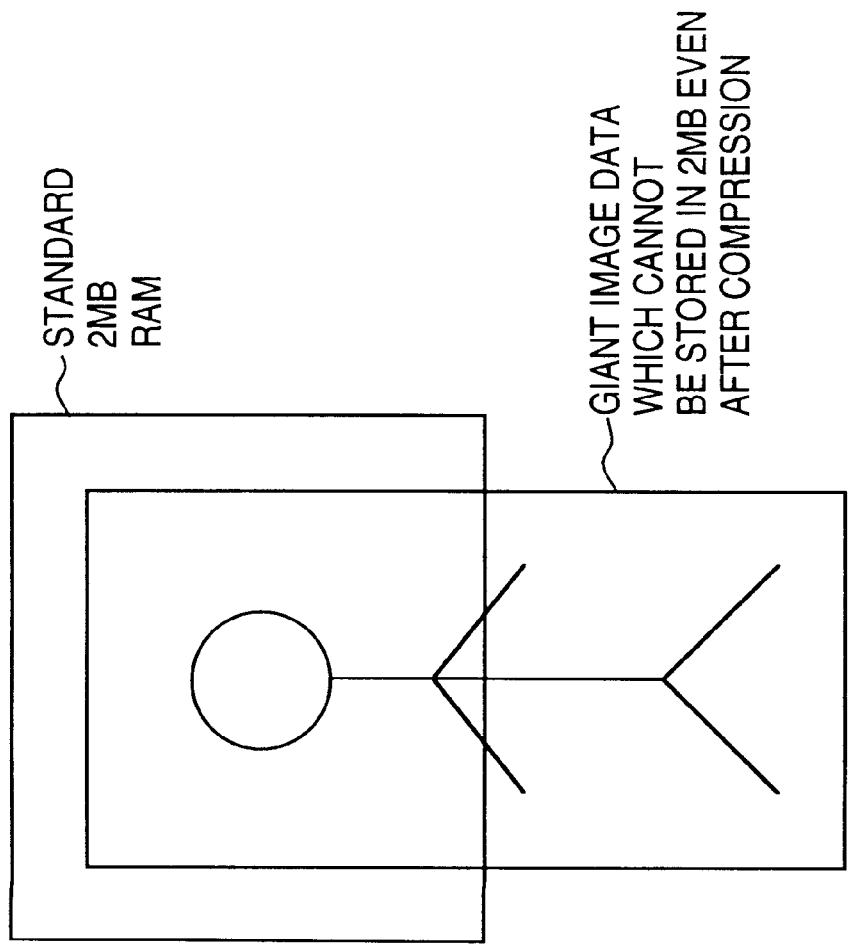
Figure 60:
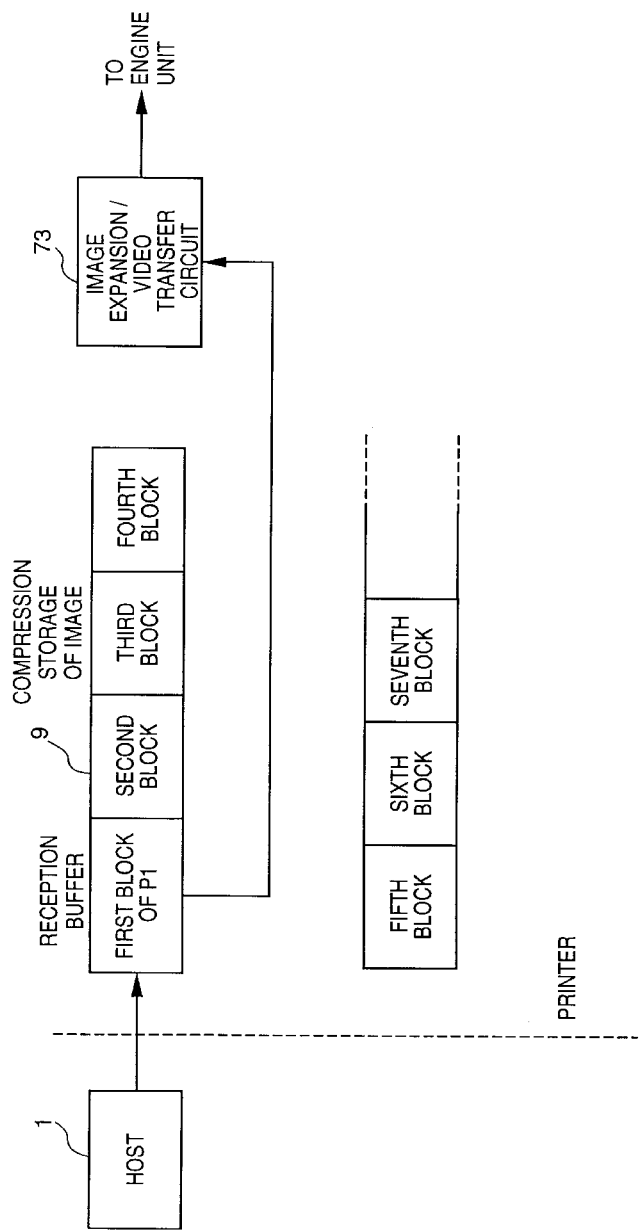
FIG. 60 is a view showing the state of a printer upon outputting an image having a large data size.

FIGS. 59A, 59B, and 60 are view for explaining the principle of the simplified synchronization mode. Assume that the printer of this embodiment comprises a 2 MB memory as the reception buffer. FIG. 59A shows a giant image which exceeds the reception buffer capacity even if it is compressed. The printer driver on the host breaks up such giant image into a single 1 MB block and 100 KB blocks, and sends these blocks to the printer, as shown in FIG. 59B.

FIG. 60 shows a state wherein the printer receives and reconstructs the image blocks sent as shown in FIG. 59B, and prints the image. The image blocks received from the host are compressed and stored in the RAM 9 in units of blocks. The printer expands these blocks one by one, and prints out the expanded data. Since the second and subsequent blocks are smaller than the first block and can be expanded quickly, the expansion time does not produce any overrun. In the fourth embodiment, the above-mentioned "synthesis mode " and "simplified synchronization mode" are combined.

Figure 44:
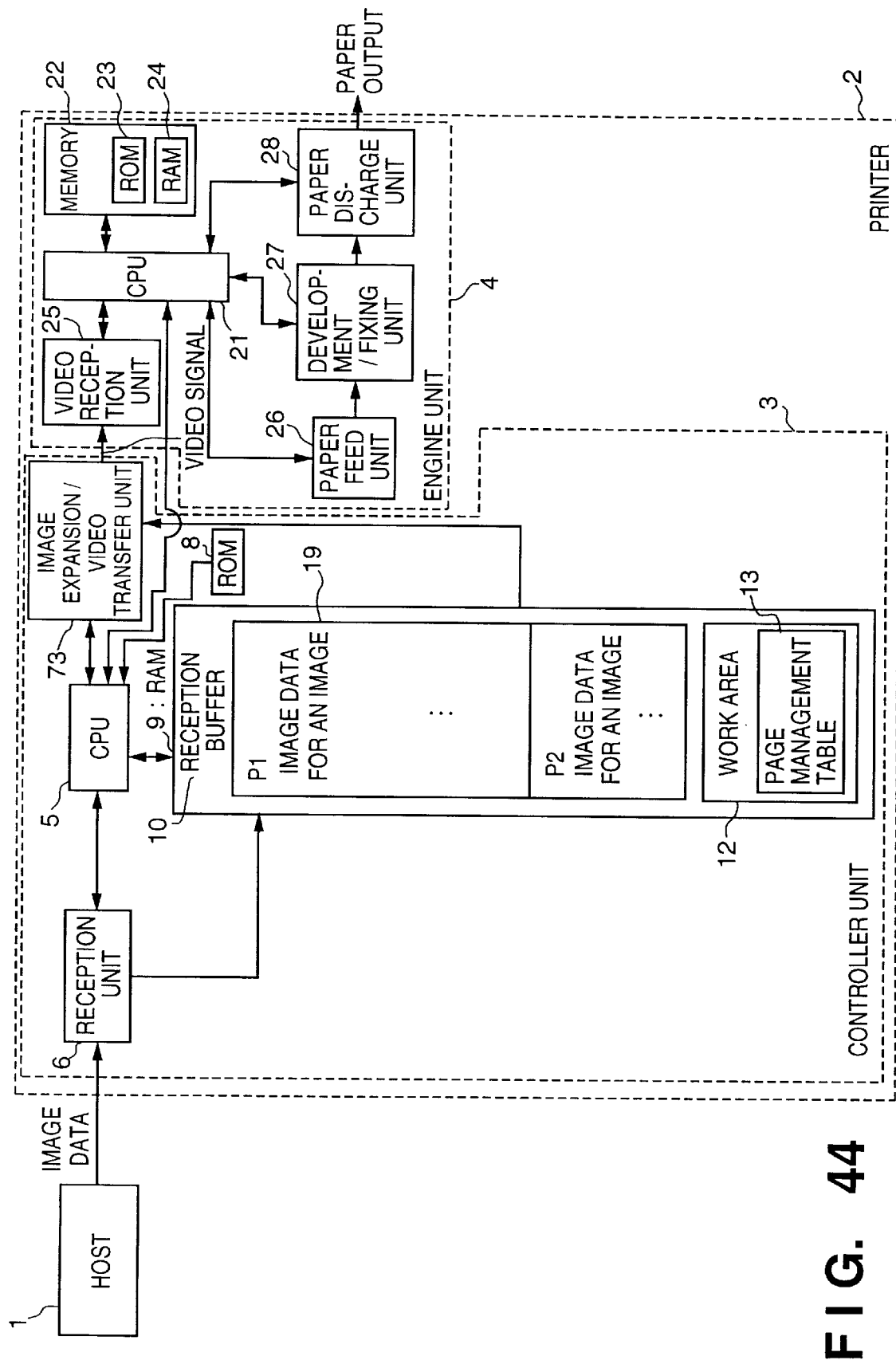
FIG. 44 is a block diagram showing the arrangement of the overall system according to the fourth embodiment.
Figure 47:
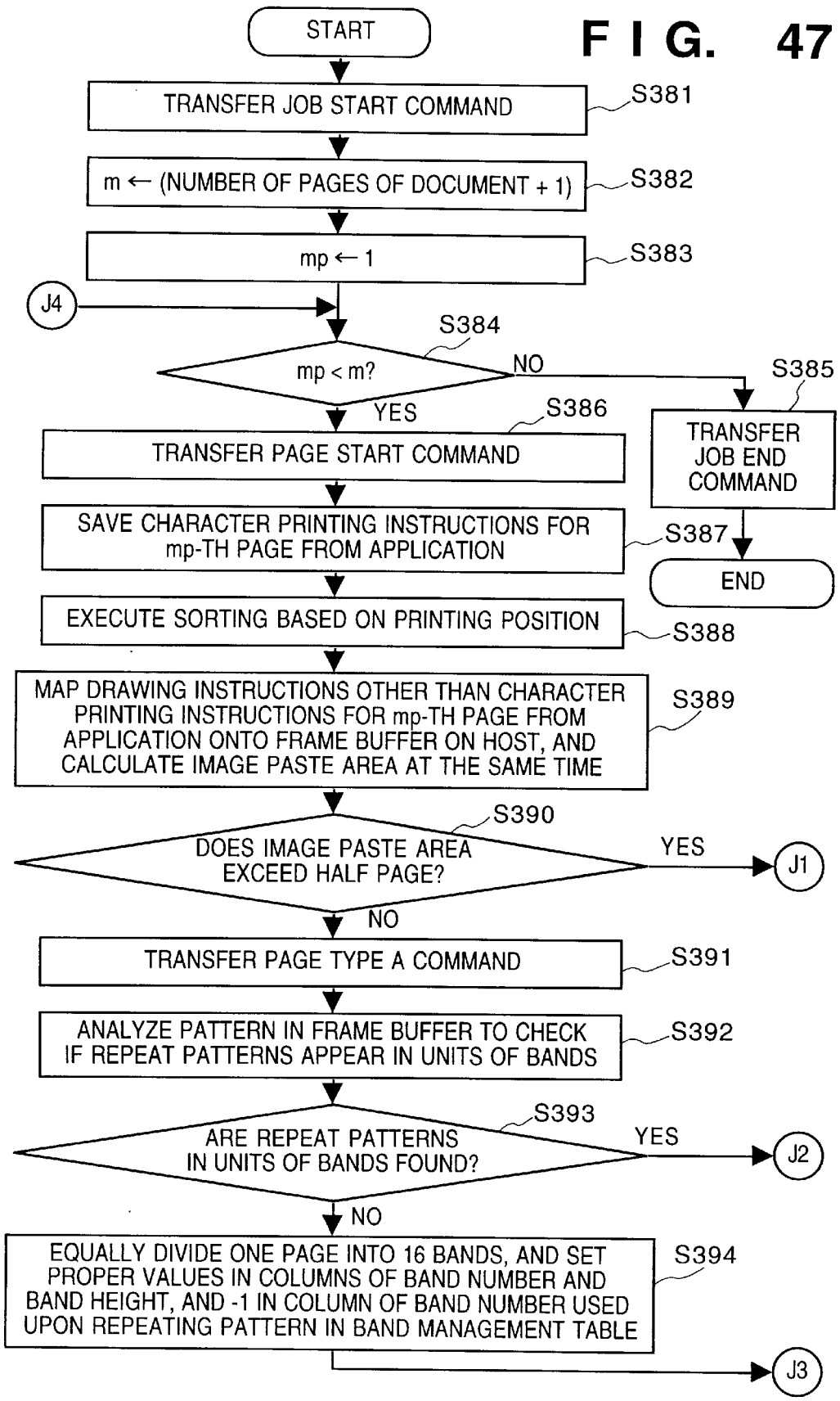
FIG. 47 is a flow chart showing the operation of a printer driver.

FIG. 44 is a block diagram showing the arrangement when the controller unit 3 operates in the "simplified synchronization mode". The block diagram of the arrangement when the unit 3 operates in the "synthesis mode " corresponds to FIG. 18 of the second embodiment. The difference between FIGS. 18 and 44 is the internal arrangement on the RAM 9.

Such difference in arrangement of the RAM is mainly defined by the reception unit 6 and the printing data processing procedure of the image expansion/video transfer circuit 73, and the RAM never has any permanent areas. Hence, it is easy to selectively use the arrangements of the RAM shown in FIGS. 18 and 44 depending on the data processing procedures.

The difference between the two modes will be examined below particularly in reference to the reception buffer. In the "synthesis mode", the RAM comprises the reception buffer 10, band A 71, band B 72, page management table 13, registered character management table 14, registered character data area 15, and the like. If the RAM 9 has a 2 MB capacity, the area that can be assured as the reception buffer 10 is at most about 1 MB. In the "simplified synchronization mode", only the reception buffer 10 and page management table 13 are allocated on the RAM 9. If the RAM 9 has a 2 MB capacity, the area that can be assured as the reception buffer 10 is as large as about 1.7 MB.

Assuming that a 600-dpi picture image is pasted onto the entire page having an A4 paper size, the data capacity is as large as about 1.8 MB although it varies depending on the compression method. If the reception buffer 10 has a capacity of 1.7 MB, data for one page can be stored in the reception buffer 10 even in case of a document including a considerably large image, and can be printed. Even when data for one page slightly exceeds 1.7 MB, since the "simplified synchronization mode" passively synchronously outputs data as they are received, print errors are rarely produced.

However, in the "synthesis mode" that can only assure a 1 MB reception buffer 10, data for one page cannot be stored in the reception buffer 10 and cannot often be printed depending on documents.

Note that the image expansion circuit 16 and character expansion circuit 17 shown in FIG. 18 are omitted in FIG. 44, and are not used in the "simplified synchronization mode". That is, these circuits may or may not be arranged. In other words, the hardware constituting elements of the fourth embodiment can be the same as those in FIG. 18 of the second embodiment.

Another difference between FIGS. 18 and 44 is that the data to be transferred from the host 1 to the printer 2 includes both character and image data in the "synthesis mode" shown in FIG. 18 but includes image data alone in the "simplified synchronization mode" shown in FIG. 44.

FIG. 45 is an explanatory view of the command structure of character data and image data to be sent from the host 1 to the printer 2. FIG. 45 shows printing job data for a certain document, and data for the first page is sent as a page of the "synthesis mode". Although data for the second page is also sent as a page of the "synthesis mode", this page has a large image quantity and the 1 MB reception buffer 10 may overflow upon receiving data for this page alone. Hence, the data for the second page is cleared, and is output again as a page of the "simplified synchronization mode", thus ending the job.

The commands shown in FIG. 45 are substantially the same as those in FIG. 36 in the third embodiment, except that a page type A command 91 or page type B command 92 is added in units of pages, and a page clear command 93 may be added at the end of page data. Data for a page added with the page clear command 93 is not printed but is cleared. On the other hand, data for a page added with the page type A command 91 is that of the "simplified synchronization", and data for a page added with the page type B command 92 is that of the "simplified synchronization mode". That is, each of these commands selects the environments of the RAM 9 shown in FIGS. 18 and 44 in units of pages.

In case of the page of the "simplified synchronization mode", a single band includes only one single image block. At this time, a type command 34 can only indicate 5, i.e., image block commands.

Furthermore, in case of the page of the "simplified synchronization mode", if the size of the compressed data for one page falls within 1 MB, one band and one image block alone need only be transferred. As for a portion exceeding 1 MB, every time compressed data has exceeded 100 KB, one band and one image block are formed, and this processing is repeated.

Such processing is included in the print command generation processing done by the driver on the host 1, and can print a giant image page that may exceed the 1.7 MB reception buffer 10 by passive synchronization.

The names of the programs installed in the ROM 8 of the controller unit 3 are the same as those in the contents shown in FIG. 21 of the second embodiment. The operation of this embodiment is substantially the same as that in the second embodiment, except for the reception management program 51 and interpreter program 52. The operation of the image expansion/video transfer circuit 73 is the same as that in the second embodiment, and a detailed description thereof will be omitted. The operations of the driver on the host 1, reception unit 6, reception management program 51, and interpreter program 52 will be described in detail later with reference to the flow charts.

FIGS. 46A and 46B are views for explaining the structure of the page management table 13.

The table 13 has four items, i.e., a page number indicating the reception order, start address of received page data, end address of received page data, and mark indicating if the received page data has too large a size.

The interpreter program 52 starts its processing from number 1. Upon completion of interpretation and paper discharging, data for the paper-discharged page is cleared, and data for the page of number 2 is updated to number 1. Then, interpretation of that page is started.

FIG. 46A shows the state of the "synthesis mode" or the state wherein the data volume per page does not exceed the capacity of the reception buffer 10 even in the "simplified synchronization mode". FIG. 46B shows the state wherein the data volume per page has exceeded the capacity of the reception buffer 10. The reception buffer stores data for a giant page alone, reception of which is underway, the reception management program 51 instructs the interpreter program 52 of printing in the passive synchronization mode, and the printing is in progress.

Note that the reception management program 51 issues a printing instruction of the passive synchronization mode after data for all the pages before giant page data are printed and corresponding paper sheets are discharged. For this reason, the reception buffer stores giant page data alone, as shown in FIG. 46B.

When the environment of the RAM 9 is switched between the "synthesis mode" and "simplified synchronization mode", switching is done after data for all the pages are printed and corresponding paper sheets are discharged. This is because since switching includes changes in size of the reception buffer 10, if the size of the reception buffer 10 is reduced while page data are left, some page data may be lost.

<System Control>

The operation of the fourth embodiment will be described below with reference to the flow charts.

The operations of the driver, reception unit 6, reception management program 51, and interpreter program 52, which are different from those in the third embodiment, will be explained.

(Printer Driver)

FIGS. 47 to 51 are flow charts for explaining the operation of the printer driver on the host 1. The printer driver generates character and image printer commands described above with the aid of FIG. 45 from document data created by an application software program used by the user, and transfers them to the printer 2. When the user instructs document printing from the application software program, the printer driver is started in the host 1.

At the time of starting, the driver assures a frame buffer (not shown) for one page on a memory of the host 1 and clears the frame buffer at the same time. Upon completion of document printing by the driver, the memory area used as the frame buffer is released.

The driver transfers a job start command 31 to the printer 2 in step S381, sets the value as the sum of the number of pages of a document to be printed and 1 in a variable m in step S382, and sets 1 in a variable mp indicating the page number in processing in step S383. The driver checks in step S384 if the variable mp is smaller than the variable m. If NO in step S384, the processing for all the pages of the document is complete, and the driver transfers a job end command in step S385, thus ending its processing.

If YES in step S384, the driver transfers a page start command 32 to the printer 2 in step S386, saves character printing instructions of the mp-th page from the application program in step S387, sorts the saved character printing instructions based on their print positions in step S388, and maps drawing instructions other than character printing instructions for the mp-th page from the application program onto the frame buffer on the host 1 in step S389. The drawing instructions other than the character printing instructions include ruled line and figure drawing instructions, image paste instructions, and the like. At the same time, the total image paste area is calculated.

In sorting of the character printing instructions based on their printing positions in step S388, the character printing instructions are sorted based on their printing positions in the longitudinal direction of a paper sheet, and are then sorted based on their printing positions in the widthwise direction of the paper sheet. When an A4-size paper sheet is set in the portrait position, the instructions are sorted from the upper to lower positions, and are then sorted from the left to right.

The driver then checks in step S390 if the total image paste area has exceeded half a page. If YES in step S390, i.e., if it is determined that the page mainly includes image data, the flow jumps to step S426 in FIG. 50 to start processing in the "simplified synchronization mode". If NO in step S390, i.e., if it is determined that the page mainly includes character data, the flow advances to step S391, and the driver transfers a page type A command 91 to the printer 2.

The driver analyzes the contents of the frame buffer by pattern recognition to check in step S392 if the mapped image includes repetitive image patterns in units of bands, and then checks in step S393 if repetitive patterns are found. If NO in step S393, since the image for one page is equally divided into 16 bands, in step S394 proper values are set in the columns of band number, band height, and band number used upon repeating a pattern in a band management table. Especially, −1 is set in the column of band number used upon repeating a pattern. Thereafter, the flow jumps to step S398.

Figure 48:
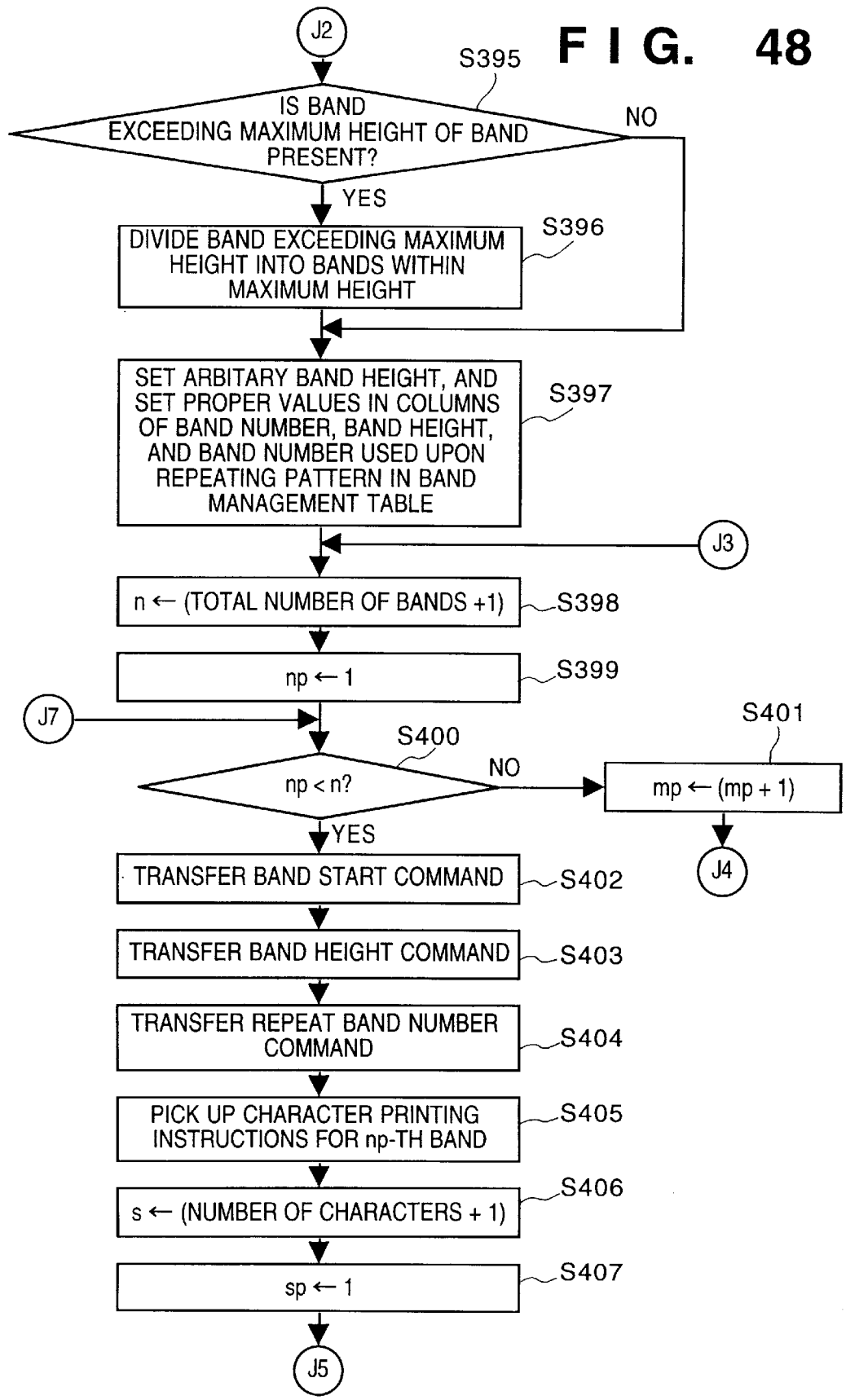
FIG. 48 is a flow chart showing the operation of the printer driver.

If YES in step S393, the driver checks in step S395 in FIG. 48 if a band whose band height has exceeded the maximum height, i.e., the height of the band A 71 or B 72 is present. If YES in step S395, in step S396 the driver divides the band that has exceeded the maximum height so that the divided band height becomes equal to or smaller than the maximum band height. After that, the flow advances to step S397. If NO is determined in step S395, the flow also advances to step S397. In this case, since the band height is set not equally but arbitrarily in units of bands, proper values are set in the columns of band numbers, band heights, and a band number used upon repeating a pattern in the band management table in step S397. The flow then advances to step S398.

Note that the band management table is allocated on the host 1 for the purpose of convenience upon generating print commands associated with bands by the driver, and includes three items, i.e., the band number, band height, and band number column used upon repeating an image pattern.

In step S398, the driver sets a value obtained by adding 1 to the total number of bands in a variable n. The driver sets 1 in a variable np indicating a band number in step S399, and checks in step S400 if the variable np is smaller than the variable n. If NO in step S400, this means that processing for all the bands in one page is complete, and the driver increments the variable mp by 1 in step S401. Next, the flow returns to step S384 to start the band output processing for the next page.

If YES in step S400, the driver transfers a band start command 81 to the printer 2 in step S402, a band height command 82 in step S403, and a repeat band number command 83 in step S404. If the current band does not include any repetitive image, the command 83 set with −1 is transferred.

The driver picks up character printing instructions included in the np-th band from the saved printing instructions from the application program in step S405, sets a value obtained by adding 1 to the number of picked-up characters in a variable s in step S406, and sets 1 in a variable sp in step S407.

Note that the character printing instructions to be picked up in step S405 include those of characters which are included in the np-th band albeit partially. Hence, some characters are printed across two bands depending on their printing positions.

Figure 49:
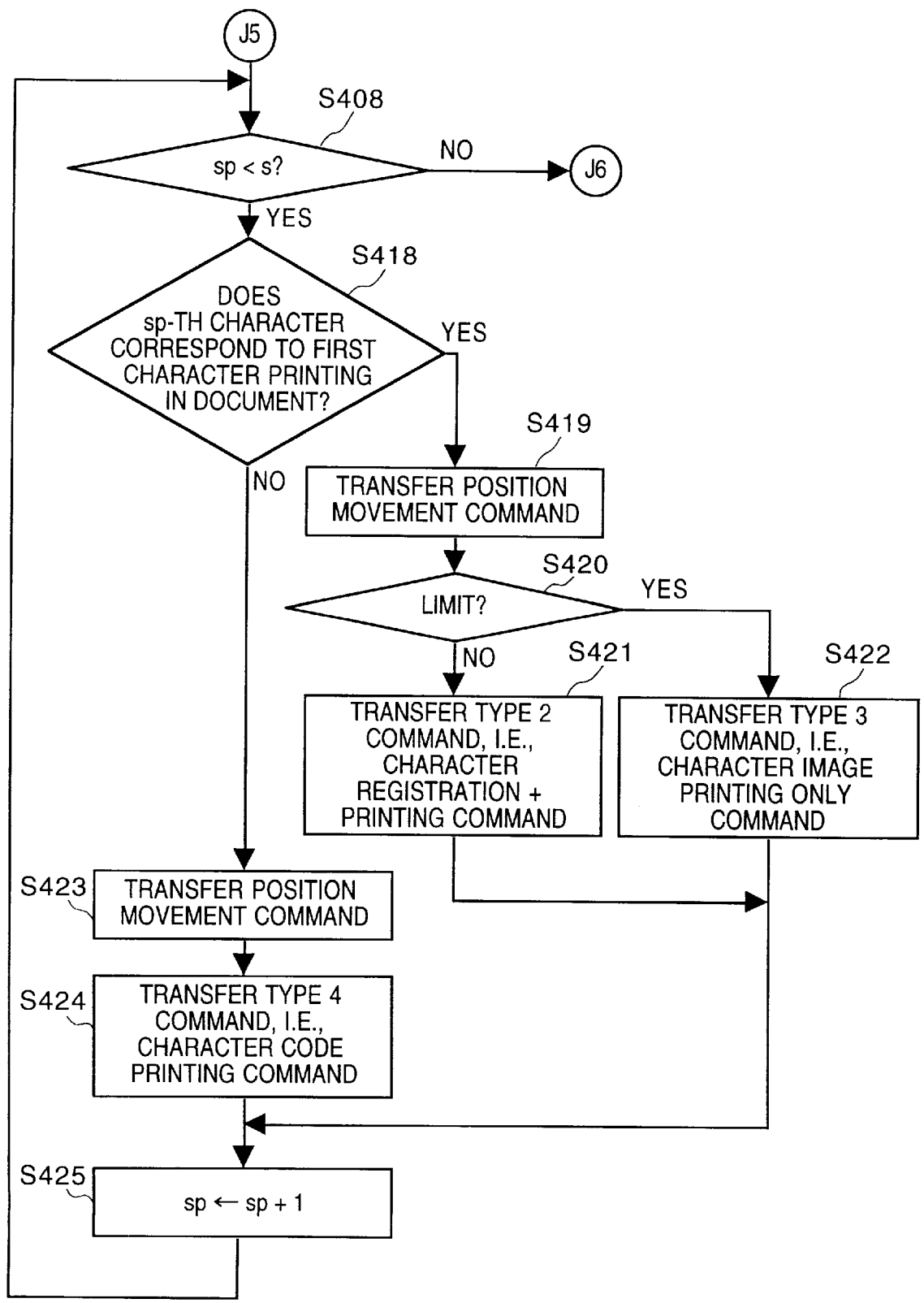
FIG. 49 is a flow chart showing the operation of the printer driver.

The driver checks in step S408 in FIG. 49 if the variable sp is smaller than the variable s. If NO in step S408, it is determined that all the character data included in the np-th band have already been transferred, and transfer of image data for the np-band is started in step S409 and the subsequent steps. That is, the driver checks in step S409 if the current band is a repeat band. If YES in step S409, the flow jumps to step S417 without any processing.

If NO in step S409, the driver extracts an image corresponding to the position and size of the np-th band from the frame buffer on the host in step S410, and checks in step S411 if the np-band is a blank band. If YES in step S411, the flow jumps to step S417 without any processing.

If NO in step S411, the driver extracts a rectangular region actually including an image as a single block in step S412, and checks in step S413 if the data volume per page exceeds the reception buffer size when this block is transferred. If NO in step S413, the driver transfers a position movement command 33 indicating the paste position of that block to the printer 2 in step S415, and transfers a command sequence of type 5, i.e., image block commands 45, 46, 47, and 48 to the printer 2 in step S416. Of course, the image block data is transferred in the compressed state.

The driver increments the variable sp by 1 in step S417, and the flow returns to step S400 in FIG. 48 to transfer the next character data to the printer 2.

If YES in step S413, the driver transfers a page clear command 93 in step S414 to cancel paper discharging of this page. Next, the flow jumps to step S426 to retry outputting of this page in the "simplified synchronization mode".

If YES in step S408 in FIG. 49, the driver checks in step S418 if the sp-th character is the first character to be printed in this document. If YES in step S418, the driver transfers a position movement command 33 indicating the printing position to the printer 2 in step S419, and checks in step S420 if the number of registered characters has reached a limit on the printer 2 side. If YES in step S420, the driver transfers a command sequence of type 3, i.e., character image printing only commands 43 and 44, to the printer 2 in step S422, and the flow jumps to step S425.

If NO in step S420, the driver transfers a command sequence of type 2, i.e., character registration +printing commands 41, 42, 43, and 44, to the printer in step S421, and the flow jumps to step S425. Of course, the dot image for each character to be transferred to the printer 2 is compressed.

If NO in step S418, since it indicates that this printing instruction is the second or subsequent printing instruction of that character, the driver transfers a position movement command 33 indicating the printing position to the printer 2 in step S423, and also transfers a command sequence of type 4, i.e., character code printing commands 41 and 42, to the printer 2 in step S424.

The driver increments the variable sp by 1 in step S425, and the flow returns to step S408 to transfer the next character data to the printer 2.

(Printer Driver: Simplified Synchronization Mode)

Figure 50:
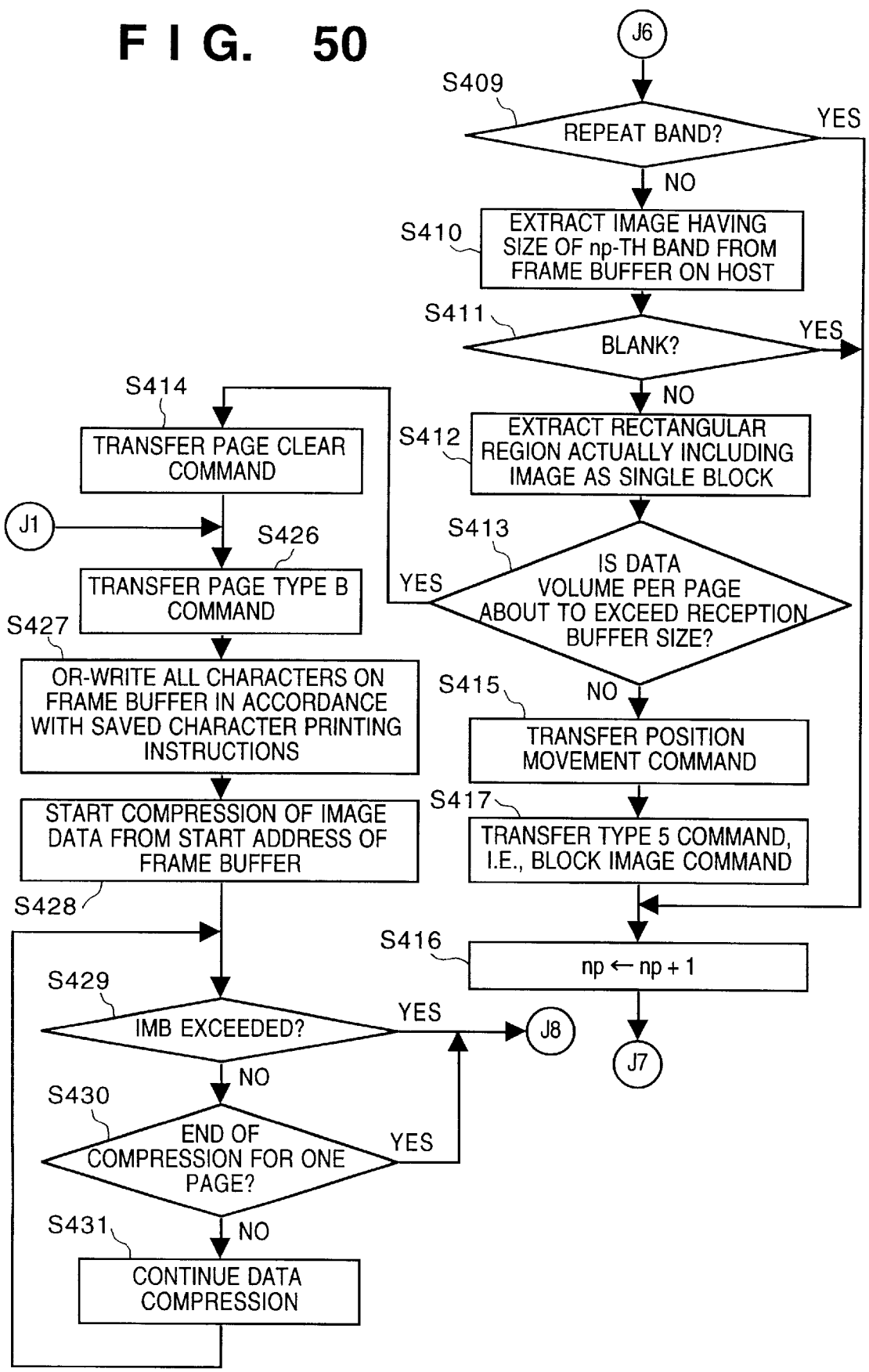
FIG. 50 is a flow chart showing the operation of the printer driver.

Page printing based on the "simplified synchronization mode" in step S426 and the subsequent steps in FIG. 50 will be explained below.

In step S426, the driver transfers a page type B command 92 to the printer 2. In step S427, the driver calculates the OR of the data in the frame buffer and all the characters in accordance with the saved character printing instructions, and writes it in the frame buffer. In step S428, the driver starts compression of image data from that at the start address on the frame buffer.

The driver then checks in step S429 if the compressed data has exceeded 1 MB. If NO in step S429, the driver checks in step S430 if compression of the data for one page is complete. If NO in step S430, the driver continues data compression in step S431, and the flow returns to step S429 to form a loop. That is, the driver waits until compression for one page has been done or the compressed data has exceeded 1 MB.

Figure 51:
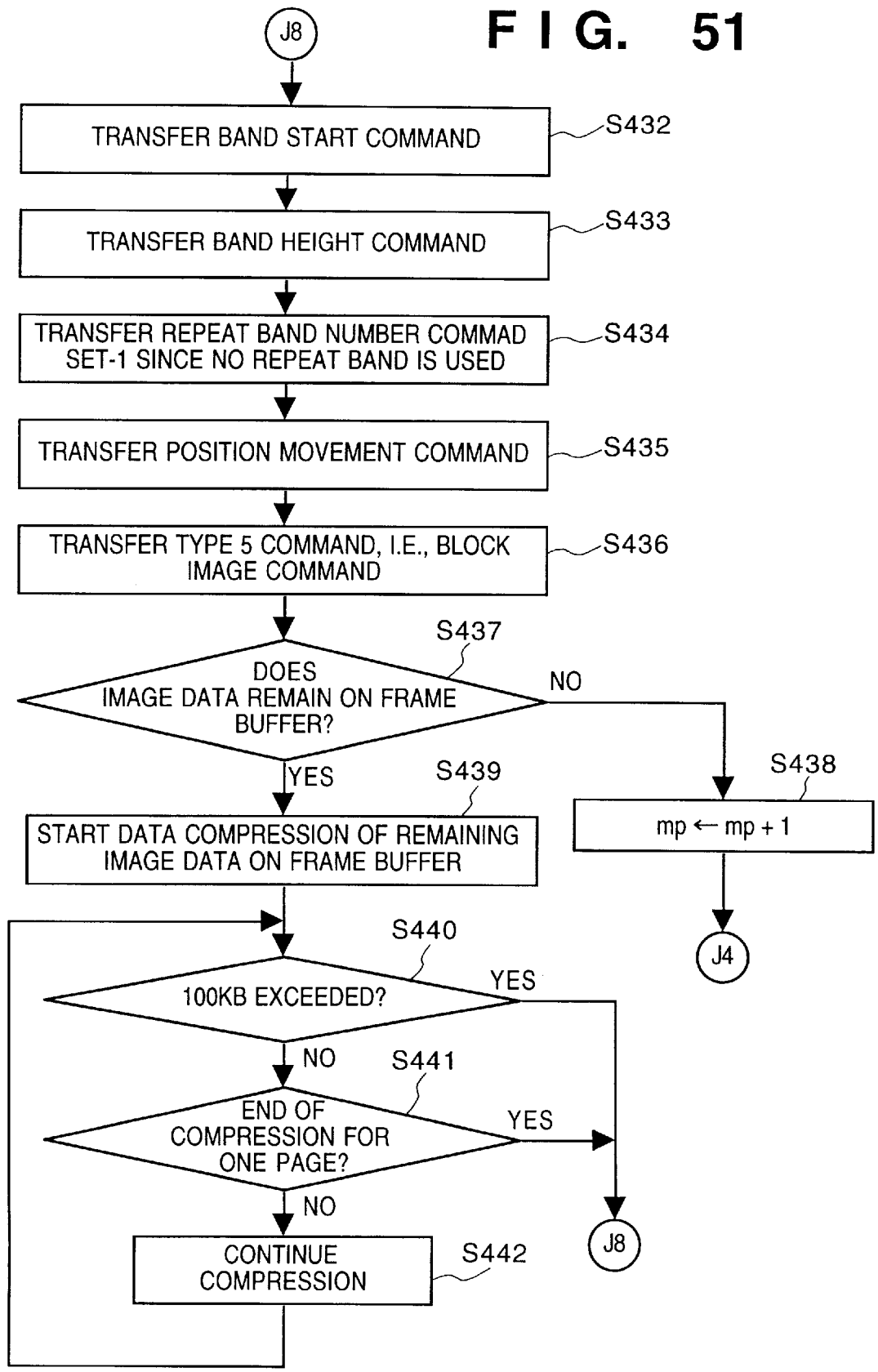
FIG. 51 is a flow chart showing the operation of the printer driver.

If YES in step S429 or S430, the flow advances to step S432 in FIG. 51, and the driver transfers a band start command 81 to the printer 2. The driver then transfers a band height command 82 to the printer 2 in step S433, and also transfers a repeat band number command 83 to the printer 2 in step S434. In this case, since the band is not a repeat band, the command set with −1 is transferred.

The driver transfers a position movement command 33 in step S435, and transfers a command sequence of type 5, i.e., image block commands 45, 46, 47, and 48, to the printer 2 in step S436.

The driver checks in step S437 if any untransferred image data remains on the frame buffer. If NO in step S437, the driver increments the variable mp by 1 in step S438, and the flow returns to step S384 to start band processing of the next page.

If YES in step S437, i.e., if image data still remains, the flow advances to step S439 to start compression of the remaining image data on the frame buffer. The driver checks in step S440 if the compressed data has exceeded 100 KB. If NO in step S440, the driver checks in step S441 if compression for one page is complete. If NO in step S441, the driver continues data compression in step S442, and the flow returns to step S440 to form a loop. That is, the driver waits until compression for one page has been done or the compressed data exceeds 100 KB.

If YES in step S440 or S441, the flow returns to step S432 to transfer the band data to the printer 2.

(Reception Unit 6)

Figure 52:
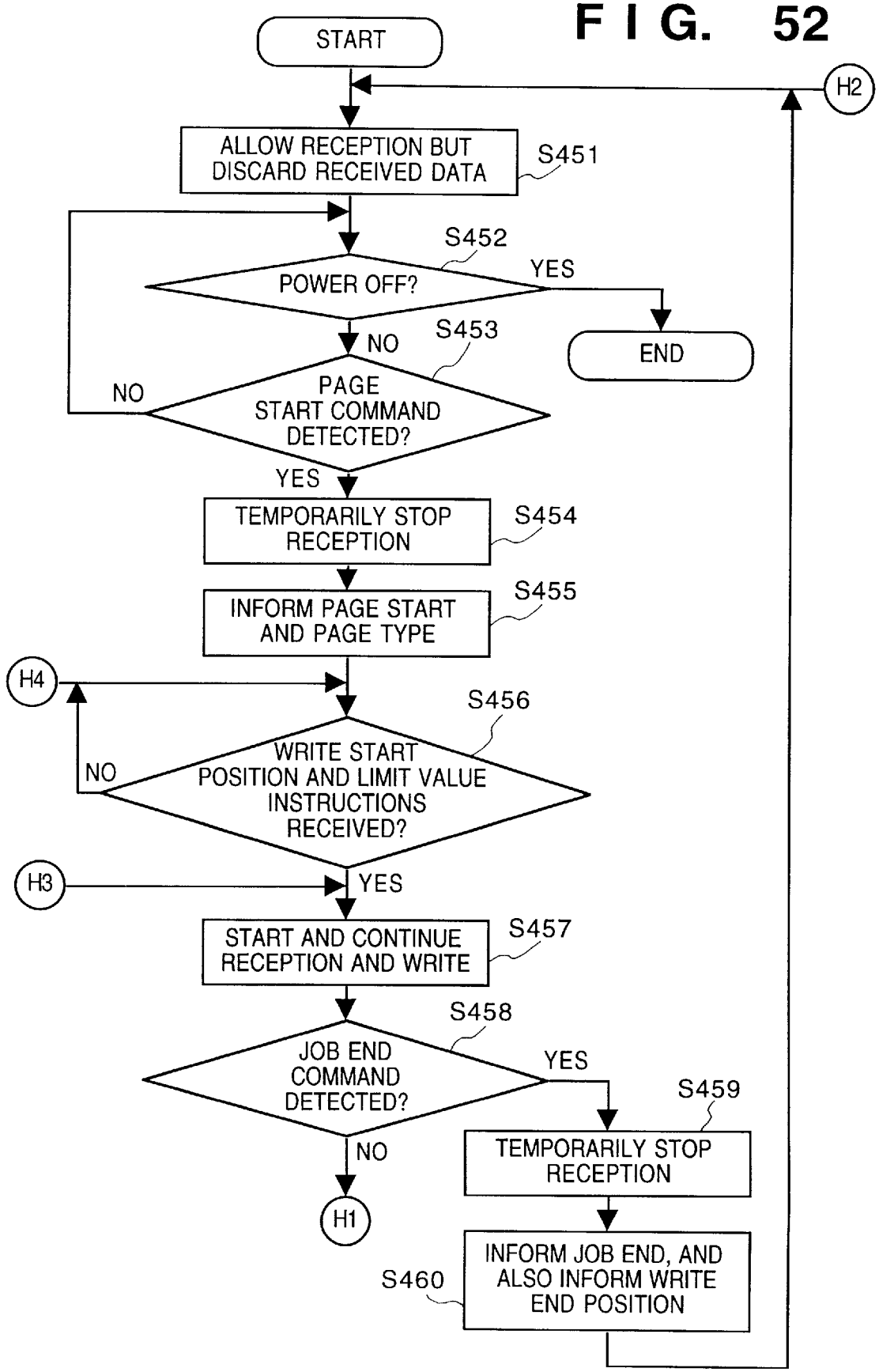
FIG. 52 is a flow chart showing the operation of a reception unit.
Figure 53:
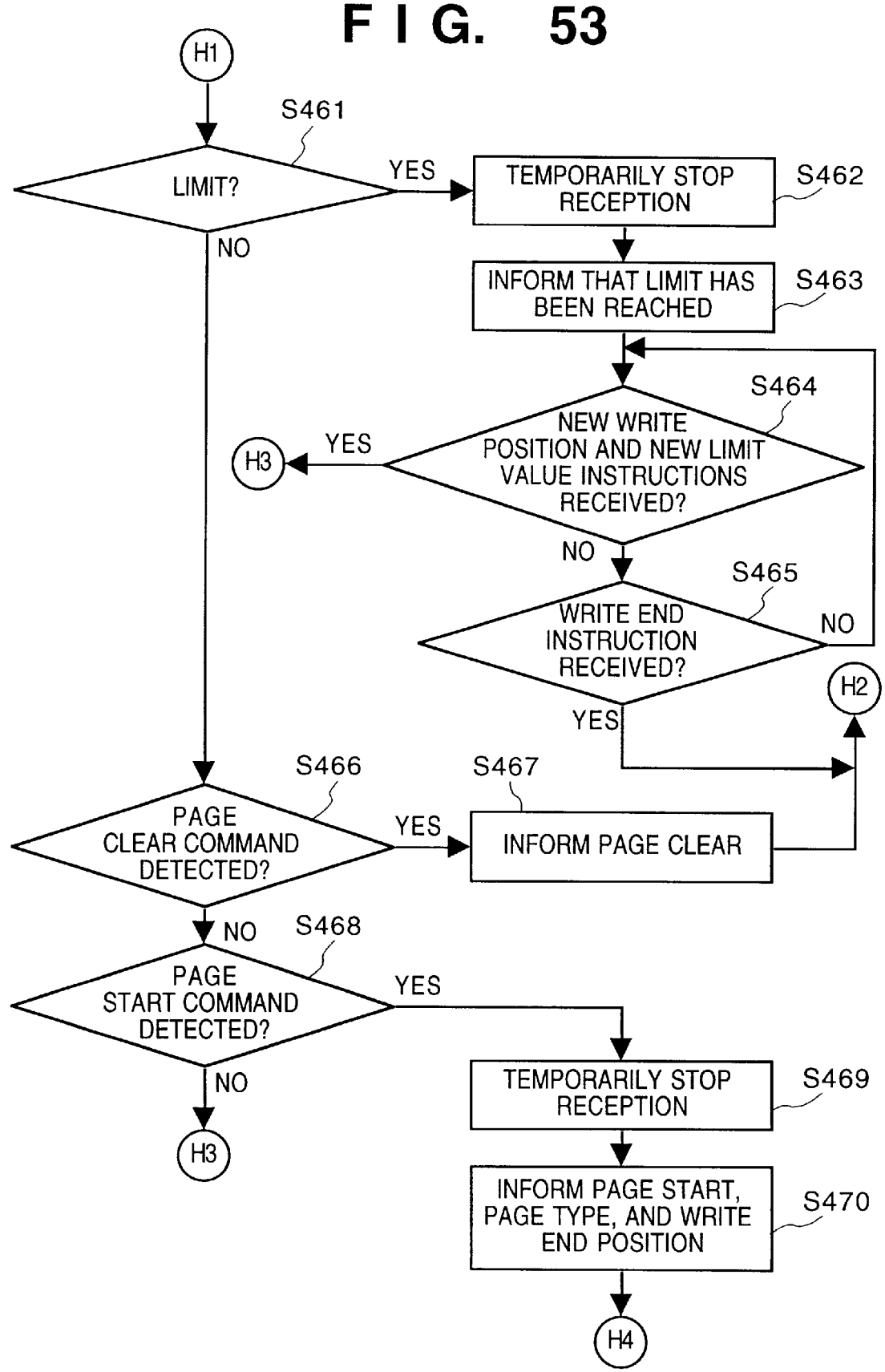
FIG. 53 is a flow chart showing the operation of the reception unit.

FIGS. 52 and 53 are flow charts for explaining the operation of the reception unit 6. Although the reception unit 6 is a hardware circuit and is different from a normal program, its operation order will be explained using the flow charts.

The reception unit that has been explained with the aid of FIGS. 11 and 12 in the first embodiment continuously receives a command sequence from a job start command 31 to a job end command 36. Even when a page start command 32 is inserted in the middle of the sequence, the reception unit 6 receives commands until the job end command without interrupting reception although it informs the reception management program 51 of the reception of it.

However, since the output mode may be switched between the "synthesis mode" and "simplified synchronization mode" in units of pages, the reception unit waits for an instruction from the reception management program 51 at the time of arrival of the page start command 32.

If the output mode is to be changed, the reception management program 51 switches the memory map on the RAM 9 to that for the "synthesis mode" or "simplified synchronization mode" after all the data for the received page are printed and the corresponding paper sheet is discharged. Thereafter, the program 51 instructs the reception unit 6 of a new write position of received data and a new limit value, and makes it start reception of page data. That is, when the output mode is switched, the contents of the reception buffer are temporarily cleared.

On the other hand, when the output mode remains the same, the reception unit need not wait until data for the received page are printed and the corresponding paper sheet is discharged. More specifically, the reception unit need not wait until the reception buffer 10 is temporarily cleared. Page data can be continuously received. However, in this case as well, the reception unit 6 starts reception of the next page data after it receives instructions of the write position of received data and limit value.

The reception unit 6 starts operation immediately after the power switch of the printer 2 is turned on. In step S451, the reception unit 6 is set in the operation state wherein "it can receive data from the host 1 but discards all the received data".

It is then checked in step S452 if the user has turned off the power switch of the printer 2. If YES in step S452, the reception unit 6 ends its operation. If NO in step S452, it is checked in step S453 if a page start command 32 is detected from the received data. If NO in step S453, the flow returns to step S452 to wait for the page start command 32 from the host 1.

If YES in step S453, reception is temporarily stopped in step S454, and the reception unit 6 informs the reception management program 51 of detection of the page start command 32, and the next page type, i.e., detection of a page type A command 91 or page type B command 92 in step S455. Note that the reception is temporarily stopped by setting the printer 2 busy to deny reception of data from the host 1.

In step S456, the reception unit 6 waits until it receives instructions of a write start position to the reception buffer 10 and limit value. Upon reception of the instructions, the unit 6 starts and continues reception and write of data received from the host 1 onto the reception buffer 10 in step S457.

It is then checked in step S458 if a job end command is received. If YES in step S458, the reception unit 6 temporarily stops reception in step S459, and informs the reception management program 51 of detection of the job end command and the write end position to the reception buffer 10 in step S460. Then, the flow returns to step S451 to wait for reception of the next page data.

If NO in step S458, it is checked in step S461 in FIG. 53 if the write position of the received data has reached the limit value. If YES in step S461, in step S463 the unit 6 temporarily stops reception in step S462 and informs the reception management program 51 that the limit value has been reached.

It is checked in step S464 if instructions of a new write position and new limit value are received from the reception management program 51. If NO in step S464, it is checked in step S465 if a write end instruction is received from the reception management program 51. If NO in step S465, the flow returns to step S464 to form a loop, thus waiting until YES is determined in step S464 or S465.

If YES in step S465, since it indicates that data for this page need not be received any more, the flow returns to step S451 to wait for reception of the next page data.

If YES in step S464, the flow returns to step S457 to restart reception on the basis of the new write position and limit value.

If NO in step S461, it is checked in step S466 if a page clear command 93 is received. If YES in step S466, the unit 6 informs the reception management program 51 of detection of the page clear command 93. The flow then returns to step S451 to wait for reception of the next page data.

If NO in step S466, it is checked in step S468 if a page start command 32 is detected. If NO in step S468, the flow returns to step S457 to continue reception of the page data. If YES in step S468, after the unit 6 temporarily stops reception in step S469, in step S470 it informs the reception management program 51 of detection of the page start command 32 and the next page type, i.e., detection of a page type A command 91 or page type B command 92. Lastly, the flow returns to step S465 to wait for write position and limit value instructions from the reception management program 51. Upon receiving the instructions, a write of received data to the reception buffer 10 is started.

(Reception Management Program)

Figure 54:
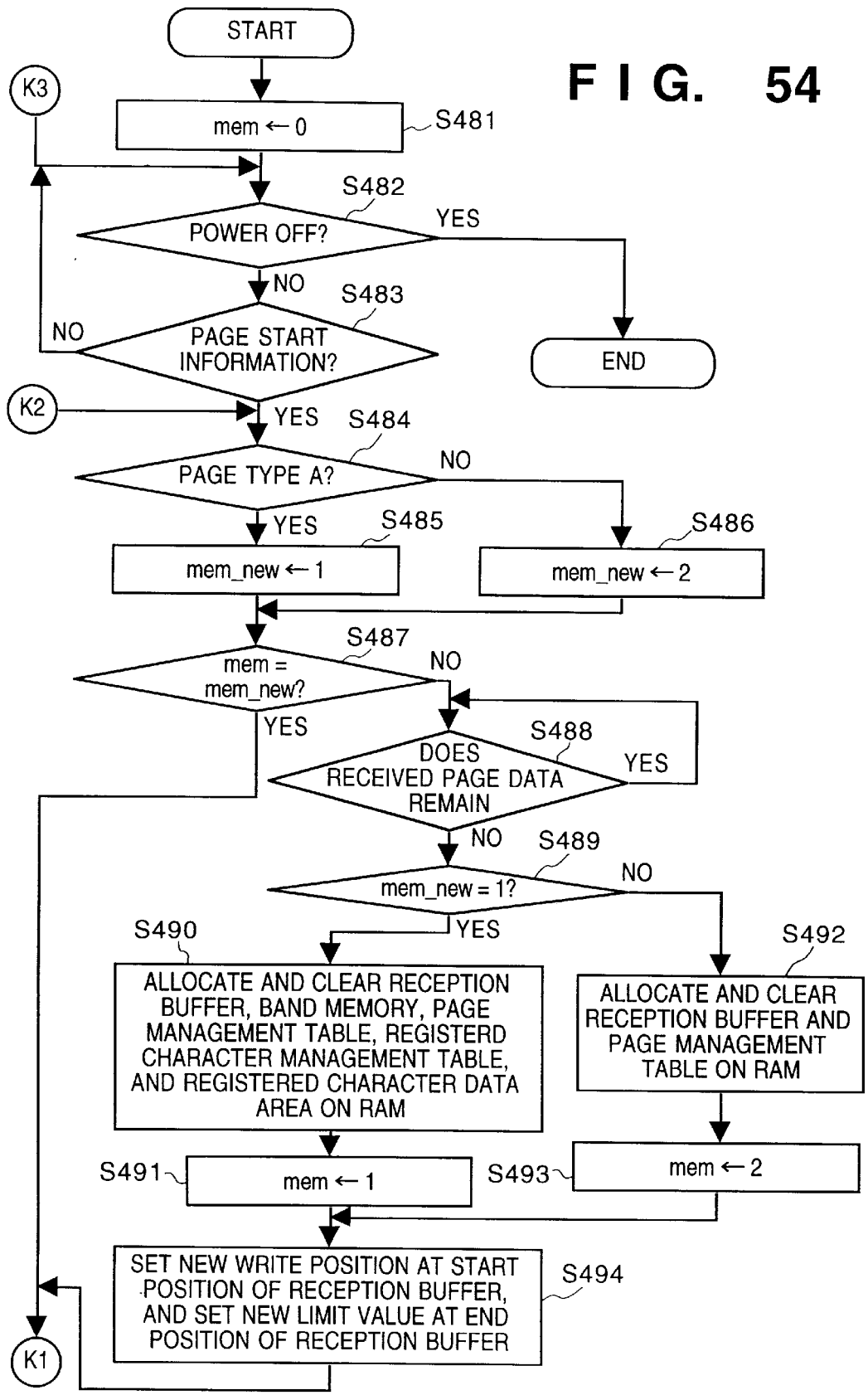
FIG. 54 is a flow chart showing the operation of a reception management program.
Figure 55:
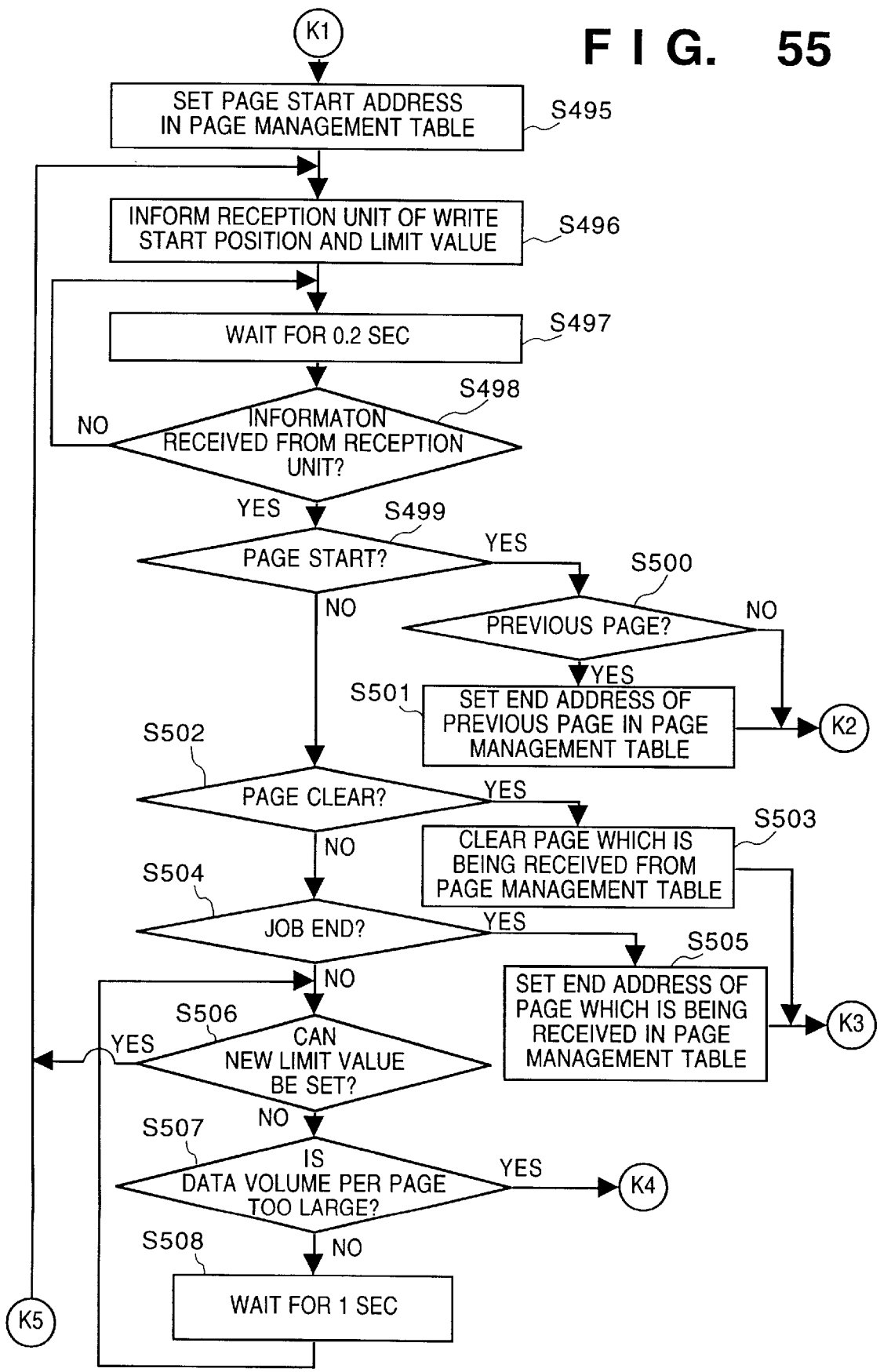
FIG. 55 is a flow chart showing the operation of the reception management program.
Figure 56:
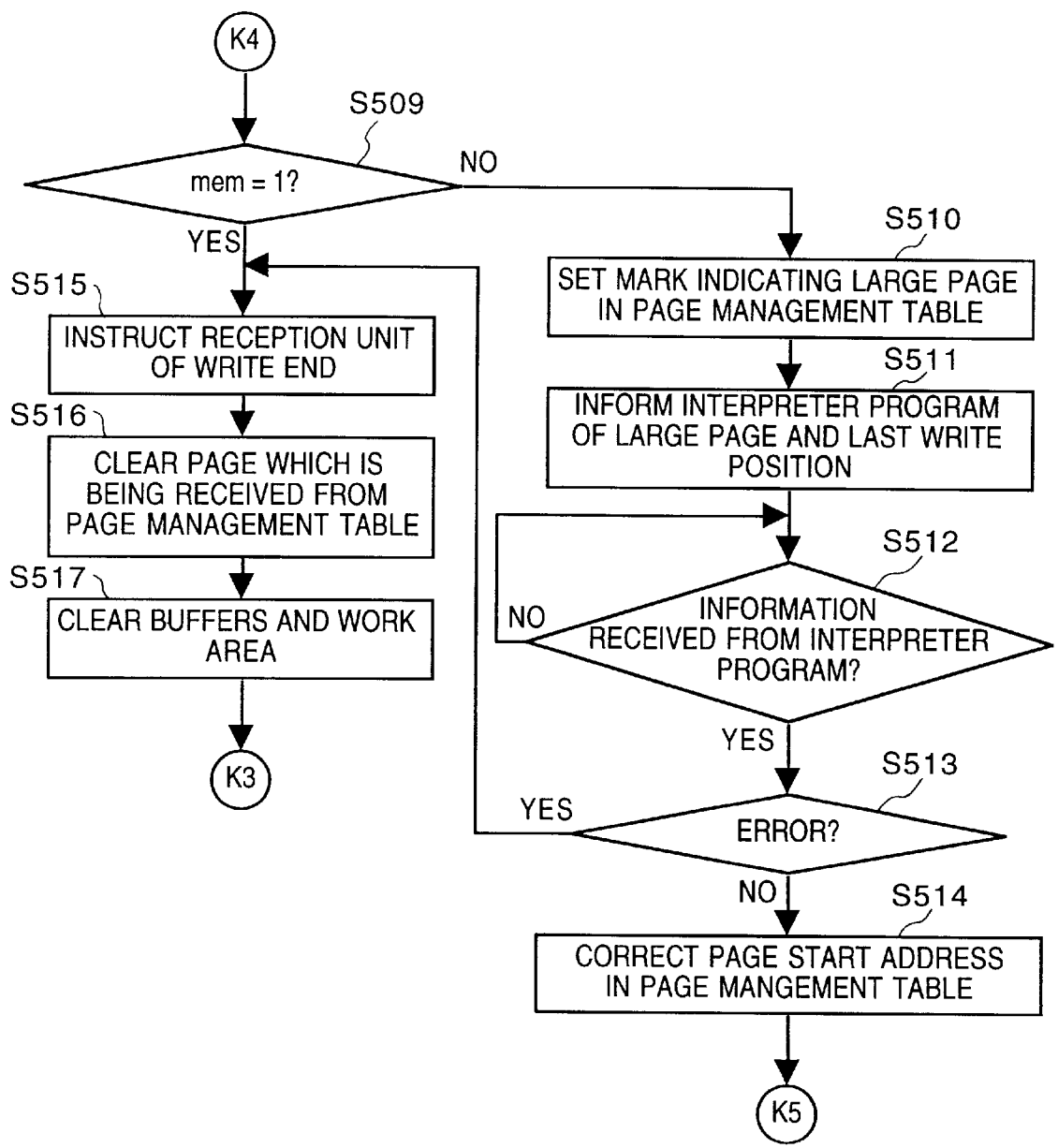
FIG. 56 is a flow chart showing the operation of the reception management program.

FIGS. 54, 55, and 56 are flow charts for explaining the operation of the reception management program 51. As has been mentioned in association with the reception unit 6, the reception management program 51 performs management in units of pages, and supplies write position and limit value instructions to the reception unit 6 every time it receives detection information of the page start command 32 from the reception unit 6, thus making the unit 6 start a write of received data.

Also, the program 51 checks in units of pages if the output mode is the "synthesis mode" or "simplified synchronization mode", and switches the memory map of the RAM 9 to that for the "synthesis mode" or "simplified synchronization mode" in units of pages, as needed.

The reception management program 51 is started simultaneously with power ON of the printer 2. The program sets 0 in a variable mem in step S481, and checks in step S482 if the user has turned off the power switch of the printer 2. If YES in step S482, the program ends its processing. If NO in step S482, the program checks in step S483 if it has received detection information of the page start command from the reception unit 6. If NO in step S483, the flow returns to step S482 to form a loop, and the program waits until it receives the page start information from the reception unit 6.

If YES in step S483, the program checks in step S484 if the type command of that page is a page type A command 91. If YES in step S484, the program sets 1 in a variable mem_new in step S485; otherwise, it sets 2 in the variable mem_new in step S486. Thereafter, the flow advances to step S487 to check if the variable mem equals the variable mem_new.

If YES in step S487, the memory map on the RAM 9 need not be changed, i.e., the previous page data is output in the "synthesis mode" and the current page data is also output in the "synthesis mode", or the previous page data is output in the "simplified synchronization mode" and the current page data is also output in the "simplified synchronization mode". Hence, the flow jumps to step S495 to start original reception processing.

If NO in step S487, since the previous and current page data have different output modes, the program changes the memory map on the RAM 9 to that for the "synthesis mode" or "simplified synchronization method" in step S488 and the subsequent steps, and the flow jumps to step S495 in FIG. 55 to start original reception processing.

In this case, the program checks in step S488 if received page data still remain on the reception buffer 10. If YES in step S488, the program waits by forming a loop until all the remaining page data are interpreted by the interpreter program 52.

If it is confirmed that all the received page data are cleared from the reception buffer 10, the program checks in step S489 if the variable mem_new is 1. If YES in step S489, in step S490 the programs allocates the band memories 71 and 72, page management table 13, registered character management table 14, and registered character data area 15 on the RAM 9 as a memory map for the "synthesis mode", and clears these areas. Note that "clear" herein does not always indicate "clear to 0" but means "initialization". In step S491, the program sets 1 in the variable mem, and the flow jumps to step S494.

If NO in step S489, in step S492 the program allocates only the reception buffer 10 and page management table 13 as a memory map for the "simplified synchronization mode" and clears them. The program sets 2 in the variable mem in step S493, and the flow then jumps to step S494.

In step S494, the program instructs the reception unit 6 of the start position of the reception buffer 10 as a new write position and the end position of the reception buffer 10 as a new limit value. The flow then jumps to step S495 in FIG. 55.

In step S495 in FIG. 55, the program sets a start address of page data to be received on the reception buffer 10 in the page management table 13. The program then informs the reception unit 6 of the write position and limit value in step S496, and waits for 0.2 sec in step S497. During this interval, a write of received data to the reception buffer 10 by the reception unit 6 is in progress.

In step S498, the reception management program 51 checks if it has received some information from the reception unit 6. If NO in step S498, the flow returns to step S497 to form a loop, thus waiting for information from the reception unit 6.

If the program determines in step S498 that it has received information from the reception unit 6, the program executes various kinds of processing in correspondence with the type of information in step S499 and the subsequent steps.

The program checks in step S499 if the information from the reception unit 6 indicates detection of a page start command 32. If YES in step S499, the program checks in step S500 if the previous page data, reception of which is currently underway, is present. If NO in step S500, the flow returns to step S484 to start reception of the new page data. If YES in step S500, the program sets the end address of the previous page data, reception of which was in progress, in the page management table 13, and the flow returns to step S484 to start reception of the new page.

If NO in step S499, the program checks in step S502 if the information from the reception unit 6 indicates detection of a page clear command. If YES in step S502, the program clears data for the page, reception of which is in progress, from the page management table 13, in step S503. Thereafter, the flow returns to step S482 to wait for the next page start information.

If NO in step S504, since it means that the information from the reception unit 6 indicates that the write position of received data to the reception buffer 10 has reached the limit value, the program checks the page management table in step S506 to detect if the reception buffer 10 has an empty area in which received data can be written.

If YES in step S506, since a new limit value can be set, the flow jumps to step S496 to inform the reception unit 6 of a new write position and new limit value, and the program continues reception.

On the other hand, if NO is determined in step S506, the program checks in step S507 if page data, reception of which is in progress, alone is stored in the reception buffer, and that page data still continues after it is written in the entire area of the reception buffer 10, i.e., if the data for one page is too large. If NO in step S507, the program waits for 1 sec in step S508.

During this interval, the program waits for paper discharging corresponding to received page data and clearing of paper-discharged page data from the reception buffer 10 by the interpreter program 52. After step S508, the flow returns to step S506 to form a loop, and the program waits for completion of interpretation and paper discharging by the interpreter program 52.

If it is determined in step S507 that data for one page is too large, the program checks in step S509 in FIG. 56 if the variable mem is 1. If YES in step S509, it indicates that the current memory map on the RAM 9 is that for the "synthesis mode", and too large data for one page, i.e., giant page data cannot be output in the "synthesis mode". Hence, the program suspends reception in step S515 and the subsequent steps.

If NO in step S509, in step S510 and the subsequent steps the program starts paper discharging/output processing of giant page data in the "simplified synchronization mode" together with the interpreter program 52.

After the program sets a mark indicating giant page data in the page management table 13 in step S510, in step S511 it informs the interpreter program 52 that reception of giant page data is in progress, and of the write end position on the reception buffer 10.

The program forms a loop in step S512 to wait for information from the interpreter program 52. The information from the interpreter program 52 in this case has one of the three contents, i.e., information indicating a reception request of the next image block in an empty area since the received image block has already been video-transferred to the engine unit, information indicating that a paper jam error has occurred, or information indicating that an "overrun error" in which reception of the image block cannot catch up with video transfer to the engine has occurred.

Upon receiving the information from the interpreter program 52, the flow jumps to step S513 to check if the information contents indicate errors. If NO in step S513, i.e., if the information contents indicate no errors but a reception request of the next image block, the program corrects the page start address in the page management table 13 in step S514, and the flow then returns to step S496 to continue reception of the image block of the giant page.

If YES in step S509 or S513, page data reception suspend processing is done. The program instructs the reception unit 6 of the end of write in step S515, clears the page data, reception of which is in progress, from the page management table 13 in step S516, and clears the buffers, work areas, and the like on the RAM 9 in step S517. If the "synthesis mode" is selected, the program also clears the band memories, registered character management table 14, and registered character data area 15.

After step S517, the flow returns to step S482, and the program waits for the next page start information.

(Interpreter Program)

Figure 57:
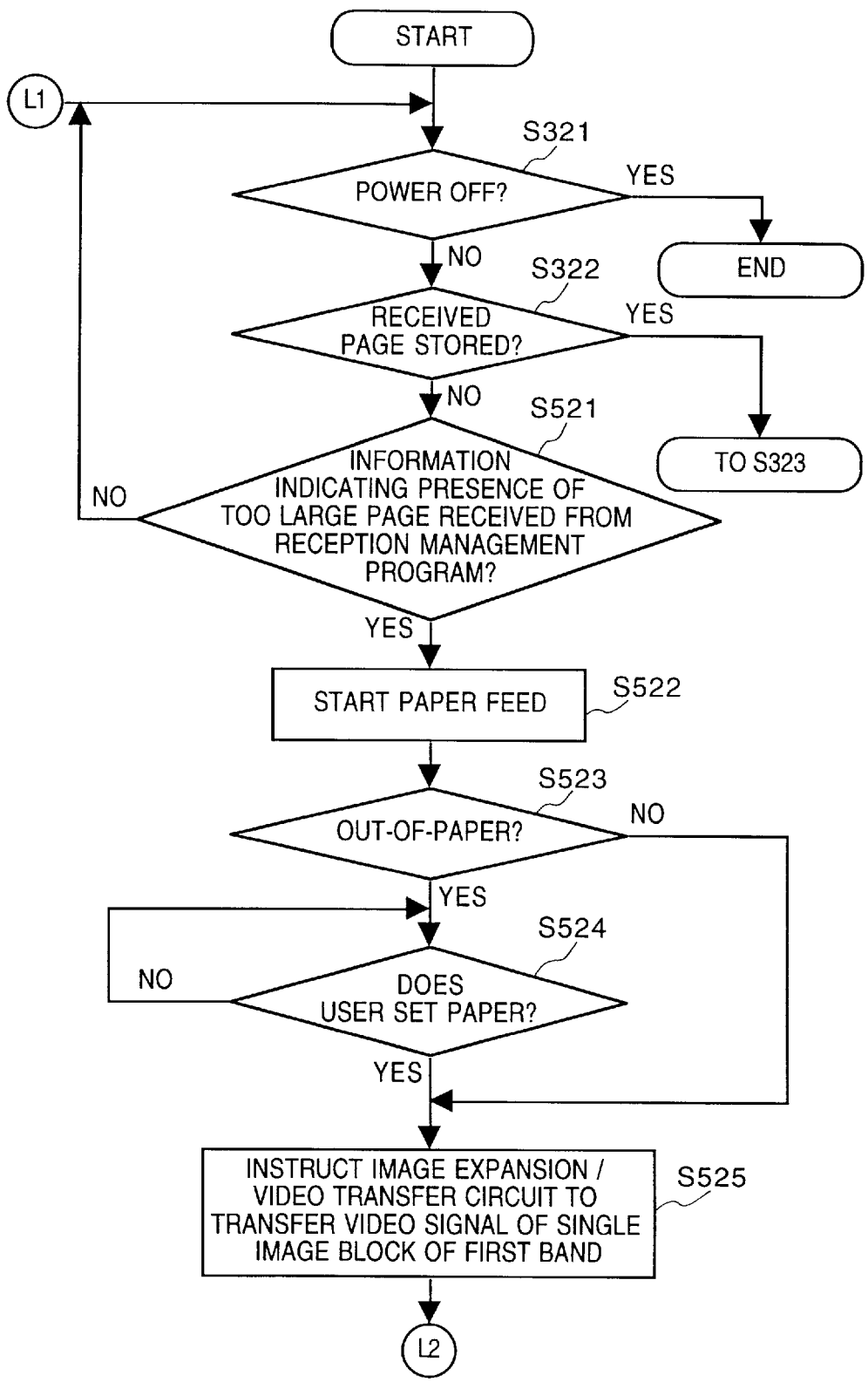
FIG. 57 is a flow chart showing the operation of an interpreter program.
Figure 58:
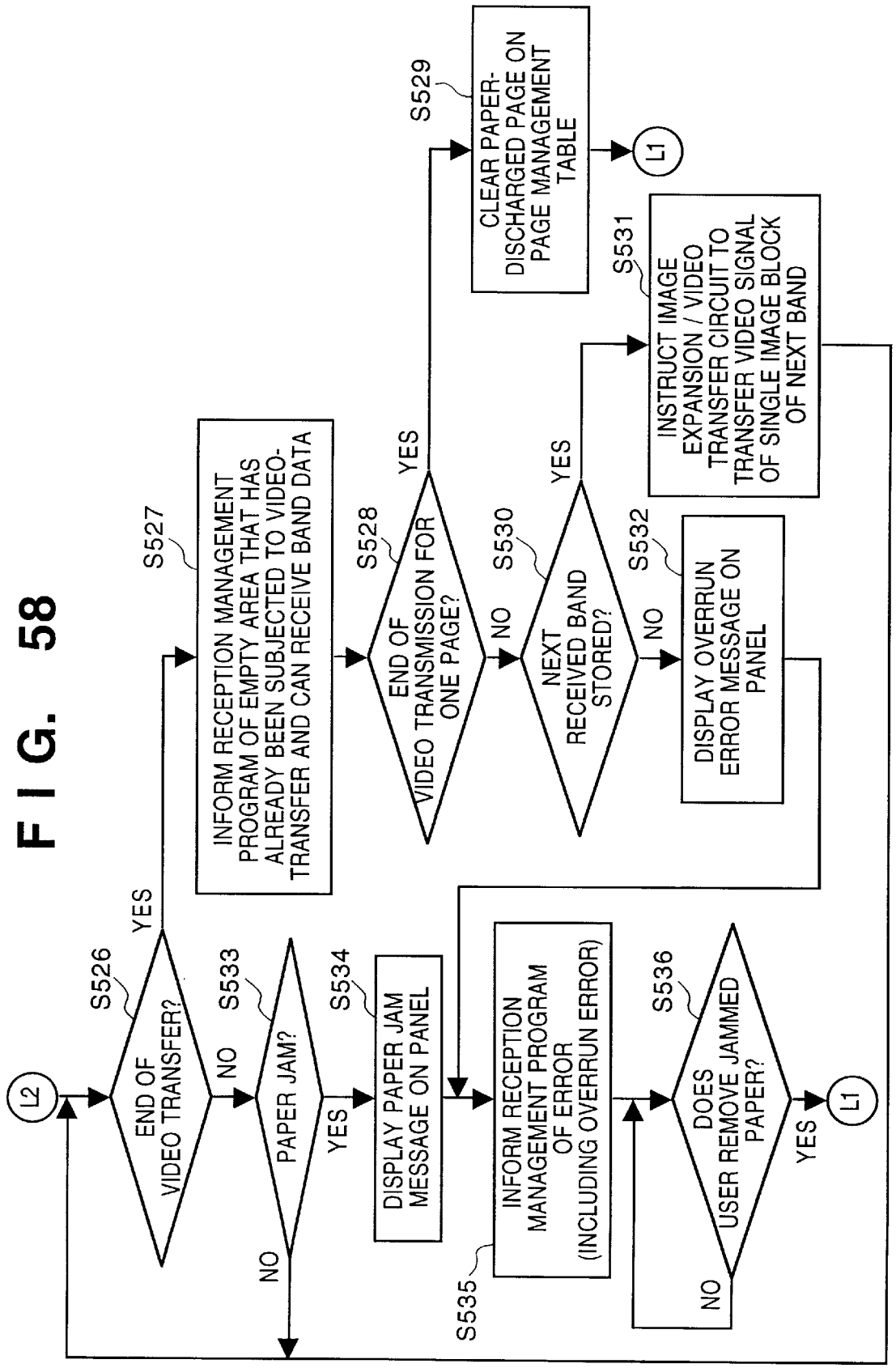
FIG. 58 is a flow chart showing the operation of the interpreter program.

FIGS. 57 and 58 are flow charts for explaining the operation of the interpreter program 52. In these flow charts, processing in step S521 and the subsequent steps is added to the beginning of the operation of the interpreter program 52 described above with the aid of FIGS. 40 to 43 in the third embodiment.

Only the added processing will be explained with reference to FIGS. 57 and 58. Since other processing is the same as that shown in FIGS. 40 to 43, a detailed description thereof will be omitted.

The interpreter program 52 is started immediately after power ON of the printer 2. In step S321, the program checks if the user has turned off the power switch of the printer 2. If YES in step S321, the program ends its processing.

If NO in step S321, the program checks in step S322 if the reception buffer 10 stores the received data for one page. If YES in step S322, the flow advances to the processing in step S323 and the subsequent steps in FIG. 40.

If NO in step S322, the program checks in step S521 if the information from the reception management program 51 indicates the presence of a page which is too large to be stored in the reception buffer 10. If NO in step S521, the flow returns to step S321 to form a loop, thus waiting for completion of reception of the page data.

If YES in step S521, output of giant page data that cannot be stored in the reception buffer 10 in the "simplified synchronization mode" commences in step S522 and the subsequent steps.

The program supplies a paper feed start instruction to the engine unit 4 in step S522, and checks in step S523 if the engine unit 4 has detected an out-of-paper state. If YES in step S523, the program forms a loop in step S524 and waits until the user sets paper sheets. After paper sheets are set or if NO in step S523, in step S525 the program instructs the image expansion/video transfer circuit 73 of expansion of compressed image data in a single image block that belongs to the first band of that page, and video transfer to the engine unit 4.

The program checks in step S526 if video transfer is complete. If YES in step S526, in step S527 the programs informs the reception management program 51 of an empty area of the reception buffer 10 upon completion of video transfer. That is, the program requests the program 51 reception of band data (to be described later).

The program then checks in step S528 if video transfer for one page is complete. If YES in step S528, the program clears data for the paper-discharged page on the page management table 13 in step S529, and the flow returns to step S321 to start interpretation of the next page.

If NO in step S528, the program checks in step S530 if the reception buffer 10 stores the next received band. If YES in step S530, in step S531 the program instructs the image expansion/video transfer circuit 73 of expansion of compressed image data in a single image block that belongs to a band next to the band which has already been transferred to the image expansion/video transfer circuit 73, and video transfer to the engine unit 4. The flow then returns to step S526 to wait for completion of video transfer.

If NO in step S530, since neither video transfer for one page nor reception of the next band data are complete, an "overrun error" message is displayed on the panel of the printer 2 in step S532, and the flow jumps to step S535 to execute error processing.

If NO in step S526, the program checks in step S533 if paper jam has occurred in the engine unit 4. If NO in step S533, the flow returns to step S526 to form a loop, thus waiting for completion of video transfer.

If YES in step S533, the program displays a "paper jam" message on the panel in step S534, and informs the reception management program 51 of an "error" in step S535. The types of "errors" to be informed include "paper jam errors" and "overrun errors".

The program repeats checking in step S536 until the user removes jammed paper. Thereafter, the flow returns to step S321 to start interpretation of the next page.

Of course, if an "overrun error" occurs in step S532, since no paper jam has taken place, the program skips checking in step S536. When an "overrun error" occurs, a page with a blank portion below the band position where the overrun error has occurred is discharged.

<Effects Unique to Fourth Embodiment>

(1) In this embodiment, since the printer driver automatically determines and selects the output mode, i.e., one of the "synthesis mode" of the third embodiment, and the "simplified synchronization mode", the user need not perform any switching.

(2) Owing to effect (1), document page data mainly including character data can be quickly printed and discharged since most of character data can be output as codes in the "synthesis mode".

(3) Similarly owing to effect (1), document page data mainly including an image such as a picture or the like can be printed and discharged beyond the limit capacity in the "simplified synchronization mode" even when it exceeds the size of the reception buffer 10.

[Fifth Embodiment]

As the fifth embodiment, a combination of the method of the first to fourth embodiments, in which the driver on the host separates character data from other image data, and transmits character data as character code and other image data as bitmap image data to the printer, and the conventional method in which all print data are transmitted as bitmap image data to the printer will be explained below.

Figure 61:
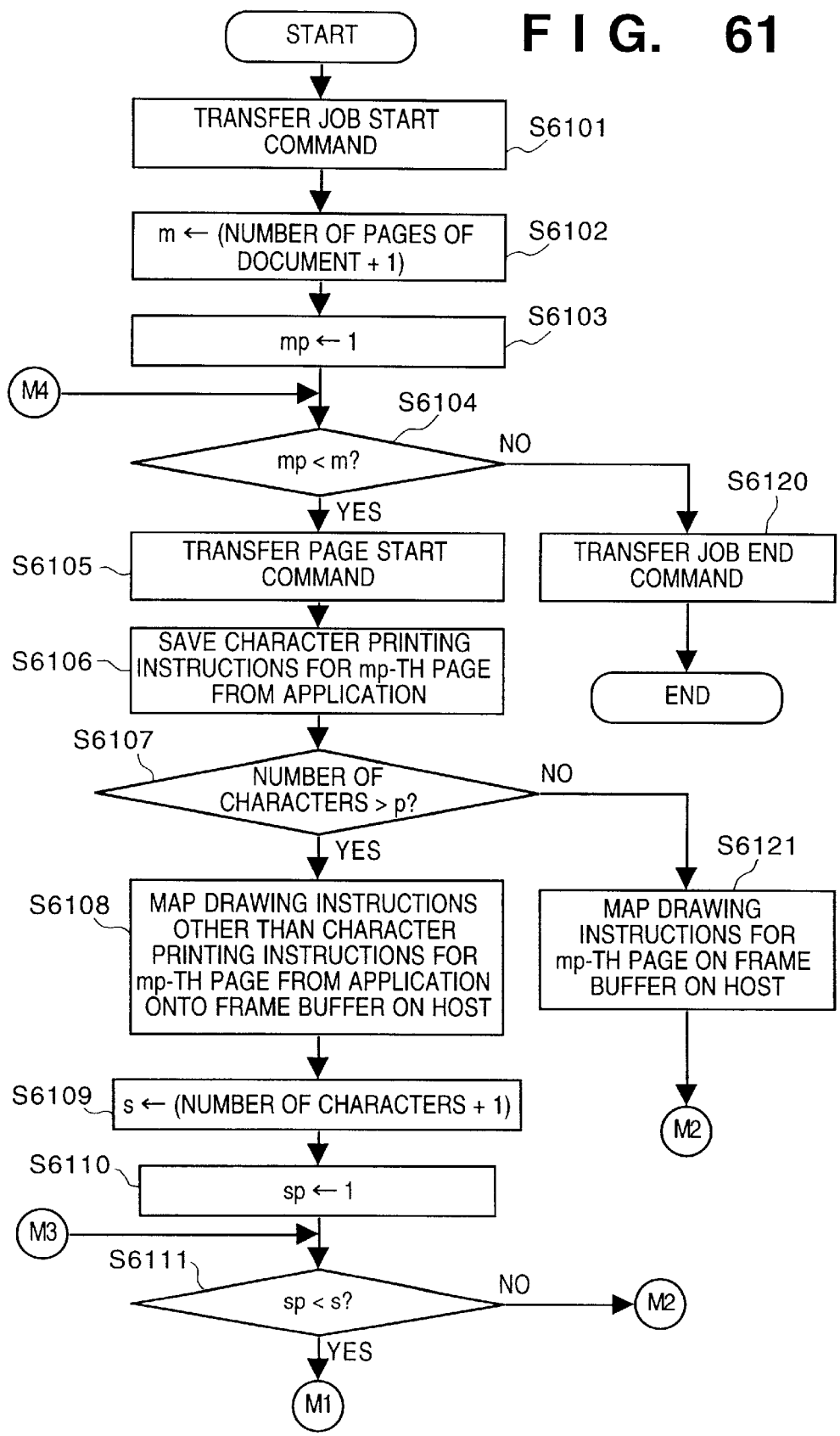
FIG. 61 is a flow chart showing the operation of a printer driver according to the fifth embodiment.
Figure 62A:
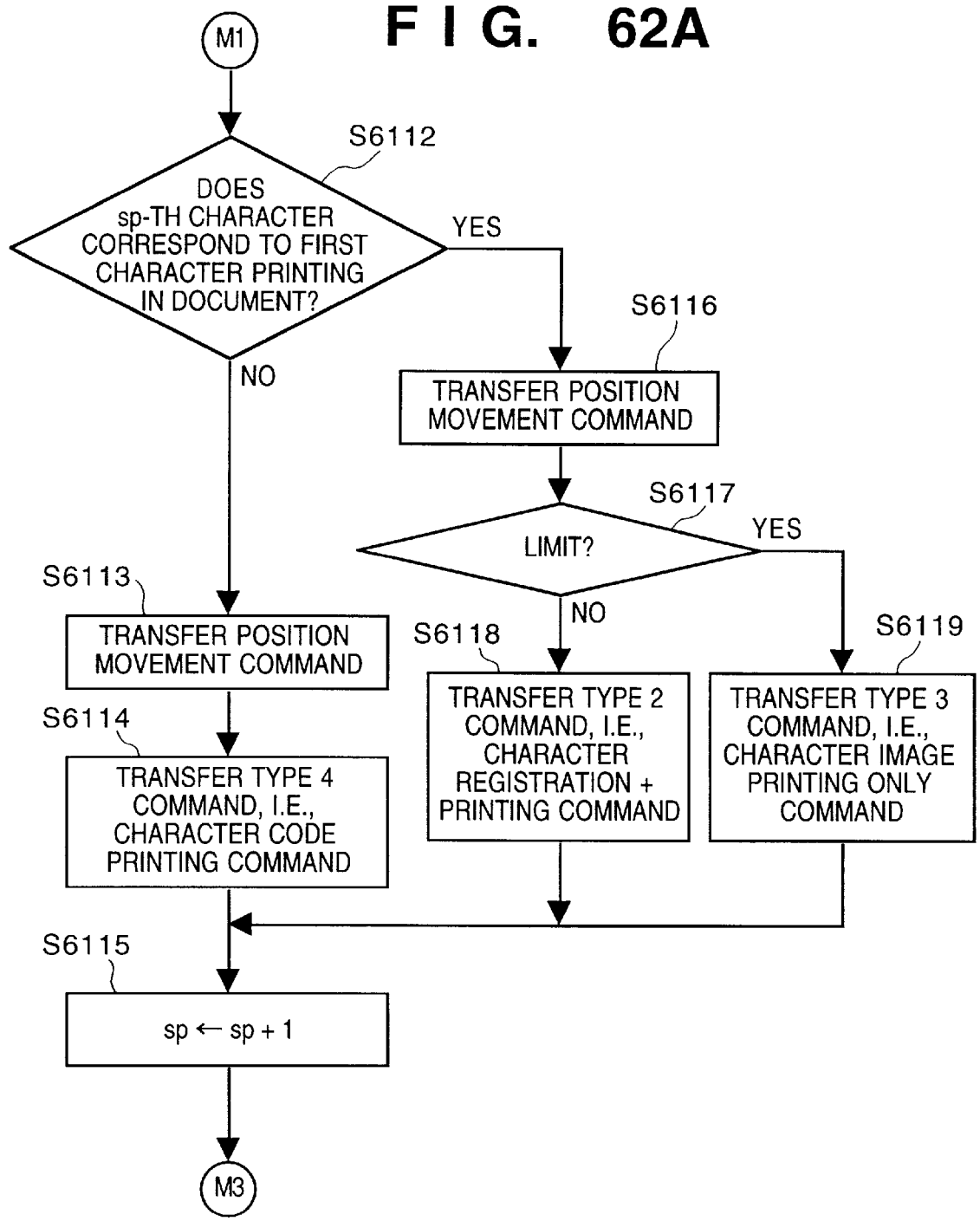
FIGS. 62A and 62B are flow charts showing the operation of the printer driver according to the fifth embodiment.
Figure 62B:
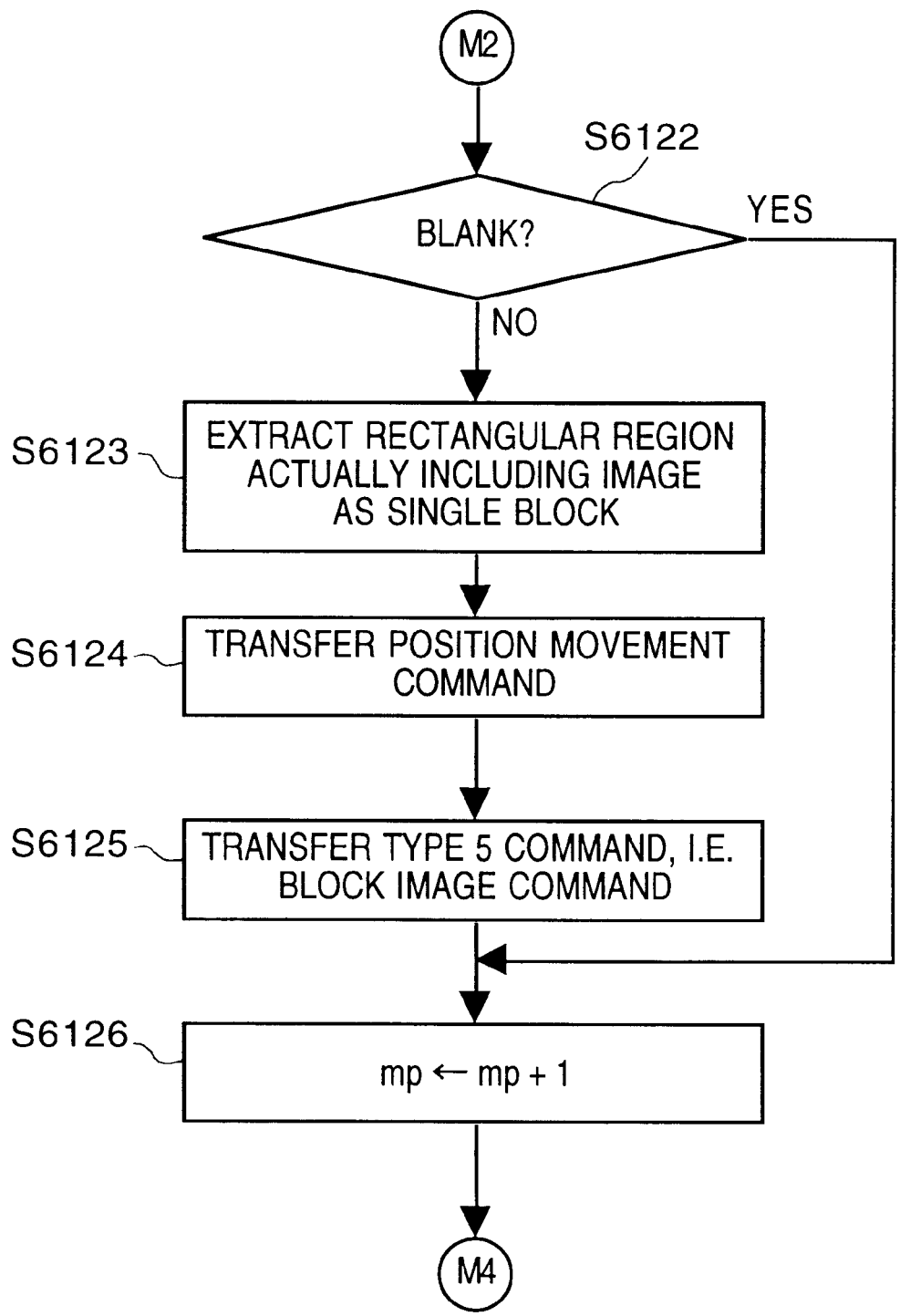

FIGS. 61, 62A, and 62B are flow charts of the printer driver of this embodiment. Note that the printer of the first embodiment can be controlled by this driver.

The printer driver generates character and image printer commands described above with the aid of FIG. 20 from document data created by an application software program used by the user, and transfers them to the printer 2. When the user instructs document printing from the application software program, the printer driver is started in the host 1.

At the time of starting, the driver assures a frame buffer (not shown) for one page on a memory of the host 1 and clears the frame buffer at the same time. Upon completion of document printing by the driver, the memory area used as the frame buffer is released.

In actual processing, the driver transfers a job start command 31 to the printer 2 in step S6101, sets, in a variable m, a value obtained by adding 1 to the number of pages of the document to be printed in step S6102, and sets 1 in a variable mp indicating the page number of interest in step S6103. The driver then checks in step S6104 if the variable mp is smaller than the variable m. If NO in step S6104, since processing of all the pages of the document is complete, the driver transfers a job end command in step S6120, thus ending its processing.

On the other hand, if YES in step S6104, the driver transfers a page start command 32 to the printer 2 in step S6105, saves character printing instructions of the mp-th page from the application program in step S6106, and compares the number of saved character printing instructions with an independently defined predetermined value p in step S6107. If the number of character printing instructions is larger than the predetermined value p, the flow advances to step S6108 to transmit characters which appear in that page by means of character registration and character codes on the basis of the saved character printing instructions, and other data as bitmap image data to the printer. If the number of character printing instructions is smaller than the predetermined value p, the flow advances to step S6121, and all the drawing instructions of that page as well as character printing instructions are mapped as bitmap image data. The flow then advances to step S6122 (to be described later) to transmit the mapped image to the printer.

In step S6108, the driver maps drawing instructions other than the character printing instructions of the mp-th page from the application program onto the frame buffer on the host 1. The drawing instructions other than the character printing instructions include ruled line and figure drawing instructions, image paste instruction, and the like.

The driver sets a value obtained by adding 1 to the number of saved characters in a variable s in step S6109, and also sets 1 in a variable sp indicating the position of the character of interest in one band in step S6110.

Subsequently, the driver checks in step S6111 if the variable sp is smaller than the variable s. If NO in step S6111, since transfer processing of character data included in the np-th band is complete, the driver starts transfer processing of image data of the np-th band in step S6122 and the subsequent steps. That is, in step S6122, the driver checks if the np-band is a blank band. If YES in step S6122, the flow advances to step S6126 without any processing.

If NO in step S6122, the driver extracts a rectangular region actually including an image as a single block in step S6123, transfers a position movement command 33 indicating the paste position of that block to the printer 2 in step S6124, and transfers commands corresponding to type 5, i.e., image clock commands 45, 46, 47, and 48, to the printer 2 in step S6125. Of course, the image block data is transferred after being compressed.

The driver increments the contents of the variable np by 1 in step S6126, and the flow returns to step S6104 to transfer the next page data.

If YES in step S6111, the driver checks in step S6116 if the sp-th character is the first character to be printed in this document. If YES in step S6116, the driver transfers a position movement command 33 indicating the printing position of that character to the printer 2 in step S6117, and checks in step S6114 if the number of registered characters has reached a limit on the printer 2 side. If YES in step S6114, the driver transfers commands corresponding to type 3, i.e., character image printing only commands 43 and 44, to the printer 2 in step S6119, and the flow then advances to step S6115.

However, if NO in step S6117, the driver transfers commands corresponding to type 2, i.e., character registration+printing commands 41, 42, 43, and 44, to the printer 2 in step 6118, and the flow advances to step S6114. Of course, a dot image for each character to be transferred to the printer 2 is compressed.

If NO in step S6112, since it indicates that this printing instruction is the second or subsequent printing instruction of that character, the driver transfers a position movement command 33 indicating the printing position of that character to the printer 2 in step S6113, and also transfers a type command 34 of type 4, i.e., character code printing commands 41 and 42, to the printer 2 in step S6114.

In step S6115, the driver increments the contents of the variable sp indicating the position of the character of interest by 1, and the flow then returns to step S6111 to execute transfer processing of the next character data to the printer 2.

With the above-mentioned procedure, when the number of characters included in one page is equal to or larger than the predetermined value, characters are separated from other data, are transmitted to the printer by means of character registration and character codes, and are mapped on the printer. On the other hand, when the number of characters included in one page is smaller than the predetermined value, all the image data for that page as well as character data are mapped as bitmap image, and the mapped image is sent to the printer. With this processing, when page data include a small number of characters, the processing overheads on both the driver and printer, i.e., character extraction, registration, and mapping of data other than characters on the driver, and mapping of character data as an image on the printer, can be reduced.

Since the printer of the first to fourth embodiments described above can cope with the conventional method wherein all the print data are received as image data from the host computer, the processing procedure of the printer side need not be changed even when both the methods are used.

The above-mentioned procedure is done in units of pages. However, as in the second embodiment, when print data is transmitted from the host computer to the printer in units of bands, the data transfer method can be changed as in the above description.

Figure 63:
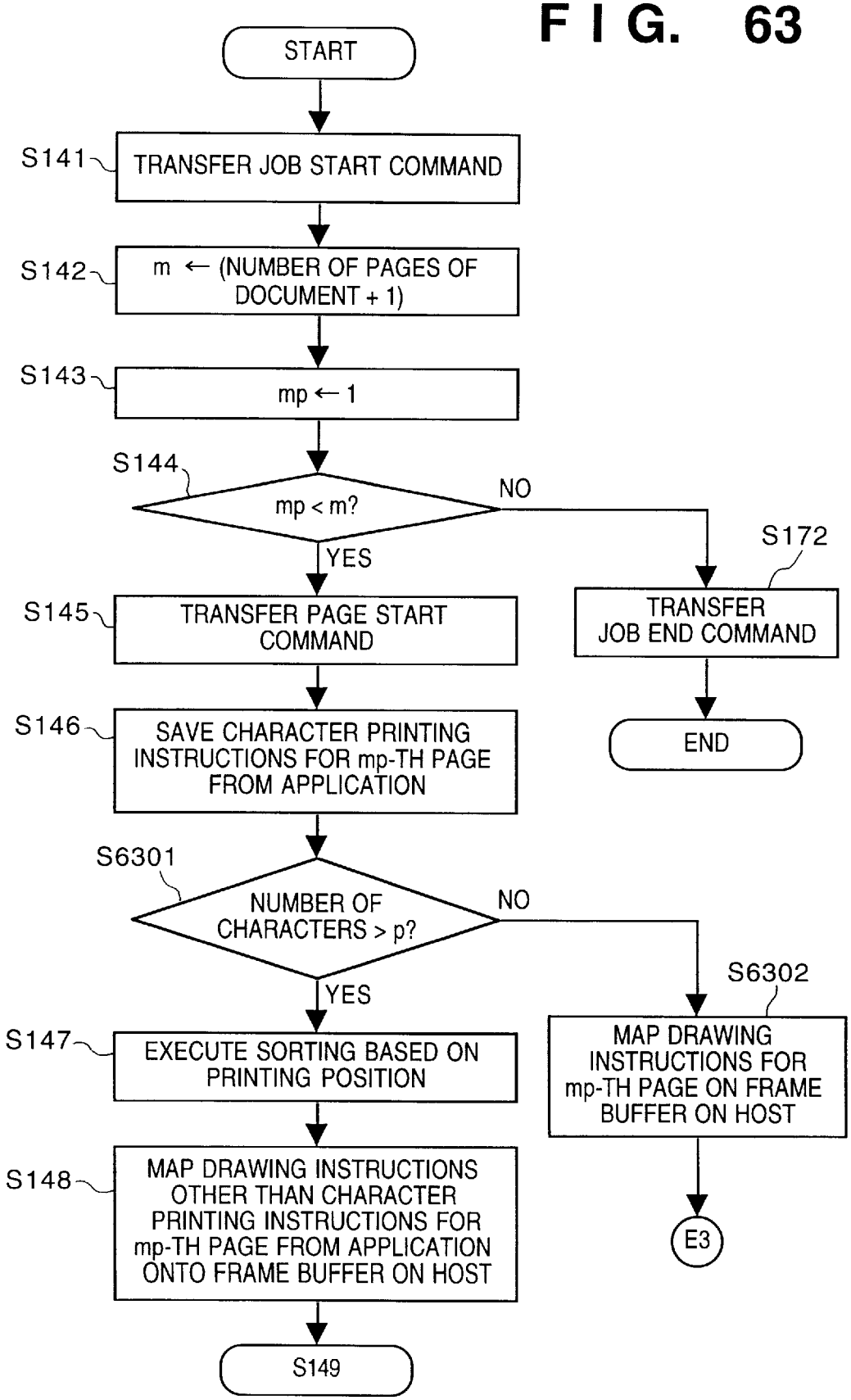
FIG. 63 is a flow chart showing the operation of the printer driver according to the fifth embodiment.

FIG. 63 shows some steps in the control procedure of the printer driver according to this method. Note that the printer of the second embodiment can properly process data transmitted from this printer driver.

Since most of the steps in the procedure of this driver are common to those in the flow charts in FIGS. 22 to 24 of the driver in the second embodiment, the same step numbers as in FIGS. 22 to 24 denote common portions, and a detailed description thereof will be omitted. The difference from the second embodiment is that steps S6301 and S6302 in FIG. 63 are inserted between steps S146 and S147.

In step S6301, the driver compares the number of saved character printing instructions with an independently defined predetermined value p. If the number of character printing instructions is larger than the predetermined value p, the flow advances to step S147 to transmit characters which appear in that page by means of character registration and character codes on the basis of the saved character printing instructions, and other data as bitmap image data to the printer. If the number of character printing instructions is smaller than the predetermined value p, the flow advances to step S6302, and all the drawing instructions of that page as well as character printing instructions are mapped as bitmap image data. The flow finally advances to step S158 to transmit the mapped image to the printer.

With the above-mentioned processing of the printer driver, when the number of characters included in one page is equal to or larger than the predetermined value, characters are separated from other data, are transmitted to the printer by means of character registration and character codes, and are mapped on the printer. On the other hand, when the number of characters included in one page is smaller than the predetermined value, all the image data for that page as well as character data are mapped as bitmap image, and the mapped image is sent to the printer. With this processing, when page data include a small number of characters, the processing overheads on both the driver and printer, i.e., character extraction, registration, and mapping of data other than characters on the driver, and mapping of character data as an image on the printer, can be reduced.

In the procedure shown in FIG. 63, the number of characters included in one page is compared with the predetermined value. Alternatively, the number of characters included in each band may be compared with a predetermined value. In this case, if the number of characters included in each band is equal to or larger than the predetermined value, character data for that band are transmitted as character codes, and other data are transmitted as image data to the printer. Otherwise, all the print data in that band are transmitted as image data to the printer.

Figure 64:
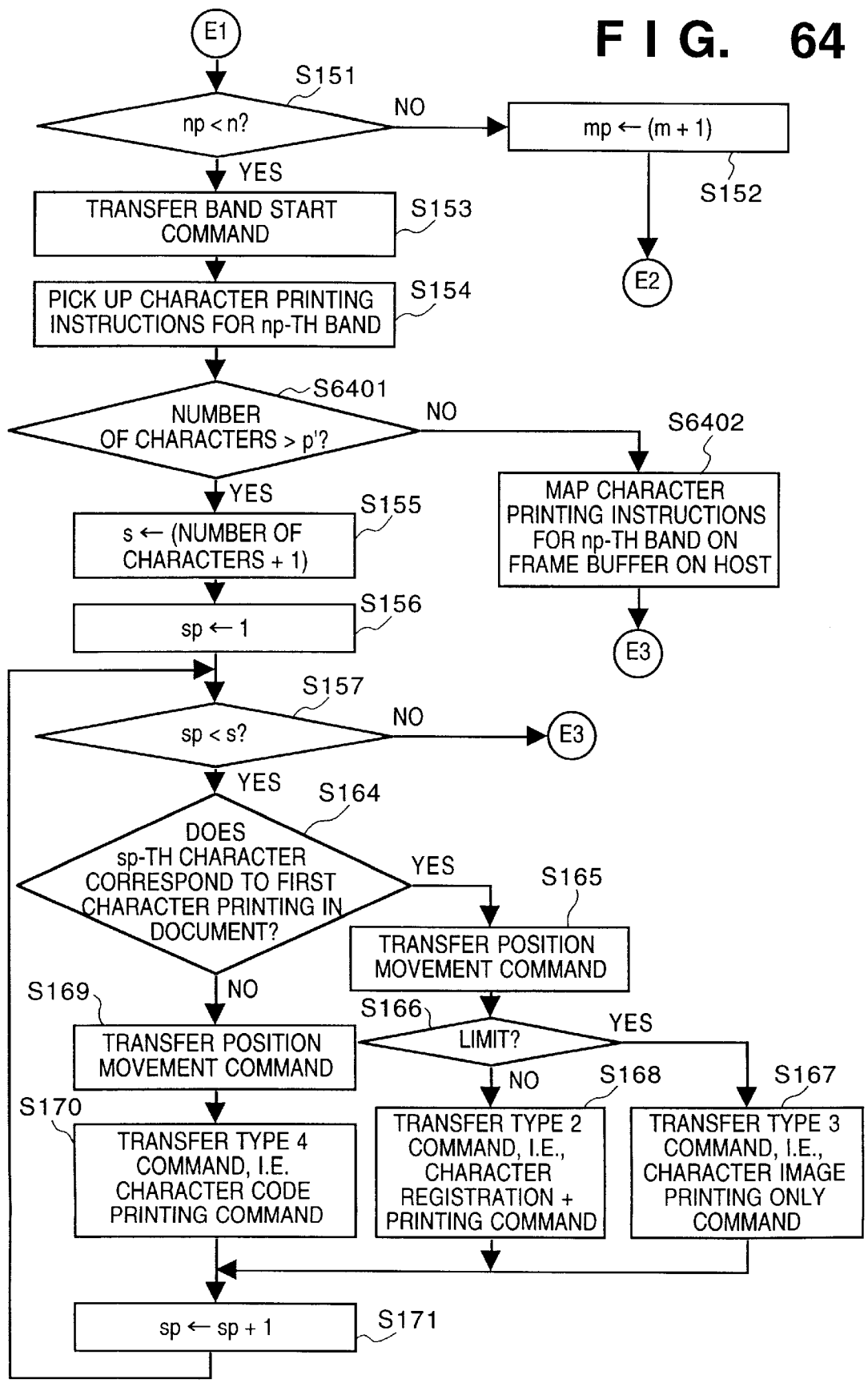
FIG. 64 is a flow chart showing the operation of the printer driver according to the fifth embodiment.

For this purpose, as shown in FIG. 64, steps S6401 and S6402 are inserted between steps S154 and S155 in FIG. 23 of the second embodiment. In step S6401, the number of character printing instructions for the np-th band is compared with a predetermined value p', and if the number of characters is larger than the predetermined value, the flow advances to step S155; otherwise, all the print data for that band are mapped as an image and the mapped image is synthesized with an image on the frame buffer mapped in step S148. After that, the flow advances to step S158. With this processing, the printing control method according to the present invention and the conventional printing control method can be selectively used in units of bands.

[Other Embodiments]

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

[Effect of the Invention]

As described above, according to the present invention, since most of character portions are processed using character codes, the character mapping time on the host can be shortened. Also, since the data size is small, document data can be output at high speed.

When band memories are arranged in place of the frame memory, the required memory capacity can be reduced.

Since only a rectangular portion actually including an image in a band is processed as image data, and no image data for a band that does not include any image is sent to the printer, the quantity of image data to be transferred can be minimized.

Upon outputting a band that does not include any characters but includes an image alone, the hardware circuit expands compressed image data, and video-transfers expanded data to the engine unit, thus obviating the need for mapping data onto the band memory. In this manner, the load on the controller in the printer can be reduced, and errors such as "overrun" and the like hardly occur.

When it is determined as a result of pattern analysis on the host bands include identical patterns, a command indicating that image data of the band is the same as that of the already transferred band is transferred to the printer, thus minimizing the amount of image data to be transferred.

When data can be stored in the reception buffer, characters are printed out by mapping them as character codes in the printer. However, when page data includes a large image and cannot be stored in the reception buffer, the image data is divided into given blocks, and is transmitted in units of blocks. In this case, the printer automatically selects a mode for printing data every time it receives the data. In this manner, page data including giant image data can also be output.

As many apparently widely different embodiments of the present invention can be made without departing from the spirit and scope thereof, it is to be understood that the invention is not limited to the specific embodiments thereof except as defined in the appended claims.

What is claimed is:

1. A print control apparatus comprising:

first determination means for determining whether or not a compressed image included in a band of interest is required to be synthesized with another image; and control means for performing a control process such that the compressed image is expanded and developed in a band memory and the developed image in the band memory is output to a printing unit in a case in which an image included in the band of interest is required to be synthesized with another image, or that the compressed image is output to the printing unit without being developed in the band memory in a case in which an image included in the band of interest is not required to be synthesized with another image.

2. An apparatus according to claim 1, wherein the printing unit includes a printing engine for printing an image based upon a video signal, and video signal output means for, in a case in which an input image is not compressed, converting the input image into a video signal and outputting the video signal to the printing engine.

3. An apparatus according to claim 1, further comprising second determination means for determining whether or not the band of interest is blank, wherein said control means instructs the printing unit to output a blank band when the band of interest is determined to be blank.

4. An apparatus according to claim 1, wherein the other image includes a character image.

5. An apparatus according to claim 4, wherein data of the compressed image is input from a host computer, and the character image is registered by the host computer.

6. An apparatus according to claim 1, wherein other image includes a compressed image.

7. An apparatus according to claim 2, wherein the video signal output means stops outputting the video signal in accordance with an instruction from said control means.

8. A printing apparatus comprising:

a printing unit including video signal output means for outputting a video signal based upon image data or compressed image data, and a printing engine for printing an image based upon the video signal;

first determination means for determining whether or not a compressed image included in a band of interest is required to be synthesized with another image; and control means for performing a control process such that the compressed image is expanded and developed in a band memory and the developed image in the band memory is output to a printing unit in a case in which an image included in the band of interest is required to be synthesized with another image, or that the compressed image is output to the printing unit without being developed in the band memory in a case in which an image included in the band of interest is not required to be synthesized with another image.

9. A printing system comprising a host computer and a printer, wherein said host computer includes:

separation means for separating character data from data other than characters in a document subjected to printing;

means for converting the data other than characters to image data, compressing the image data, and transmitting the compressed image data to said printer; and means for registering a character image corresponding to the character data, and transmitting a character code corresponding to the character data, and wherein said printer includes:

a printing unit including video signal output means for outputting a video signal based upon image data or compressed image data, and a printing engine for printing an image based upon the video signal;

first determination means for determining whether or not a compressed image included in a band of interest is required to be synthesized with another image; and control means for performing a control process such that the compressed image is expanded and developed in a band memory and the developed image in the band memory is output to a printing unit in a case in which an image included in the band of interest is required to be synthesized with another image, or that the compressed image is output to the printing unit without being developed in the band memory in a case in which an image included in the band of interest is not required to be synthesized with another image.

10. A print control method comprising the steps of:

determining whether or not a compressed image included in a band of interest is required to be synthesized with another image;

expanding the compressed image, developing the expanded image in a band memory, and outputting the developed image in the band memory to a printing unit in a case in which an image included in the band of interest is required to be synthesized with another image; and outputting the compressed image to the printing unit without developing the compressed image in the band memory in a case in which the image included in the band of interest is not required to be synthesized with another image.

11. A method according to claim 10, wherein the printing unit includes a printing engine for printing an image based upon a video signal, and video signal output means for, in a case in which an input image is not compressed, converting the input image into the video signal and outputting the video signal to the printing engine, and, in a case in which an input image is compressed, expanding the input compressed image, converting the expanded image into a video signal, and outputting the video signal to the printing engine.

12. A method according to claim 10, further comprising a second determining step of determining whether or not the band of interest is blank, wherein the printing unit is instructed to output a blank band when the band of interest is determined to be blank.

13. A method according to claim 10, wherein the other image includes a character image.

14. A method according to claim 13, wherein data of the compressed image is input from a host computer, and the character image is registered by the host computer.

15. A method according to claim 10, wherein the other image includes a compressed image.

16. A method according to claim 11, wherein the video signal output means stops outputting the video signal in accordance with an instruction in said outputting step.

17. A computer readable storage medium storing a computer program for performing print control, the computer program comprising:

code for determining whether or not a compressed image included in a band of interest is required to be synthesized with another image;

code for expanding the compressed image, developing the expanded image in a band memory, and outputting the developed image in the band memory to a printing unit in a case in which an image included in the band of interest is required to be synthesized with another image; and code for outputting the compressed image to the printing unit without developing the compressed image in a case in which an image included in the band of interest is not required to be synthesized with another image.

18. A computer readable storage medium according to claim 17, wherein the printing unit includes a printing engine for printing an image based upon a video signal, and video signal output means for, in a case in which an input image is not compressed, converting the input image into the video signal and outputting the video signal to the printing engine, and, in a case in which an input image is compressed, expanding the input compressed image, converting the expanded image into a video signal, and outputting the video signal to the printing engine.

19. A computer readable storage medium according to claim 17, the computer program further comprising code for determining whether or not the band of interest is blank, wherein the printing unit is instructed to output a blank band when the band of interest is determined to be blank.

20. A computer readable storage medium according to claim 17, wherein the other image includes a character image.

21. A computer readable storage medium according to claim 20, wherein data of the compressed image is input from a host computer, and the character image is registered by the host computer.

22. A computer readable storage medium according to claim 17, wherein other image includes a compressed image.

23. A computer readable storage medium according to claim 18, wherein the video signal output means stops outputting the video signal in accordance with an instruction from said code for outputting.

24. A computer program product loadable into an internal memory of a digital computer, said program product comprising:

code for determining whether or not a compressed image included in a band of interest is required to be synthesized with another image;

code for expanding the compressed image, developing the expanded image in a band memory and outputting the developed image in the band memory to a printing unit in a case in which an image included in the band of interest is required to be synthesized with another image; and code for outputting the compressed image to the printing unit without developing the compressed image in a case in which an image included in the band of interest is not required to be synthesized with another image.

25. A program product according to claim 24, wherein the printing unit includes a printing engine for printing an image based upon a video signal, and video signal output means for, in a case in which an input image is not compressed, converting the input image into the video signal into outputting the video signal to the printing engine, and, in a case in which an input image is compressed, expanding the input compressed image, converting the expanded image into a video signal, and outputting the video signal to the printing engine.

26. A program product according to claim 24, further comprising code for determining whether or not the band of interest is blank, wherein the printing unit is instructed to output a blank band when the band of interest is determined to be blank.

27. A program product according to claim 24, wherein the other image includes a character image.

28. A program product according to claim 27, wherein data of the compressed image is input from a host computer, and the character image is registered by the host computer.

29. A program product according to claim 24, wherein the other image includes a compressed image.

30. A program product according to claim 24, wherein the video signal output means stops outputting the video signal in accordance with an instruction from said code for outputting.

* * * * *

UNITED STATES PATENT AND TRADEMARK OFFICE
CERTIFICATE OF CORRECTION

PATENT NO.   : 6,128,096
DATED        : October 3, 2000
INVENTOR(S)  : YOJI FURUYA ET AL.

It is certified that error appears in the above-identified patent and that said Letters Patent is hereby corrected as shown below:

COLUMN 11

Line 7, "S11." should read --S11.--.
    Line 10, "S11," should read --S11,--.

COLUMN 45

Line 30, "programs" should read --program--.

Signed and Sealed this

Twenty-second Day of May, 2001

Attest:

NICHOLAS P. GODICI

Attesting Officer      Acting Director of the United States Patent and Trademark Office